(12) United States Patent
Yamagishi et al.

(10) Patent No.: US 9,001,897 B2
(45) Date of Patent: Apr. 7, 2015

(54) VIDEO QUALITY ESTIMATION APPARATUS, VIDEO QUALITY ESTIMATION METHOD, AND PROGRAM

(75) Inventors: Kazuhisa Yamagishi, Tokyo (JP); Takanori Hayashi, Tokyo (JP); Jun Okamoto, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 486 days.

(21) Appl. No.: 13/501,210

(22) PCT Filed: Mar. 25, 2010

(86) PCT No.: PCT/JP2010/055203
§ 371 (c)(1),
(2), (4) Date: Apr. 10, 2012

(87) PCT Pub. No.: WO2011/048829
PCT Pub. Date: Apr. 28, 2011

(65) Prior Publication Data
US 2012/0201310 A1    Aug. 9, 2012

(30) Foreign Application Priority Data

Oct. 22, 2009 (JP) ................................ 2009-243236
Dec. 2, 2009 (JP) ................................ 2009-274238

(51) Int. Cl.
H04N 7/26 (2006.01)
H04N 17/00 (2006.01)
G06T 7/00 (2006.01)

(52) U.S. Cl.
CPC ............ *H04N 17/004* (2013.01); *G06T 7/0002* (2013.01); *G06T 2207/10016* (2013.01); *G06T 2207/30168* (2013.01)

(58) Field of Classification Search
CPC .................... H04N 17/004; G06T 2207/30168; G06T 2207/10016; G06T 7/0002
USPC ............ 375/240.26, 240.27, 240.01, 240.02, 375/240.12
See application file for complete search history.

(56) References Cited

U.S. PATENT DOCUMENTS

2007/0153916 A1* 7/2007 Demircin et al. ......... 375/240.26
2008/0317111 A1* 12/2008 Davis ........................... 375/227
(Continued)

FOREIGN PATENT DOCUMENTS

CN     101558657 A    10/2009
EP     2018068        1/2009
(Continued)

OTHER PUBLICATIONS

ITU—T Recommendation p. 910.
(Continued)

*Primary Examiner* — Christopher S Kelley
*Assistant Examiner* — Zhihan Zhou
(74) *Attorney, Agent, or Firm* — Blakely Sokoloff Taylor & Zafman

(57) ABSTRACT

This invention provides a video quality estimation apparatus (1) including a packet analysis unit (10) that derives the bit rate of an encoded video packet contained in an input packet, and the bit amount of the encoded video packet for each encoded video frame type, a video subset frame characteristic estimation unit (11) that derives the frame characteristic of each video frame type from the bit rate derived by the packet analysis unit (10), and an encoding quality estimation unit (12) that derives, based on the bit rate and the bit amount of each video frame type, a video quality value quantitatively representing the quality of encoded video data that is affected by encoding degradation. The video quality estimation apparatus performs more accurate video quality estimation by taking account of the bit amount of each video frame type.

23 Claims, 27 Drawing Sheets

(56) References Cited

U.S. PATENT DOCUMENTS

| | | |
|---|---|---|
| 2009/0041114 A1* | 2/2009 | Clark .................. 375/240.01 |
| 2009/0225170 A1* | 9/2009 | Yamagishi et al. ............ 348/192 |
| 2010/0091841 A1* | 4/2010 | Ishtiaq et al. ............ 375/240.02 |
| 2010/0195713 A1* | 8/2010 | Coulombe et al. ....... 375/240.02 |
| 2010/0284295 A1* | 11/2010 | Yamagishi et al. ............ 370/252 |
| 2011/0013694 A1* | 1/2011 | Watanabe et al. ........ 375/240.12 |

FOREIGN PATENT DOCUMENTS

| | | | |
|---|---|---|---|
| EP | 2018069 A1 * | 1/2009 | |
| JP | 2006-033722 A | 2/2006 | |
| JP | 2007-306109 A | 11/2007 | |
| JP | 2009-188969 A | 8/2009 | |
| WO | WO 2007/129423 | 11/2007 | |
| WO | WO 2008154742 A1 * | 12/2008 | |
| WO | WO 2009/025357 A1 | 2/2009 | |
| WO | WO 2009/116666 A1 | 9/2009 | |

OTHER PUBLICATIONS

Yamagishi and Hayashi, "Parametric Packet—Layer Model for Monitoring Video Quality of IPTV Services", IEEE ICC 2008, CQ04-3, May 2008.

ITU—T Recommendation J.247.

DVD Document A001 Rev. 7 (Specification for the use of Video and Audio Coding in Broadcasting Applications based on the MPEG-2 Transport Stream).

ANSI/SCTE 128 2008 (AVC Video System and Transport Constraints for Cable Television).

Ushiki and Hayashi, "Computational Cost Reduction of Picture Type Estimation Method using TS Header Information", IEICE Technical Report, CQ2008-32, Sep. 2008.

* cited by examiner

FIG.6

TABLE FOR H. 264, 1280 × 720 p/30 fps, GoP: M = 3, N = 15, IPTV

| v1 | v2 | v3 | v4 | ... | ... | v33 | v34 |
|---|---|---|---|---|---|---|---|
| 16.7 | 7.3 | 100.3 | 122.3 | ... | ... | 0.5 | 5.4 |

TABLE FOR H. 264, 1920 × 1080 p/30 fps, GoP: M = 3, N = 15, IPTV

| v1 | v2 | v3 | v4 | ... | ... | v33 | v34 |
|---|---|---|---|---|---|---|---|
| 4.8 | 3.5 | 2.3 | 12.3 | ... | ... | 1.5 | 3.4 |

FIG.7

| RTP SEQUENCE NUMBER | TS | TS | TS | TS | TS | TS | TS |
|---|---|---|---|---|---|---|---|
| 10000 | 1 | 2 PUSI, RAI | 3 | 4 | 5 | 6 | 7 |
| 10001 | 8 | 9 | 10 | 11 | 12 | 13 | 14 |
| 10002 | 15 | 0 | 1 | 2 | 3 | 4 | 5 |
| ... | | | | | | | |
| 10100 | 6 | 7 | 8 | 9 | 10 PUSI | 11 | 12 |
| 10101 | 13 | 14 | 15 | 0 | 1 | 2 | 3 |
| ... | | | | | | | |
| 10130 | 4 | 5 PUSI | 6 | 7 | 8 | 9 | 10 |
| ... | | | | | | | |

I-FRAME, 50TH FRAME (10000–10002)
B-FRAME, 51ST FRAME (10100–10101)
B-FRAME, 52ND FRAME (10130)

FIG.19

TABLE FOR H.264, 1280 × 720 p/30 fps, GoP: M = 3, N = 15, IPTV

| u1 | u2 | u3 | u4 | ... | u46 | u47 |
|---|---|---|---|---|---|---|
| 16.7 | 7.3 | 100.3 | 122.3 | ... | 0.5 | 5.4 |

TABLE FOR H.264, 1920 × 1080 p/30 fps, GoP: M = 3, N = 15, IPTV

| u1 | u2 | u3 | u4 | ... | u46 | u47 |
|---|---|---|---|---|---|---|
| 4.8 | 3.5 | 2.3 | 12.3 | ... | 1.5 | 3.4 |

FIG.23

TABLE FOR H.264, 1280 × 720 p/30 fps, GoP: M = 3, N = 15, IPTV

| w1 | w2 | w3 | w4 | ... | ... | w30 | w31 |
|---|---|---|---|---|---|---|---|
| 16.7 | 7.3 | 100.3 | 122.3 | ... | ... | 0.5 | 5.4 |

TABLE FOR H.264, 1920 × 1080 p/30 fps, GoP: M = 3, N = 15, IPTV

| w1 | w2 | w3 | w4 | ... | ... | w30 | w31 |
|---|---|---|---|---|---|---|---|
| 4.8 | 3.5 | 2.3 | 12.3 | ... | ... | 1.5 | 3.4 |

VIDEO QUALITY ESTIMATION APPARATUS, VIDEO QUALITY ESTIMATION METHOD, AND PROGRAM

This is a non-provisional application claiming the benefit of International Application Number PCT/JP2010/055203 filed Mar. 25, 2010.

TECHNICAL FIELD

The present invention relates to a video quality estimation apparatus, video quality estimation method, and program and, more particularly, to a video quality estimation apparatus, video quality estimation method, and program for estimating the video quality of an encoded video in an IPTV service, video distribution service, videophone service, or the like provided via an IP network such as the Internet.

BACKGROUND ART

As Internet access lines are growing in speed and band, video communication services are expected to be more popular, which transfer video media including videos and audios between terminals or between servers and terminals via the Internet.

The Internet is a network which does not necessarily guarantee the communication quality. When performing communication using audio and video media, the bit rate drops if the network line band is narrow between user terminals, or a packet loss or packet transfer delay occurs if line congestion occurs. This leads to poor quality of audio and video media sensed by users (QoE: (Quality of Experience)).

More specifically, when a video is encoded, a block of video signals within a frame may degrade, or the high frequency component of a video signal is lost, impairing the resolution of the entire video. When encoded video contents are packetized and transmitted from a provider, a packet loss or packet transfer delay occurs within the network or terminal equipment, and the video suffers an unintended degradation.

As a result, the user perceives a blur, smear, mosaic-shaped distortion, or freeze (state in which a video frame stops) or skip (state in which several frames are lost from video frames) of video frames.

To confirm that video communication services as mentioned above are provided at high quality, it is important to measure the QoE of a video and manage the quality of the video to be provided to the user while providing services.

Therefore, a video quality assessment technique capable of appropriately representing the QoE of a video is required.

As conventional methods for assessing the qualities of videos and audios, there are a subjective quality assessment method (non-patent literature 1) and an objective quality assessment method (non-patent literature 2).

In the subjective quality assessment method, a plurality of users actually view videos and listen to audios, and assess the QoE using a quality scale of five grades (excellent, good, fair, poor, and bad) (nine or 11 grades are also available) or an impairment scale (imperceptible, perceptible but not annoying, slightly annoying, annoying, and very annoying). Video or audio quality assessment values under each condition (e.g., packet loss rate of 0% and bit rate of 20 Mbps) are averaged by the total number of users. The average value is defined as an MOS (Mean Opinion Score) value or DMOS (Degradation Mean Opinion Score) value.

However, the subjective quality assessment method requires special dedicated equipment (e.g., monitor) and an assessment facility capable of adjusting the assessment environment (e.g., room illuminance or room noise). In addition, many users need to actually assess videos or audios. Since time is taken till the completion of actual assessment by users, the subjective quality assessment method is not adequate to assess the quality in real time.

This boosts a demand for development of an objective quality assessment method of outputting a video quality assessment value using a feature amount (e.g., bit rate, bit amount per frame, or packet loss information) which affects video quality.

One conventional objective quality assessment method detects quality degradation caused by encoding of a video, and estimates the individual video quality value or average video quality value of the video (non-patent literature 2).

The individual video quality value is the quality assessment value of each video content to be estimated, and is defined by a value of 1 to 5 (in some cases, defined by another range of, e.g., 1 to 9 or 0 to 100). The average video quality value is a value obtained by dividing the sum of the individual video quality values of respective video contents to be estimated by the total number of video contents to be estimated, and is defined by a value of 1 to 5 (in some cases, defined by another range of, for example, 1 to 9 or 0 to 100).

For example, when the number of videos (a plurality of transmitted videos will be called a "video subset") transmitted under the same condition (packet loss rate of 0% and bit rate of 20 Mbps) in an arbitrary video content (video set) is eight, the quality assessment values of the eight respective videos contained in the video subset are individual video quality values, and a value obtained by dividing the sum of the individual video quality values of the video subset by eight, which is the number of videos contained in the video subset, is the average video quality value.

FIG. 8 is a view for conceptually explaining the relationship between the video set and the video subset. As shown in FIG. 8, the video subset means a specific video set used for video quality assessment cut of a video set serving as a set containing an infinite number of videos, i.e., a set of arbitrary videos.

There is also known a conventional objective quality assessment method of detecting quality degradation caused by video encoding or packet loss degradation, and estimating the video quality assessment value of the video (non-patent literature 3 and patent literature 1). The video quality assessment value indicates the quality assessment value of each video content to be estimated, and is defined by a value of 1 to 5 (as described in the description of the subjective quality assessment method, 9- or 11-grade assessment may be adopted, and the quality assessment value may be designated by another range of, e.g., 1 to 9 or 0 to 100).

As described above, most conventional subjective quality assessment methods estimate a video quality assessment value using packets or video signals (pixel values). Non-patent literature 2 and patent literature 1 describe techniques for estimating a video quality assessment value from only header information of packets. Non-patent literature 3 describes a technique for estimating a video quality assessment value from video signals.

The relationship between the video frame type and the GoP (Group of Picture) structure of an encoded video when transmitting compressed video frames, and the relationship between the video frame type and the quality assessment value of an encoded video will be explained.

<Video Frame Type>

Compressed video frames are classified into three types: I-frame (Intra-frame), P-frame (Predictive-frame), and B-frame (Bi-directional frame).

The I-frame is a frame which is independently encoded within it regardless of preceding and succeeding frames. The P-frame is a frame which is predicted from a past frame within consecutive frames, i.e., encoded by forward prediction. The B-frame is a frame which is encoded by prediction from past and future frames in two directions.

<Relationship Between GoP Structure and Video Frame Type>

The GoP structure of an encoded video represents the interval at which video frames of the respective video frame types are arranged.

For example, FIG. 24 is a view for conceptually explaining a GoP structure represented by M=3 and N=15 (M is an interval corresponding to the number of frames in one-way prediction, and N is the interval between I-frames).

In an encoded video having the GoP structure as shown in FIG. 24, two B-frames are inserted between an I-frame and a P-frame and between P-frames, and the interval between I-frames is 15 frames.

<Bit Amounts of Respective Video Frame Types>

The Bit amounts of compressed video frames of the respective video frame types will be explained.

The bit amounts of video frames of the respective video frame types are defined as the I-frame bit amount (BitsI), P-frame bit amount (BitsP), and B-frame bit amount (BitsB). The bit amounts of the respective video frame types are indices indicating bit amounts used for the respective video frame types (I-, B-, and P-frames) when, for example, encoding a 10-sec video content to be assessed.

More specifically, when a 10-sec video content is encoded at 30 fps (frames/second), the total number of video frames of an encoded video is 300, and 20 I-frames exist in all the 300 frames. Assuming that the bit amount necessary to encode the 20 I-frames is 10,000 bits, the I-frame bit amount is 500 bits/I-frame from 10,000 bits/20 I-frames.

Similarly, 80 P-frames exist in all the 300 frames. Assuming that the bit amount necessary to encode the 80 P-frames is 8,000 bits, the P-frame bit amount is 100 bits/P-frame from 8,000 bits/80 P-frames. Also, 200 B-frames exist in all the 300 frames. Assuming that the bit amount necessary to encode the 200 B-frames is 10,000 bits, the B-frame bit amount is 50 bits/B-frame (10,000 bits/200 B-frames).

At this time, the 28,000-bit amount is necessary to encode the 10-sec video content (300 frames in total), so the bit rate is 2,800 b/s (2.8 kbps) from 28,000 bits/10 seconds.

<Bit Amount Characteristics for Respective Video Frame Type>

The frame maximum bit amount, frame minimum bit amount, and frame average bit amount indicating bit amount characteristics for the respective video frame types will be defined and explained.

The maximum value of the frame bit amount is defined as the frame maximum bit amount, the minimum value is defined as the frame minimum bit amount, and the average value is defined as the frame average bit amount with respect to the bit rate (BR) or the number of lost video frames (DF) in a plurality of video contents (for example, a video set of eight video contents). In correspondence with the respective video frame types, these values are represented by the I-frame maximum bit amount (BitsImax), I-frame minimum bit amount (BitsImin), I-frame average bit amount (BitsIave), P-frame maximum bit amount (BitsPmax), P-frame minimum bit amount (BitsPmin), P-frame average bit amount (BitsPave), B-frame maximum bit amount (BitsBmax), B-frame minimum bit amount (BitsBmin), and B-frame average bit amount (BitsBave).

For example, the I-frame bit amounts of the eight video contents encoded at the same bit rate are "450 bits", "460 bits", "470 bits", "480 bits", "490 bits", "500 bits", "510 bits", and "520 bits", respectively. In this case, since the maximum value of the I-frame bit amount is "520 bits", the I-frame maximum bit amount is "520". Since the minimum value of the I-frame bit amount is "450 bits", the I-frame minimum bit amount is "450". Since the average value of the I-frame bit amount is "485 bits", the I-frame average bit amount is "485".

As for the frame maximum bit amounts, frame minimum bit amounts, and frame average bit amounts of B- and P-frames, the maximum values, minimum values, and average values of the frame bit amounts of the respective video frame types are defined as the frame maximum bit amounts, frame minimum bit amounts, and frame average bit amounts with respect to the bit rate (BR) or the number of lost video frames (DF) in a plurality of video contents.

<Bit Amounts of Respective Video Frame Types and Influence on Video Quality>

The influence of bit amounts assigned to the respective video frame types on video quality in video encoding will be explained with reference to the accompanying drawings.

FIGS. 9A to 9C are graphs showing the bit amounts of the respective video frame types (I-, P-, and B-frames) of a video to undergo video quality estimation that are plotted along the abscissa, and the video quality values of respective video contents that are plotted along the ordinate when video contents for predetermined seconds are encoded at the same bit rate (in this example, 10-sec video contents at 10 Mbps with 300 video frames).

As shown in FIGS. 9A to 9C, the relationship between the bit amounts of the respective video frame types and the video quality assessment value represents that, as a result of comparison at the same bit rate, a video content having a small I-frame bit amount exhibits a low video quality assessment value and a video content having a large I-frame bit amount exhibits a high video quality assessment value. The result of comparison at the same bit rate for the P- and B-frame bit amounts reveals that video contents having small P- and B-frame bit amounts exhibit high video quality assessment values and video contents having large P- and B-frame bit amounts exhibit low video quality assessment values.

Even in videos having the same bit rate, the bit amounts of the respective video frame types affect video quality.

<Relationship between Bit Amount Characteristics of Respective Video Frame Types and Video Quality>

FIGS. 10A and 10B are graphs conceptually showing the relationship between the bit rate of each video in a video subset and the frame bit amounts of the respective video frame types. The relationship between the bit rate and the P-frame bit amount shown in FIG. 10B is similar to that between the bit rate and the B-frame bit rate, so the relationship between the bit rate and the B-frame bit rate will not be illustrated.

As shown in FIGS. 10A and 10B, depending on the video, the frame bit amount has different characteristics even in videos having the same bit rate. More specifically, even if videos have the same bit rate, the relationship between the frame maximum bit amount, the frame minimum bit amount, and the frame average bit amount differs between the respective video frame types.

The relationship between the bit rate of a video and the frame bit amounts of the respective video frame types affects video quality. The video quality differs between even videos having the same bit rate.

FIG. 11 is a graph for conceptually explaining the above-mentioned influence of the bit amounts of the respective video frame types on video quality.

FIG. 11 shows the relationship between the bit rate and the video quality value. In FIG. 11, circles, triangles, and squares respectively represent a maximum video quality value (Vqmax) which is maximum among the video quality values of videos having the same bit rate out of videos in a video subset, a minimum video quality value (Vqmin) which is minimum, and an average video quality value (Vqave) which is a value obtained by dividing the sum of video quality values by the number of videos.

As shown in FIG. 11, the video quality val has a difference between the maximum video quality value and the minimum video quality value even in videos having the same bit rate. That is, the video quality value of a video to be estimated does not always coincide with the average video quality value of a video having the same bit rate as that of the video to be estimated. The difference between the video quality value and the average video quality value depends on bit amounts assigned to the respective video frame types of the video to be estimated. This difference between the video quality value and the average video quality value is defined as a difference video quality value (dVq).

Hence, the difference video quality value (dVq) is generated in videos having the same bit rate depending on the relationship between the bit rate of a target video and the characteristics of bit amounts assigned to the respective video frame types.

PRIOR ART LITERATURES

Patent Literature

Patent Literature 1: Japanese Patent Laid-Open No. 2006-033722
Non-Patent Literatures
Non-Patent Literature 1: ITU-T Recommendation P.910
Non-Patent Literature 2: K. Yamagishi and T. Hayashi, "Parametric Packet-Layer Model for Monitoring Video Quality of IPTV Services", IEEE ICC 2008, CQ04-3, May 2008
Non-Patent Literature 3: ITU-T Recommendation J.247
Non-Patent Literature 4: DVD Document A001 Rev. 7 (Specification for the use of Video and Audio Coding in Broadcasting Applications based on the MPEG-2 Transport Stream)
Non-Patent Literature 5: ANSI/SCTE 128 2008 (AVC Video System and Transport Constraints for Cable Television)
Non-Patent Literature 6: Ushiki and Hayashi, "Computational Cost Reduction of Picture Type Estimation Method using TS Header Information", IEICE Technical Report, CQ2008-32, September 2008

SUMMARY OF THE INVENTION

Problem to be Solved by the Invention

However, the techniques disclosed in patent literature 1 and non-patent literature 2 estimate video quality based on the bit rate or packet loss degradation information of a video. These techniques do not estimate video quality in consideration of bit amounts assigned to the respective video frame types.

The video quality value is affected by the bit amounts of the respective video frame types (I-, P-, and B-frames). Hence, as the first problem, the conventional objective quality estimation methods as described in patent literature 1 and non-patent literature 2 can estimate the average video quality based on the bit rate and packet loss degradation information, but cannot estimate the video quality value for each video content having different characteristics of bit amounts assigned to the respective video frame types.

The technique disclosed in non-patent literature 3 estimates a video quality assessment value from video signals (pixel values) viewed by a user. This technique can derive a video quality assessment value for each video content, but uses source video signals free from any encoding degradation or packet loss. Therefore, as the second problem, it is difficult to employ this technique in an environment where it is hard to obtain source video signals, especially in a user house provided with video communication services.

When estimating a video quality assessment value using video signals, arithmetic processing needs to be performed for all pixels which form a video frame. Executing arithmetic processing for many pixels greatly increases the arithmetic processing cost.

The present invention has been made to solve the first and second problems, and has as its object to provide a video quality estimation apparatus and video quality estimation method capable of estimating the video quality values of respective video contents even having the same bit rate in consideration of the bit amounts of the respective video frame types while suppressing the arithmetic processing cost.

Means of Solution to the Problem

To achieve the above objects, according to the present invention, there is provided a video quality estimation apparatus comprising a packet analysis unit that derives a bit rate of an input encoded video packet, and derives a bit amount of an encoded video for at least one video frame type out of a plurality of video frame types, a frame characteristic estimation unit that derives a frame characteristic representing a characteristic of the bit amount of each video frame type from the bit rate derived by the packet analysis unit, and an encoding quality estimation unit that derives a video quality value based on the bit rate of the encoded video packet and the bit amount of each video frame type that have been derived by the packet analysis unit, and the frame characteristic of each video frame type that has been derived by the frame characteristic estimation unit.

Effects of the Invention

According to the present invention, the video quality value of each video of a video content in video communication services can be estimated based on a bit rate extracted from a packet, and bit amounts derived for the respective video frame types after specifying video frame types from header information of the packet.

Further, according to the present invention, the video quality value of each video in video communication services can be estimated based on header information of an input packet in consideration of all the bit rate extracted from the input packet, the number of lost video frames, and bit amounts derived for the respective video frame types after specifying video frame types.

According to the present invention, the video communication service provider can easily monitor the video quality value of each video in video communication services that is actually viewed by the user. Therefore, the video communication service provider can easily determine whether a service being provided maintains a predetermined or higher quality for the user.

The video communication service provider can grasp and manage the actual quality of a service being provided in more detail than in the conventional technique.

According to the present invention, deriving the video quality value of each video, no arithmetic processing need be executed for all pixels which form the video frame of the video. In other words, the video quality value can be derived by performing arithmetic processing for packet header information which is a relatively small amount of information. This can suppress the arithmetic processing cost.

BRIEF DESCRIPTION OF DRAWINGS

FIG. 6 is a table exemplifying a quality characteristic coefficient database stored in the video quality estimation apparatus according to the first embodiment of the present invention;

FIG. 7 is a table for conceptually explaining extraction of a video frame start position;

FIG. 19 is a table exemplifying a quality characteristic coefficient database stored in the video quality estimation apparatus according to the second embodiment of the present invention;

FIG. 23 is a table exemplifying a quality characteristic coefficient database stored in the video quality estimation apparatus according to the third embodiment of the present invention;

BEST MODE FOR CARRYING OUT THE INVENTION

Embodiments of the present invention will now be described with reference to the accompanying drawings.

First Embodiment

A video quality estimation apparatus according to the first embodiment of the present invention implements objective video quality assessment by deriving a video quality value quantitatively representing video quality using the bit rate and the bit amounts of the respective video frame types which affect video quality regarding video communication.

For example, in the embodiment, to implement objective video quality assessment in video communication such as an IPTV service, video distribution service, or videophone service provided via an IP network such as the Internet, the video quality estimation apparatus analyzes an encoded video packet contained in a packet, and derives a video quality value quantitatively representing a feature amount which affects video quality regarding these video communication services.

Figure 1:
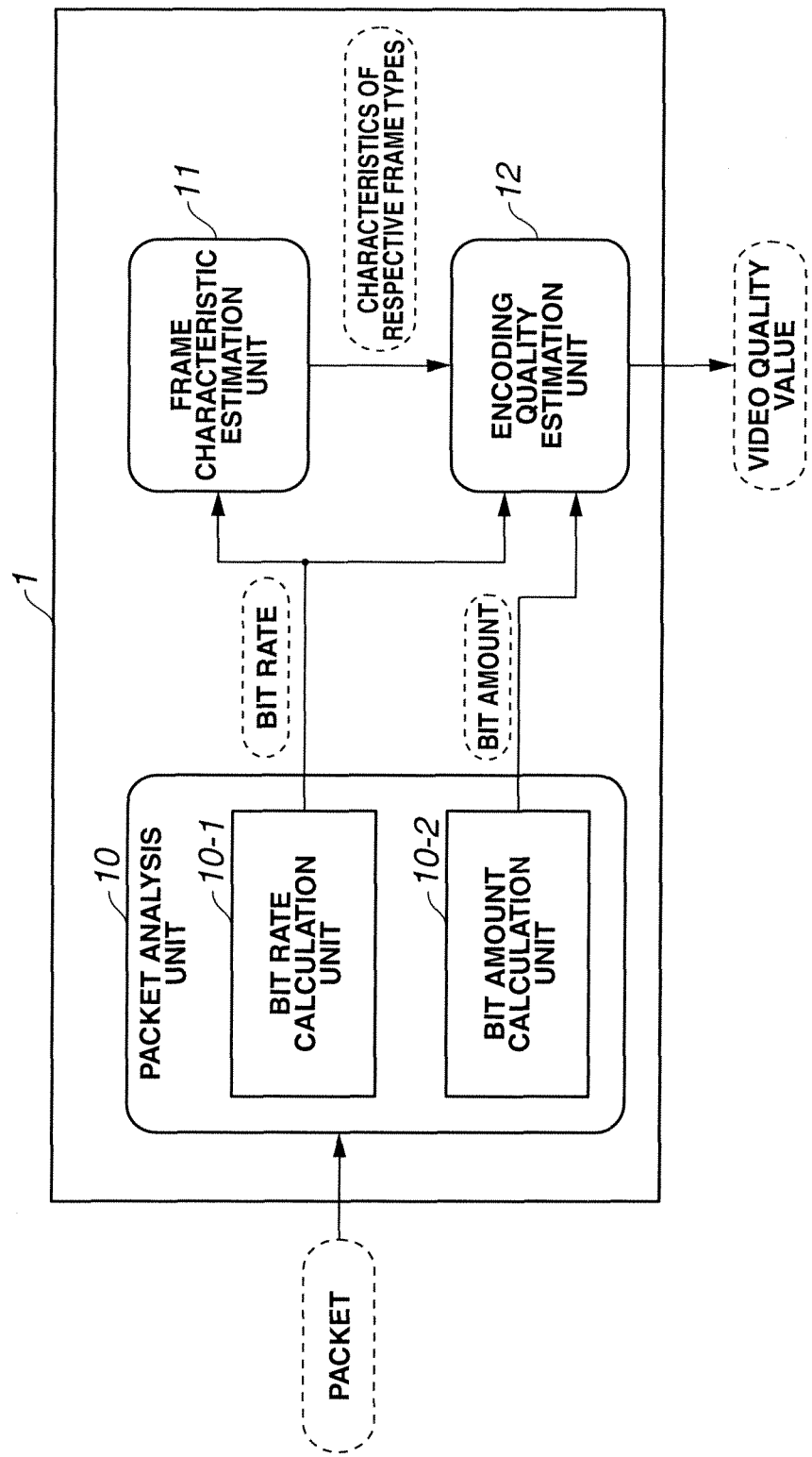
FIG. 1 is a block diagram showing the arrangement of a video quality estimation apparatus according to the first embodiment of the present invention.

As shown in FIG. 1, a video quality estimation apparatus 1 according to the embodiment includes a packet analysis unit 10, frame characteristic estimation unit 11, and encoding quality estimation unit 12.

The packet analysis unit 10 includes a bit rate calculation unit 10-1 which derives the bit rate of an encoded video packet contained in an input packet, and a bit amount calculation unit 10-2 which derives the bit amounts of the respective video frame types. The packet analysis unit 10 outputs the bit rate derived by the bit rate calculation unit 10-1, and the bit amounts of the respective video frame types derived by the bit amount calculation unit 10-2.

The frame characteristic estimation unit 11 receives the bit rate output from the packet analysis unit 10, and derives and outputs frame characteristics representing the bit amount characteristics of the respective frame types.

The encoding quality estimation unit 12 derives a video quality value based on the bit rate and the bit amounts of the respective video types which have been output from the packet analysis unit 10, and the frame characteristics of the respective video frame types output from the frame characteristic estimation unit 11.

The building components of the video quality estimation apparatus 1 according to the embodiment will be explained in detail with reference to FIGS. 2 to 4.

Figure 2:
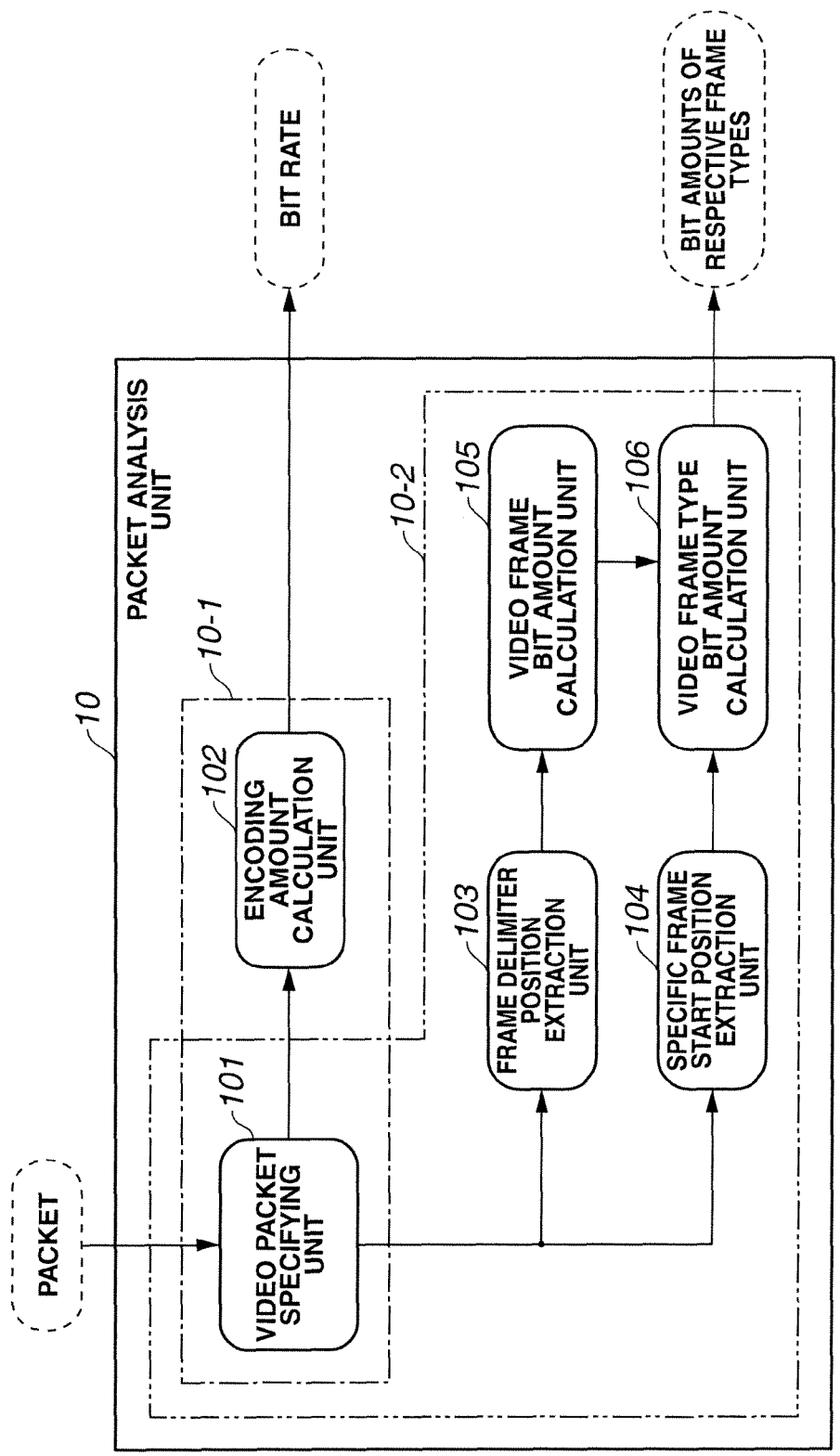
FIG. 2 is a block diagram showing the arrangement of a packet analysis unit in the video quality estimation apparatus according to the first embodiment of the present invention.

As shown in FIG. 2, the packet analysis unit 10 includes a video packet specifying unit 101, encoding amount calculation unit 102, frame delimiter position extraction unit 103, specific frame start position extraction unit 104, video frame bit amount calculation unit 105, and video frame type bit amount calculation unit 106. The bit rate calculation unit 10-1 is formed from the video packet specifying unit 101 and encoding amount calculation unit 102. The bit amount calculation unit 10-2 is formed from the video packet specifying unit 101, frame delimiter position extraction unit 103, specific frame start position extraction unit 104, video frame bit amount calculation unit 105, and video frame type bit amount calculation unit 106.

The video packet specifying unit 101 specifies an arbitrary encoded video packet contained in an input packet based on a packet ID (PID) unique to the encoded video packet.

An encoded video packet can be specified using, e.g., a payload type in an RTP (Real-time Transport Protocol) packet, PID in a TS (Transport Stream) packet, or Stream ID in a PES (Packetized Elementary Stream) header. The video packet specifying unit 101 may also have a function of extracting an RTP sequence number in the RTP packet and CC (Continuity Counter: 4-bit counter) in the TS packet.

The encoding amount calculation unit 102 derives a bit rate represented by the bit amount of encoded video packet per unit time that is specified by the video packet specifying unit 101.

For example, encoded data of a video or audio is identified by PID described in a TS packet header. The encoding amount calculation unit 102 counts TS packets having the PID of video data, and multiplies the count by the data length (188 bytes in general) of the TS packet to calculate a bit amount per unit time, thereby deriving the bit rate (BR).

The frame delimiter position extraction unit 103 derives information indicating the delimiter of a video frame from an encoded video packet specified by the video packet specifying unit 101.

For example, the packet contains information such as an IP header, UDP (User Datagram Protocol) header, RTP, TS header, PES header, and ES (Elementary Stream). Of these kinds of information, Payload_Unit_Start_Indicator (to be referred to as "PUSI") in the TS header is a flag indicating the presence/absence of the PES header. When one PES contains one frame (one video frame is often stored in one PES in video encoding used in TV broadcasting), PUSI serves as information indicating the start of a video frame. By extracting such information contained in a packet, the frame delimiter position extraction unit 103 derives information indicating the delimiter of a video frame.

The video frame start position deriving operation will be explained in detail with reference to FIG. 7 which is a table for conceptually explaining extraction of a video frame start position.

As shown in FIG. 7 (left column represents the RTP sequence number, and the second to eighth columns from the left represent the CC numbers of TS), TS containing PUSI indicates the start position of a frame. As information indicating the delimiter position of a frame, it suffices to store the RTP sequence number of the start position of a frame, the ordinal number of a packet counted from the beginning of an analysis section, or the ordinal number of the frame of a packet containing PUSI. As the frame counting method, PUSIs in the analysis section are counted.

When the PES header is usable, PTS (Presentation Time Stamp) or DTS (Decoding Time Stamp) serves as information indicating the delimiter position of a frame, and thus the same processing as that for PUSI is executed. Similarly, when ES is usable, it stores frame information, so the same processing as that for PUSI is executed.

The specific frame start position extraction unit 104 derives information indicating the start position of a specific video frame from an encoded video packet specified by the video packet specifying unit 101.

The specific frame start position extraction unit 104 in the video quality estimation apparatus according to the embodiment is premised on that it derives pieces of information indicating the start positions of "I-frame", "P-frame", and "B-frame" when ES information is usable, and information indicating the start position of "I-frame" when no ES information is usable because of encryption.

When ES information is usable, a bit indicating frame information exists in an H.264 or MPEG2 bit string (for example, this bit is Primary_pic_type or Slice_type for H.264). The frame delimiters of "I-frame", "P-frame", and "B-frame" can be identified by the RTP sequence number of a packet containing the information, or the ordinal number of a packet counted from the beginning of an analysis section.

When no ES information is usable, information indicating the start position of an I-frame is RAI (Random_Access_Indicator) or ESPI (Elementary_Stream_Priority_Indicator) in the TS header serving as a flag indicating the start position of an I-frame or IDR (Instantaneous Decoder Refresh) frame (see non-patent literatures 4 and 5).

Since RAI or ESPI serves as information indicating the start position of an I-frame or IDR frame, the delimiter of an I-frame can be discriminated from those of other frames.

Even if neither RAI nor ESPI indicates the start position of an I-frame or IDR frame, the specific frame start position extraction unit 104 specifies the position of an I-frame by calculating the data amount of each frame using PUSI representing a frame start position extracted by the frame delimiter position extraction unit 103.

More specifically, the information amount of an I-frame is larger than those of other video frames. Based on this basic feature, a video frame having a large data amount out of video frames in a packet is specified as an I-frame in conversion from the GoP length (the number of frames between I-frames).

For example, when the number of video frames in a packet is 300 and the GoP length is 15, the number of I-frames is 20. Hence, 20 video frames each having a large data amount out of video frames in a packet can be specified as I-frames.

To indicate the position of a specified I-frame, an RTP sequence number at the start position of a frame or the ordinal number of a packet counted from the beginning of an analysis section is stored.

If no ES information is usable and the video frame type is not dynamically changed, it is also possible to acquire the start position of an I-frame based on RAI or ESPI, and determine frames as "P-frames" and "B-frames" in order using the start position of an I-frame as an origin in a default GoP structure (e.g., M=3 and N=15).

The bit amounts of "I-frame", "P-frame", and "B-frame" generally have a relation of (BitsI)>(BitsP)>(BitsB). Thus, the video frame type may be determined in order from a frame having a large bit amount.

The video frame bit amount calculation unit 105 counts TS packets having the PID of video data between frame delimiter positions extracted by the frame delimiter position extraction unit 103. The video frame bit amount calculation unit 105 multiplies the count by the data length (188 bytes in general) of the TS packet, deriving the bit amount of each video frame. Also, the video frame bit amount calculation unit 105 stores, in correspondence with the bit amount of each video frame, a frame delimiter position (information such as an RTP sequence number at the start position of a frame, the ordinal number of a packet counted from the beginning of an analysis section, or the ordinal number of the frame of a packet containing PUSI) extracted by the frame delimiter position extraction unit 103.

The video frame type bit amount calculation unit 106 derives the I-frame bit amount (BitsI), P-frame bit amount (BitsP), and B-frame bit amount (BitsB) from frame delimiter position information, the bit amounts of the respective video frames that have been calculated by the video frame bit amount calculation unit 105, and the positions of respective video frames that have been specified by the specific frame start position extraction unit 104.

The arrangement of the video frame types of an encoded video in the GoP structure changes depending on the encoding situation. For example, an encoded video may be formed from only I-frames or I- and P-frames. For this reason, the video frame type bit amount calculation unit 106 derives the bit amount of each video frame of at least one video frame type.

Figure 3:
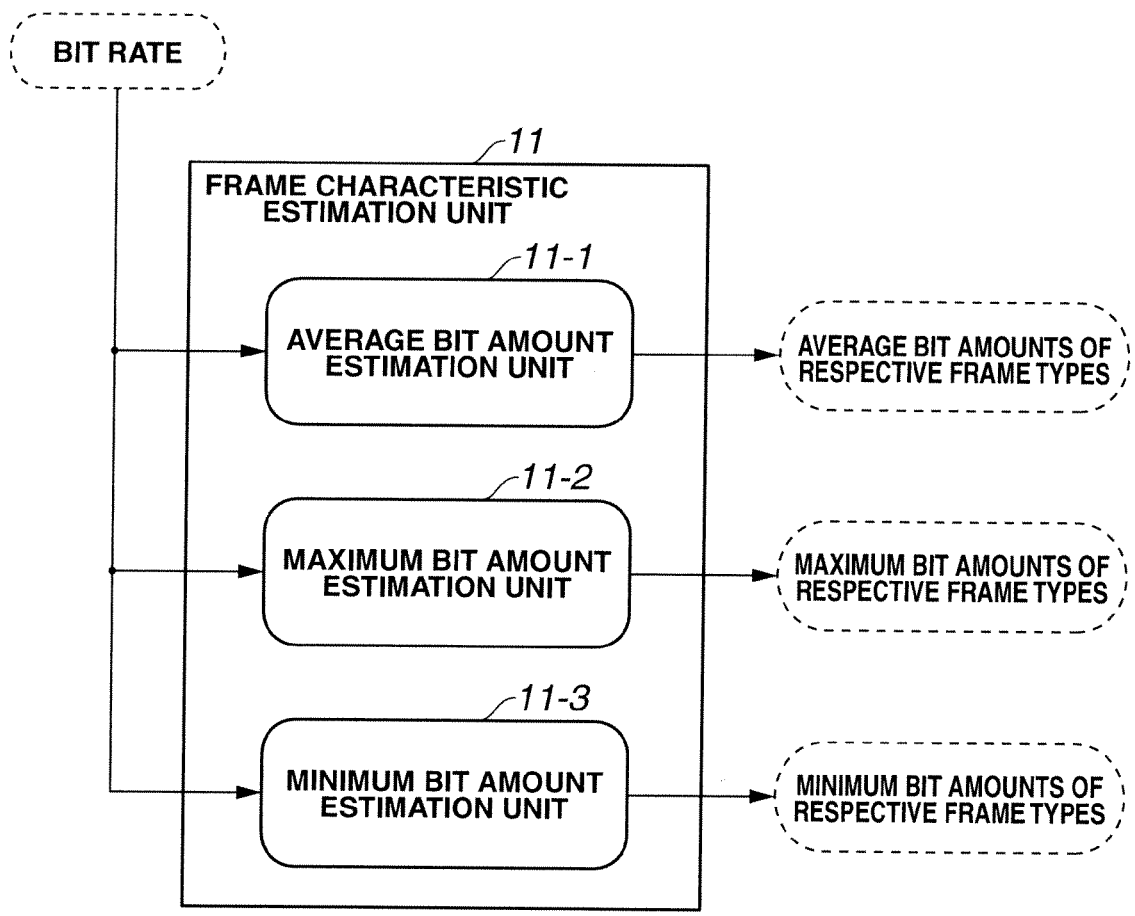
FIG. 3 is a block diagram showing the arrangement of a frame characteristic estimation unit in the video quality estimation apparatus according to the first embodiment of the present invention.

As shown in FIG. 3, the frame characteristic estimation unit 11 of the video quality estimation apparatus 1 according to the embodiment includes an average bit amount estimation unit 11-1 which receives a bit rate output from the packet analysis unit 10 and derives average bit amounts (Bits(I, P, B)ave) serving as characteristics (frame characteristics) regarding the bit amounts of the respective video frame types, a maximum bit amount estimation unit 11-2 which derives the maximum bit amounts (Bits(I, P, B)max) of the respective video frame types, and a minimum bit amount estimation unit 11-3 which derives the minimum bit amounts (Bits(I, P, B)min) of the respective video frame types.

Note that the arrangement of the video frame types contained in a video to be estimated depends on the encoding situation. A video may be formed from only I-frames, I- and P-frames, or all frame types of I-, P-, and B-frames. The arrangement changes depending on the video encoding situation. Thus, the frame characteristic estimation unit 11 derives the frame characteristics of at least one video frame type, i.e., the frame characteristics of some or all video frame types.

Figure 10A:
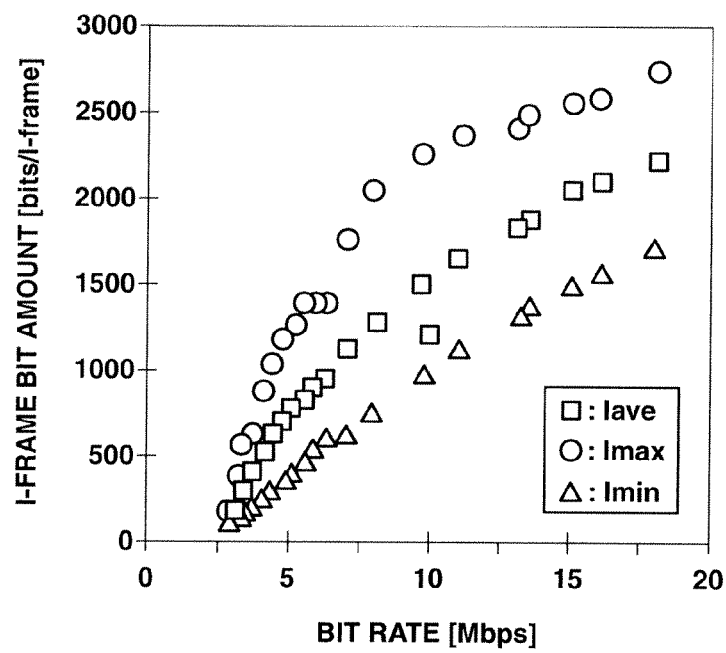
FIG. 10A is a graph for conceptually explaining the relationship between the bit rate and the I-frame average bit amount, I-frame maximum bit amount, and I-frame minimum bit amount.

For example, when deriving the frame characteristics of I-frames, i.e., the I-frame average bit amount (BitsIave), I-frame maximum bit amount (BitsImax), and I-frame minimum bit amount (BitsImin), the average bit amount estimation unit 11-1, maximum bit amount estimation unit 11-2, and minimum bit amount estimation unit 11-3 receive a bit rate derived by the encoding amount calculation unit 102, and derive frame characteristics by estimation from characteristics based on the relationship between the bit rate and the I-frame bit amount as shown in FIG. 10A.

Figure 10B:
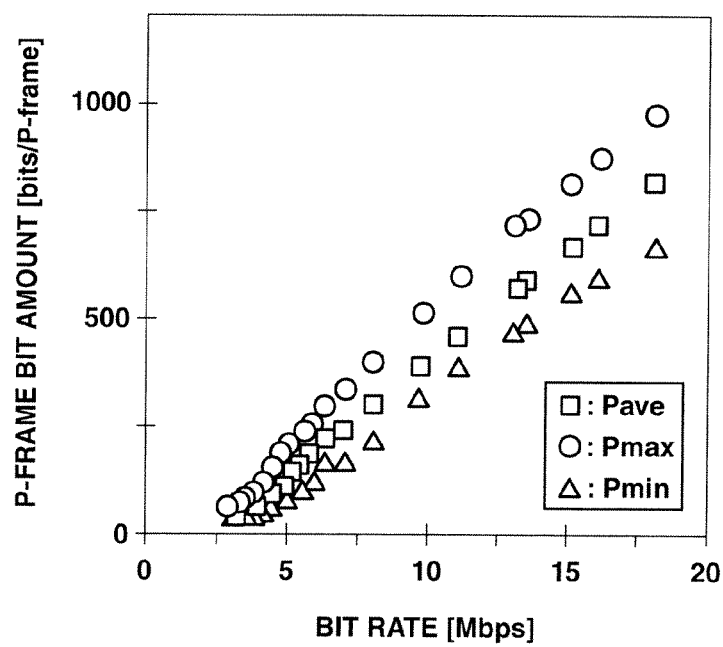
FIG. 10B is a graph for conceptually explaining the relationship between the bit rate and the P-frame average bit amount, P-frame maximum bit amount, and P-frame minimum bit amount.

Also, when deriving the frame characteristics of P- and B-frames, the average bit amount estimation unit 11-1, maximum bit amount estimation unit 11-2, and minimum bit amount estimation unit 11-3 receive a bit rate derived by the encoding amount calculation unit 102, and derive frame characteristics by estimation from characteristics based on the relationship between the bit rate and the P-frame bit amount as shown in FIG. 10B (similar to the relationship between the bit rate and the B-frame bit amount).

Figure 4:
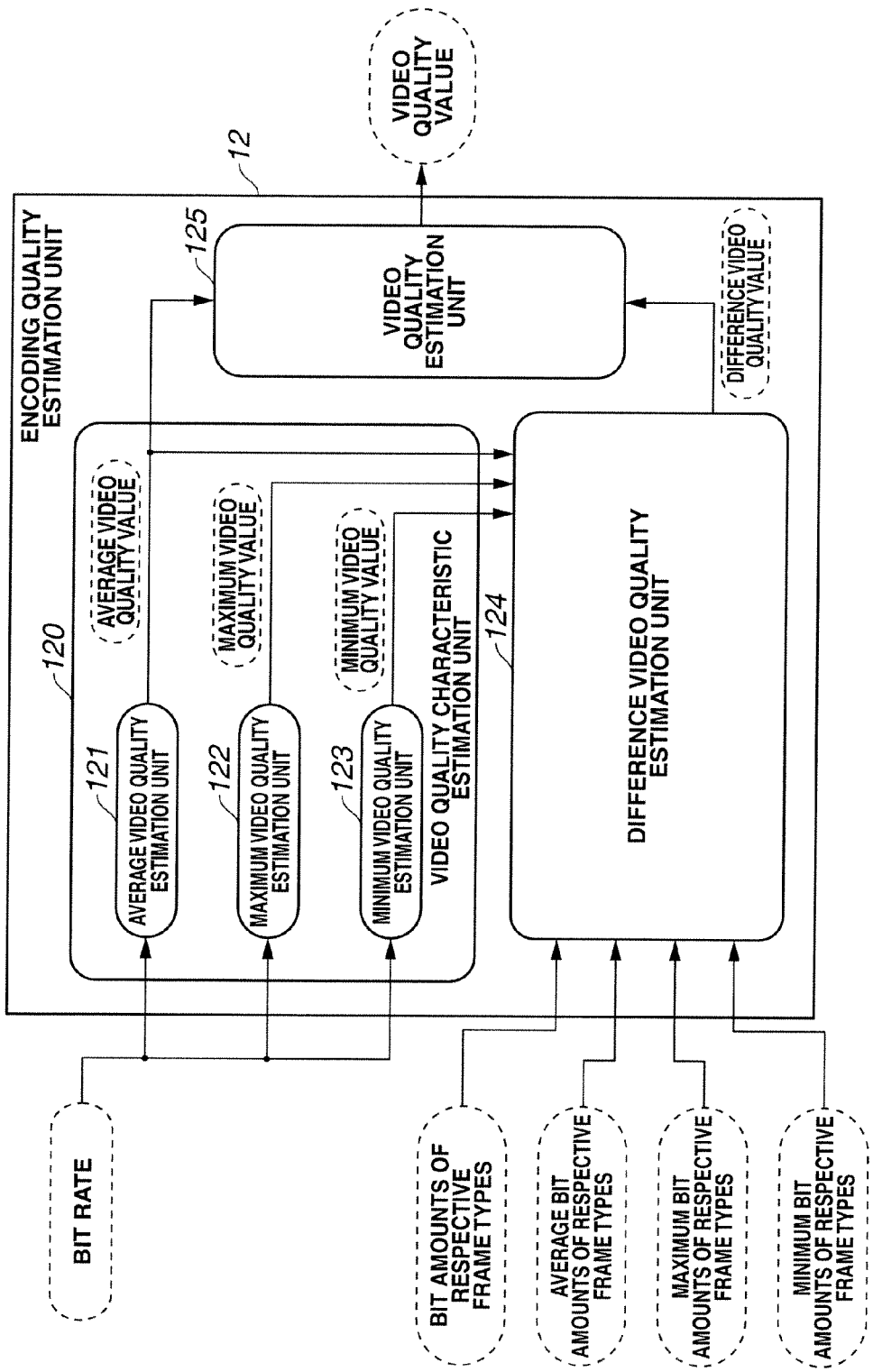
FIG. 4 is a block diagram showing the arrangement of an encoding quality estimation unit in the video quality estimation apparatus according to the first embodiment of the present invention.

As shown in FIG. 4, the encoding quality estimation unit 12 of the video quality estimation apparatus 1 according to the embodiment includes an average video quality estimation unit 121, maximum video quality estimation unit 122, minimum video quality estimation unit 123, difference video quality estimation unit 124, and video quality estimation unit 125.

Figure 11:
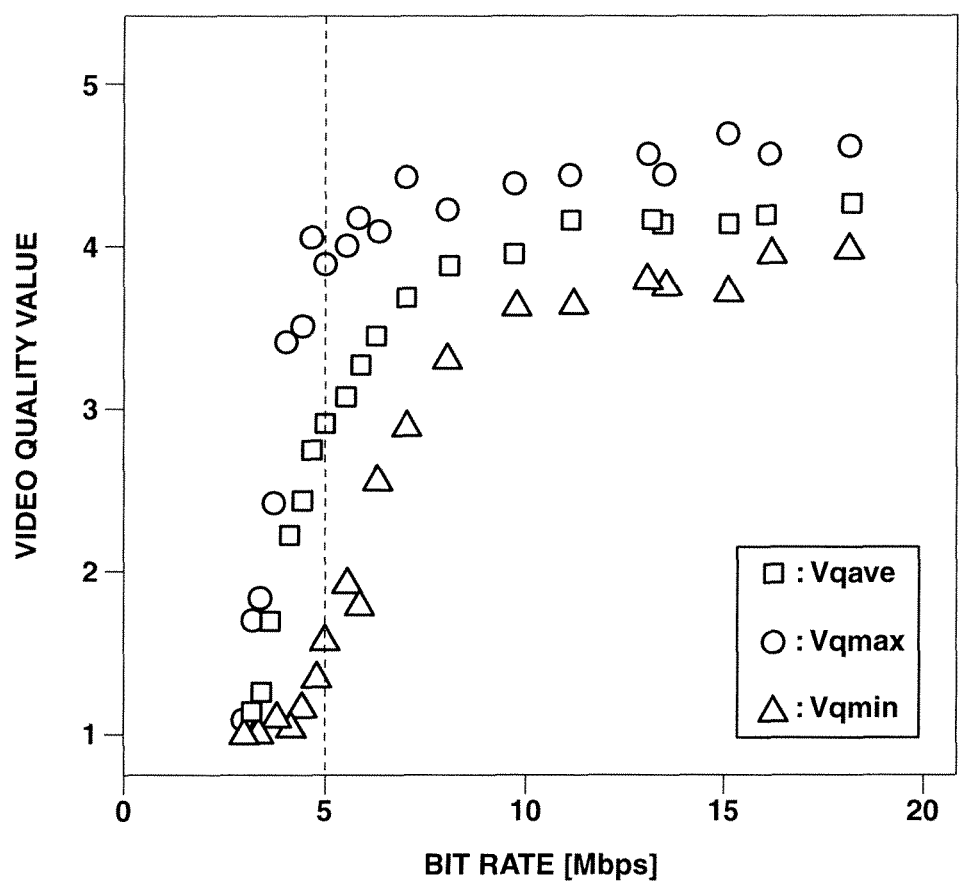
FIG. 11 is a graph for conceptually explaining the relationship between the bit rate and the average video quality value, maximum video quality value, and minimum video quality value.

The average video quality estimation unit 121, maximum video quality estimation unit 122, and minimum video quality estimation unit 123 receive a bit rate output from the packet analysis unit 10, and derive an average video quality value (Vqave), maximum video quality value (Vqmax), and minimum video quality value (Vqmin) using characteristics based on the relationship between the bit rate and the video quality value (Vq) as shown in FIG. 11.

The difference video quality estimation unit 124 receives the average video quality value (Vqave), maximum video quality value (Vqmax), and minimum video quality value (Vqmin) which have been derived by the average video quality estimation unit 121, maximum video quality estimation unit 122, and minimum video quality estimation unit 123, the bit amounts (BitsI, BitsP, and BitsB) of the respective frame types that have been derived by the bit amount calculation unit 10-2, and frame characteristics (BitsIave, BitsImax, BitsImin, BitsPave, BitsPmax, BitsPmin, BitsBave, BitsBmax, and BitsBmin) derived by the frame characteristic estimation unit 11. The difference video quality estimation unit 124 then derives a difference video quality value (dVq) serving as the difference between the video quality value of a video to undergo video quality estimation and the average video quality value.

A method of deriving the difference video quality value (dVq) will be explained.

Figure 9A:
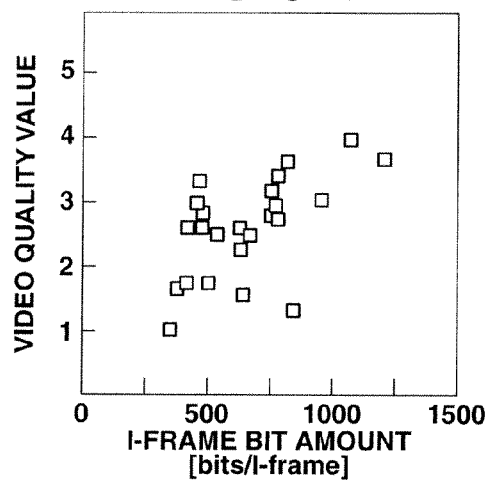
FIG. 9A is a graph for conceptually explaining the relationship between the I-frame bit amount and the video quality value.
Figure 9B:
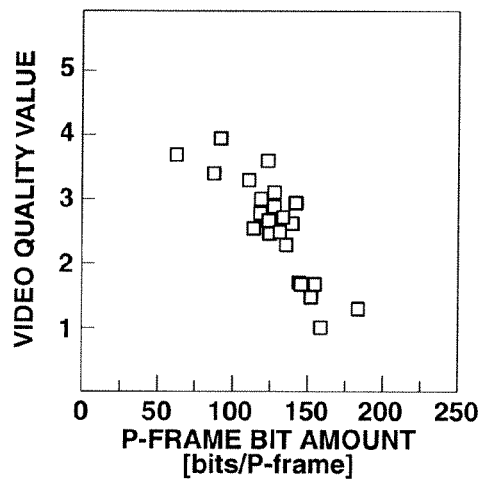
FIG. 9B is a graph for conceptually explaining the relationship between the P-frame bit amount and the video quality value.
Figure 9C:
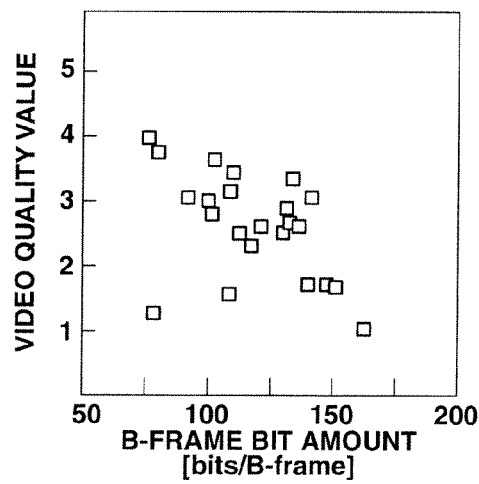
FIG. 9C is a graph for conceptually explaining the relationship between the B-frame bit amount and the video quality value.

For example, when a value indicated by a black star shown in FIG. 11 is the video quality value (Vq) of a video to be estimated, the frame bit amounts of I-, P-, and B-frames to be estimated can be derived from characteristics based on the relationships between the frame bit amount and the video quality value at the same bit rate as shown in FIGS. 9A to 9C. Differences from the average bit amounts of respective frames can be derived from characteristics in the relationships between the bit rate and the frame bit amount as shown in FIGS. 10A and 10B (black stars in FIGS. 10A and 10B). The difference video quality value is calculated using these characteristics.

More specifically, if the I-frame bit amount (BitsI) equals the I-frame average bit amount (BitsIave), the P-frame bit amount (BitsP) equals the P-frame average bit amount (bitsPave), and the B-frame bit amount (BitsB) equals the B-frame average bit amount (BitsBave), the video quality value (Vq) of a video to be estimated equals the average video quality value (Vqave), so no difference video quality value is generated.

If the I-frame bit amount (BitsI) is larger than the I-frame average bit amount (BitsIave), the video quality value (Vq) to be estimated becomes larger than the average video quality value (Vqave) in accordance with the characteristic shown in FIG. 9A. To the contrary, if the I-frame bit amount (BitsI) is smaller than the I-frame average bit amount (BitsIave), the video quality value (Vq) to be estimated becomes smaller than the average video quality value (Vqave).

Therefore, when the I-frame bit amount (BitsI) is larger than the I-frame average bit amount (BitsIave), the difference video quality value (dVq) becomes proportional to (Vqmax−Vqave)×(BitsI−BitsIave)/(BitsImax−BitsIave). When the I-frame bit amount (BitsI) is smaller than the I-frame average bit amount (BitsIave), the difference video quality value (dVq) becomes proportional to (Vqmin−Vqave)·(BitsI−BitsIave)/(BitsImin−BitsIave).

If the frame bit amount (BitsP or BitsB) of a P- or B-frame is larger than the P- or B-frame average bit amount (BitsPave or BitsBave), the video quality value (Vq) to be estimated becomes smaller than the average video quality value (Vqave) in accordance with the characteristic shown in FIG. 9B or 9C. If the P- or B-frame bit amount (BitsP or BitsB) is smaller than the P- or B-frame average bit amount (BitsPave or BitsBave), the video quality value (Vq) to be estimated becomes larger than the average video quality value (Vqave).

When a P-frame is exemplified, if the P-frame bit amount (BitsP) is larger than the P-frame average bit amount (BitsPave), the difference video quality value (dVq) becomes proportional to (Vqmin−Vqave)×(BitsP−BitsPave)/(BitsPmin−BitsPave). If the P-frame bit amount (BitsP) is smaller than the P-frame average bit amount (BitsPave), the difference video quality value (dVq) becomes proportional to (Vqmax−Vgave)−(BitsP−BitsPave)/(BitsPmax−BitsPave).

Note that the characteristic of the difference video quality value (dVq) of a B-frame is the same as the above-described characteristic of a P-frame, and a description thereof will not be repeated.

By using the characteristics of the respective video frame types regarding the difference video quality value (dVq), the difference video quality estimation unit 124 receives the bit rate, the bit amounts of the respective video frame types, and the frame characteristics of the respective video frame types, and derives the difference video quality value (dVq).

The video quality estimation unit 125 derives the video quality value (Vq) of a video to be estimated by adding the average video quality value (Vqave) derived by the average video quality estimation unit 121 and the difference video quality value (dVq) derived by the difference video quality estimation unit 124.

Note that the video quality estimation apparatus 1 according to the embodiment is implemented by installing computer programs in a computer including a CPU (Central Processing Unit), memory, and interface. Various functions of the video quality estimation apparatus 1 are implemented by cooperation between various hardware resources of the computer and the computer programs (software).

The operation of the video quality estimation apparatus 1 according to the embodiment will be explained with reference to FIG. 5.

Figure 5:
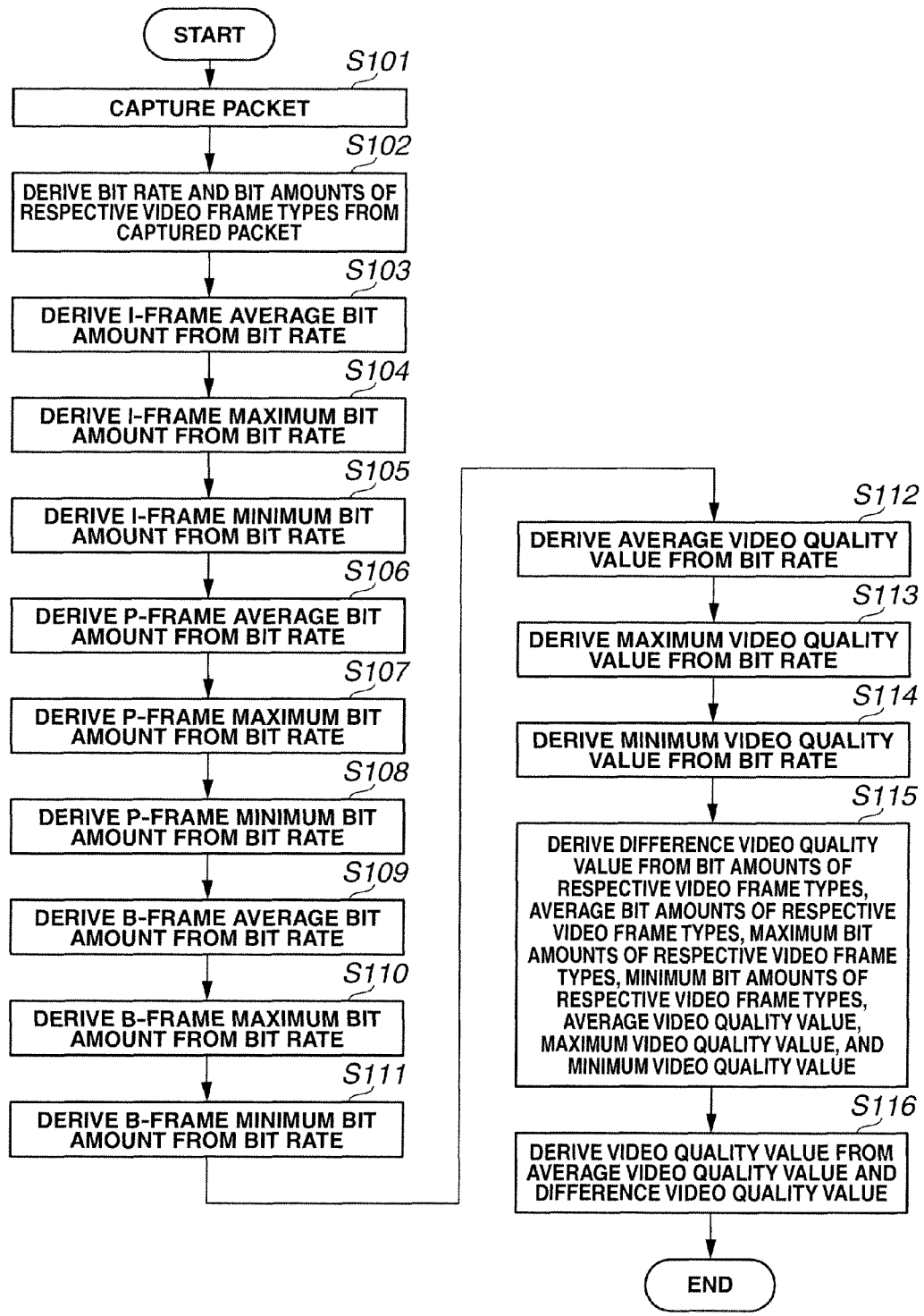
FIG. 5 is a flowchart showing the operation of the video quality estimation apparatus according to the first embodiment of the present invention.
Figure 8:
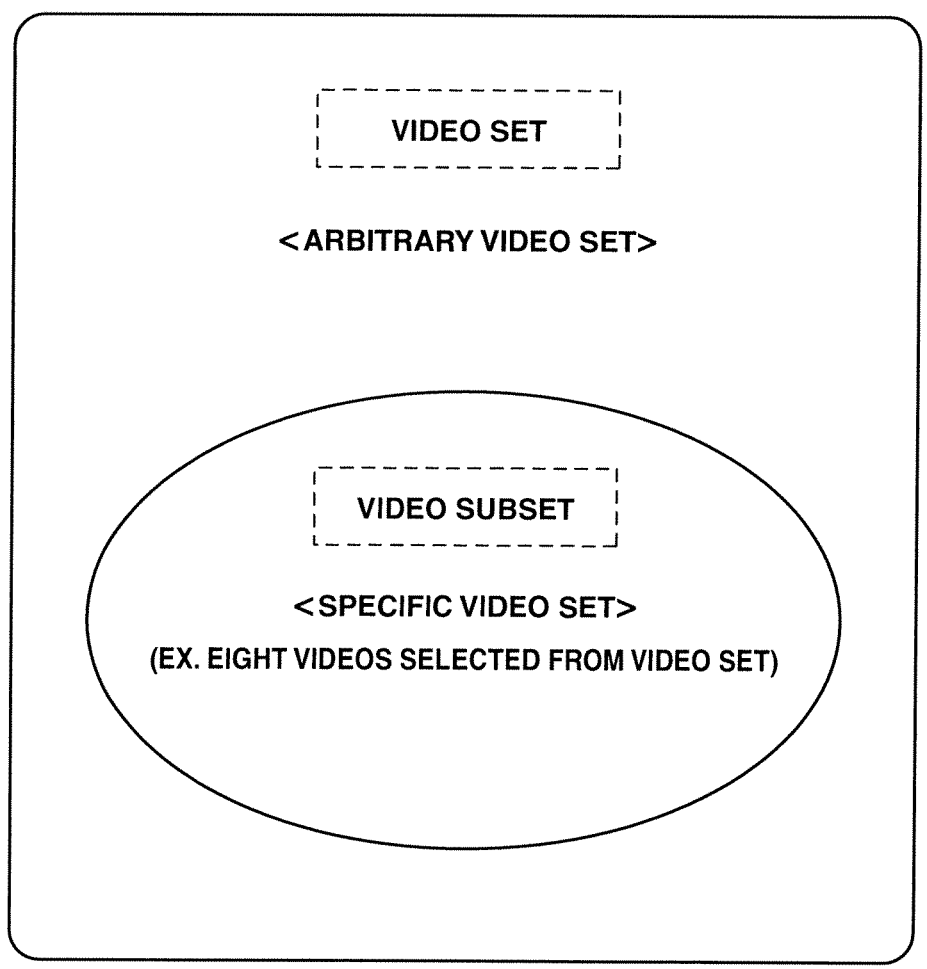
FIG. 8 is a view for conceptually explaining the relationship between a video set and a video subset.

As shown in FIG. 5, the packet analysis unit 10 of the video quality estimation apparatus 1 captures an input packet (S101).

The packet analysis unit 10 derives the bit rate (BR) of an encoded video packet and the bit amounts (BitsI, BitsP, and BitsB) of the respective video frame types from the captured packet (S102).

The average bit amount estimation unit 11-1 of the frame characteristic estimation unit 11 receives the bit rate derived by the packet analysis unit 10, derives an I-frame average bit amount (S103), and outputs it to the difference video quality estimation unit 124.

The average bit amount estimation unit 11-1 can derive an I-frame average bit amount using equation (1) representing a characteristic in which the I-frame average bit amount increases as the bit rate increases:

$$(BitsIave) = v1 + v2 \cdot \exp(-BR/v3) \qquad (1)$$

where (BitsIave) is the I-frame average bit amount, BR is the bit rate, and v1, v2, and v3 are characteristic coefficients.

After the average bit amount estimation unit 11-1 derives the I-frame average bit amount, the maximum bit amount estimation unit 11-2 receives the bit rate derived by the packet analysis unit 10, derives an I-frame maximum bit amount (S104), and outputs it to the difference video quality estimation unit 124.

The maximum bit amount estimation unit 11-2 can derive an I-frame maximum bit amount using equation (2) representing a characteristic in which the I-frame maximum bit amount increases as the bit rate increases:

$$(BitsImax) = v4 + v5 \cdot \exp(-BR/v6) \qquad (2)$$

where (BitsImax) is the I-frame maximum bit amount, BR is the bit rate, and v4, v5, and v6 are characteristic coefficients.

After the maximum bit amount estimation unit 11-2 derives the I-frame maximum bit amount, the minimum bit amount estimation unit 11-3 receives the bit rate derived by the packet analysis unit 10, derives an I-frame minimum bit amount (S105), and outputs it to the difference video quality estimation unit 124.

The minimum bit amount estimation unit 11-3 can derive an I-frame minimum bit amount using equation (3) representing a characteristic in which the I-frame minimum bit amount increases as the hit rate increases:

$$(BitsImin)=v7+v8 \cdot \exp(-BR/v9) \quad (3)$$

where (BitsImin) is the I-frame minimum bit amount, BR is the bit rate, and v7, v8, and v9 are characteristic coefficients.

After deriving the frame characteristics of I-frames, the average bit amount estimation unit 11-1, maximum bit amount estimation unit 11-2, and minimum bit amount estimation unit 11-3 of the frame characteristic estimation unit 11 derive the frame characteristics of P- and B-frames (S106 to S111), and output them to the difference video quality estimation unit 124.

The average bit amount estimation unit 11-1, maximum bit amount estimation unit 11-2, and minimum bit amount estimation unit 11-3 can derive the frame characteristics of P- and B-frames using equations (4) to (9) each representing a relationship in which the bit amount of each frame characteristic increases as the bit rate increases:

$$(BitsPave)=v10+v11 \times (BR) \quad (4)$$

$$(BitsPmax)=v12+v13 \times (BR) \quad (5)$$

$$(BitsPmin)=v14+v15 \times (BR) \quad (6)$$

$$(BitsBave)=v16+v17 \times (BR) \quad (7)$$

$$(BitsBmax)=v18+v19 \times (BR) \quad (8)$$

$$(BitsBmin)=v20+v21 \times (BR) \quad (9)$$

where (BitsPave) is the P-frame average bit amount, (BitsPmax) is the P-frame maximum bit amount, (BitsPmin) is the P-frame minimum bit amount, (BitsBave) is the B-frame average bit amount, (BitsBmax) is the B-frame maximum bit amount, (BitsBmin) is the B-frame minimum bit amount, (BR) is the bit rate, and v10 to v21 are characteristic coefficients.

After the frame characteristic estimation unit 11 derives the frame characteristics of the respective video frame types, the average video quality estimation unit 121 of the encoding quality estimation unit 12 receives the bit rate derived by the packet analysis unit 10, derives an average video quality value (S112), and outputs it to both the difference video quality estimation unit 124 and video quality estimation unit 125.

The average video quality estimation unit 121 can derive an average video quality value using equation (10) representing a characteristic in which the average video quality value increases as the bit rate increases:

$$(Vqave)=v22+v23 \cdot \exp(-BR/v24) \quad (10)$$

where (Vqave) is the average video quality value, BR is the bit rate, and v22, v23, and v24 are characteristic coefficients.

After the average video quality estimation unit 121 derives the average video quality value, the maximum video quality estimation unit 122 receives the bit rate derived by the packet analysis unit 10, derives a maximum video quality value (S113), and outputs it to the difference video quality estimation unit 124.

The maximum video quality estimation unit 122 can derive a maximum video quality value using equation (11) representing a characteristic in which the maximum video quality value increases as the bit rate increases:

$$(Vqmax)=v25+v26 \cdot \exp(-BR/v27) \quad (11)$$

where (Vqmax) is the maximum video quality value, BR is the bit rate, and v25, v26, and v27 are characteristic coefficients.

After the maximum video quality estimation unit 122 derives the maximum video quality value, the minimum video quality estimation unit 123 receives the bit rate derived by the packet analysis unit 10, derives a minimum video quality value (S114), and outputs it to the difference video quality estimation unit 124.

The minimum video quality estimation unit 123 can derive a minimum video quality value using equation (12) representing a characteristic in which the minimum video quality value increases as the bit rate increases:

$$(Vqmin)=v28+v29 \cdot \exp(-BR/v30) \quad (12)$$

where (Vqmin) is the minimum video quality value, BR is the bit rate, and v28, v29, and v30 are characteristic coefficients.

After the minimum video quality estimation unit 123 derives the minimum video quality value, the difference video quality estimation unit 124 receives the average video quality value (Vqave) derived by the average video quality estimation unit 121, the maximum video quality value (Vqmax) derived by the maximum video quality estimation unit 122, the minimum video quality value (Vqmin) derived by the minimum video quality estimation unit 123, the frame characteristics (BitsIave, BitsImax, BitsImin, BitsPave, BitsPmax, BitsPmin, BitsBave, BitsBmax, and BitsBmin) of the respective video frame types that have been derived by the frame characteristic estimation unit 11, and the bit amounts (BitsI, BitsP, and BitsB) of the respective video frame types that have been derived by the bit amount calculation unit of the packet analysis unit 10. Then, the difference video quality estimation unit 124 derives a difference video quality value (S115), and outputs it to the video quality estimation unit 125.

The difference video quality estimation unit 124 can derive a difference video quality value (dVq) using equation (13) representing the characteristic of the difference video quality value (dVq) based on the relationship between the frame bit amounts and average bit amounts of the respective video frame types.

Note that the difference video quality value dVq is not generated when the frame bit amounts and average bit amounts of the respective video frame types are equal to each other.

$$(dVq)=v31+v32 \times X+v33 \times Y+v34 \times Z \quad (13)$$

where (dVq) is the difference video quality value, X is the degree of influence of the I-frame bit amount on the difference video quality value, Y is the degree of influence of the P-frame bit amount on the difference video quality value, Z is the degree of influence of the B-frame bit amount on the difference video quality value, and v31, v32, v33, and v34 are characteristic coefficients.

X, Y, and Z in equation (13) can be derived using equations (14) to (19) each representing the relationship between the frame bit amount and average bit amount of each video frame type.

[For BitsI>BitsIave]

$$X=(Vqmax-Vqave)(BitsI-BitsIave)/(BitsImax-BitsIave) \quad (14)$$

[For BitsI<BitsIave]

$$X=(Vqmin-Vqave)(BitsI-BitsIave)/(BitsImin-BitsIave) \quad (15)$$

[For BitsP<BitsPave]

$$Y=(Vq\text{max}-Vq\text{ave})(\text{Bits}P-\text{Bits}P\text{ave})/(\text{Bits}P\text{max}-\text{Bits}P\text{ave}) \quad (16)$$

[For BitsP>BitsPave]

$$Y=(Vq\text{max}-Vq\text{ave})(\text{Bits}P-\text{Bits}P\text{ave})/(\text{Bits}P\text{max}-\text{Bits}P\text{ave}) \quad (17)$$

[For BitsB<BitsBave]

$$Z=(Vq\text{max}-Vq\text{ave})(\text{Bits}B-\text{Bits}B\text{ave})/(\text{Bits}B\text{max}-\text{Bits}B\text{ave}) \quad (18)$$

[For BitsB>BitsBave]

$$Z=(Vq\text{min}-Vq\text{ave})(\text{Bits}B-\text{Bits}B\text{ave})/(\text{Bits}B\text{min}-\text{Bits}B\text{ave}) \quad (19)$$

As the characteristic coefficients v1 to v34 used in equations (1) to (13), relevant characteristic coefficients are selected from a quality characteristic coefficient database in a storage unit (not shown) arranged in the video quality estimation apparatus 1. FIG. 6 exemplifies the quality characteristic coefficient database. The quality characteristic database describes characteristic coefficients in association with prerequisites.

The video quality depends on the implementation of a video CODEC. For example, the quality differs between a video encoded by H.264 and a video encoded by MPEG2 even at the same bit rate. Also, the video quality depends on prerequisites including the video format and frame rate. In an example of the quality characteristic coefficient database shown in FIG. 6, the characteristic coefficient is described for each prerequisite.

After the difference video quality estimation unit 124 derives the difference video quality value (dVq), the video quality estimation unit 125 receives the average video quality value (Vqave) derived by the average video quality estimation unit 121 and the difference video quality value (dVq) derived by the difference video quality estimation unit 124, and adds them (equation (20)), deriving the video quality value (Vq) of the video content to undergo video quality estimation (S116):

$$(Vq)=(Vq\text{ave})+(dVq) \quad (20)$$

In this manner, according to the first embodiment, a video quality value considering encoding degradation can be calculated using the bit rate of an encoded video packet from a packet and the bit amounts of the respective video frame types. The video quality can be estimated by a more accurate objective quality estimation method than a conventional one.

The video communication service provider can easily determine whether a service being provided maintains a predetermined or higher quality for the user, and can grasp and manage in real time the actual quality of the service being provided.

Second Embodiment

A video quality estimation apparatus according to the second embodiment of the present invention implements objective video quality assessment by deriving a video quality assessment value quantitatively representing video quality using the bit rate, a lost video frame, and the bit amounts of the respective video frame types that affect the video quality assessment value regarding video communication.

For example, in the embodiment, the video quality timation apparatus analyzes an encoded video packet contained in a packet in video communication such as an IPTV service, video distribution service, or videophone service provided via an IP network such as the Internet, and derives a video quality assessment value quantitatively representing a feature amount which affects video quality regarding these video communication services.

The video quality estimation apparatus according to the embodiment estimates the video quality of an encoded video by deriving a video quality assessment value in consideration of the bit rate of an encoded video from an input packet, the bit amounts of the respective video frame types in the video frame of the encoded video, and the number of lost video frames.

The relationship between bit amounts assigned to the respective video frame types of an encoded video and the video quality assessment value, and the influence of a packet loss generated in a network on the video quality assessment value of a video will be explained.

<Relationship Between Bit Amounts of Respective Video Frame Types and Video Quality Assessment Value>

As described above, the relationship between the bit amounts of the respective video frame types and the video quality assessment value shown in FIGS. 9A to 9C represents that the bit amounts of the respective video frame types affect video quality even in videos having the same bit rate.

<Relationship Between Bit Amount Characteristics of Respective Video Frame Types and Video Quality Assessment Value>

Figure 25A:
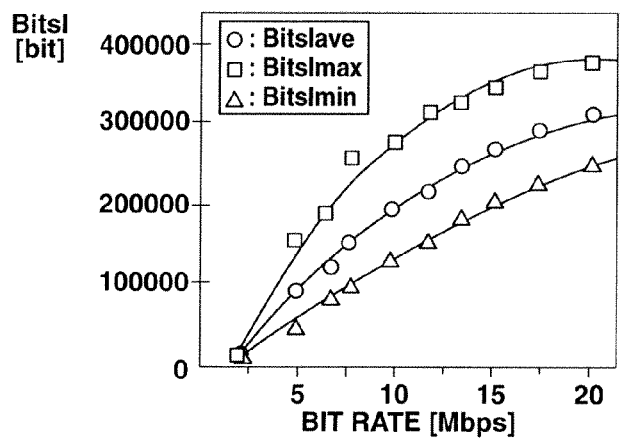
FIG. 25A is a graph for conceptually explaining the relationship between the bit rate and the I-frame (average, maximum, and minimum) bit amounts.
Figure 25B:
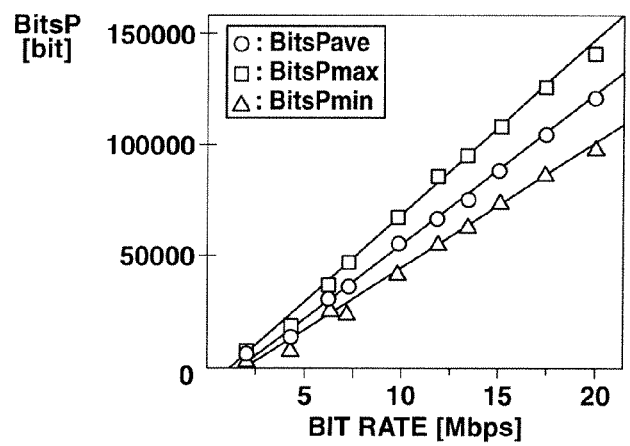
FIG. 25B is a graph for conceptually explaining the relationship between the bit rate and the P-frame (average, maximum, and minimum) bit amounts.
Figure 25C:
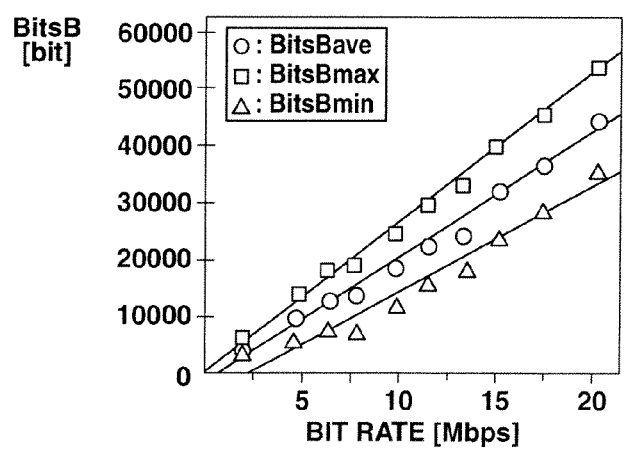
FIG. 25C is a graph for conceptually explaining the relationship between the bit rate and the B-frame (average, maximum, and minimum) bit amounts.
Figure 26:
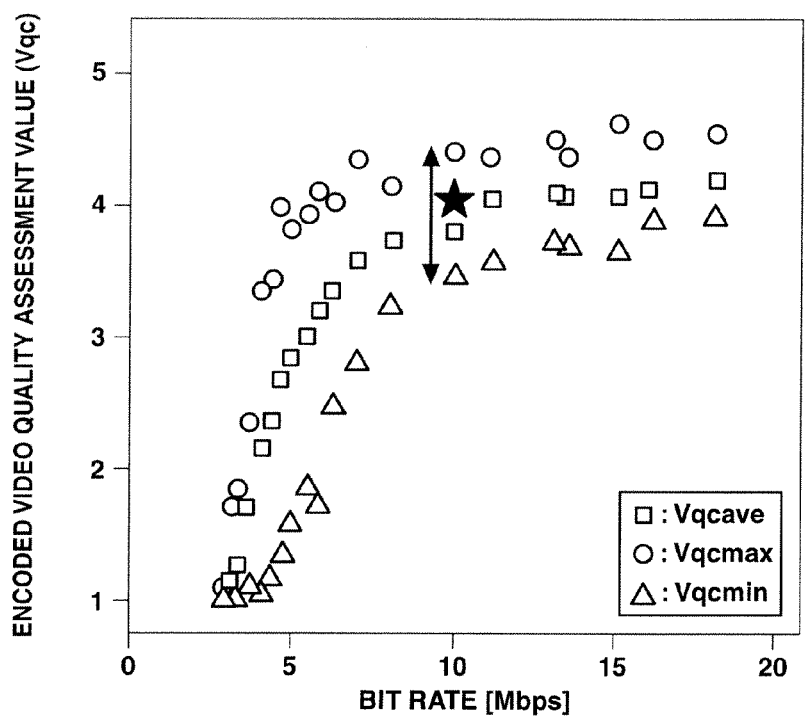
FIG. 26 is a graph for conceptually explaining the relationship between the bit rate and the average, maximum, and minimum encoded video quality assessment values.

FIGS. 25A to 25C are graphs showing the relationship between the bit rate and the frame bit amount with respect to a set of encoded video contents (to be referred to as a "video set") for the respective video frame types. FIG. 26 shows the relationship between the bit rate and the video quality assessment value.

As shown in FIGS. 25A to 25C, the I-frame bit amount, P-frame bit amount, and B-frame bit amount have different bit amount characteristics depending on the video content regardless of the same bit rate.

This means that different video contents encoded at the same bit amount have different bit amounts of the respective video frame types in accordance with the respective video contents.

As shown in FIG. 26, the encoded video quality assessment value has maximum and minimum encoded video assessment values even in videos having the same bit rate. That is, the encoded video quality assessment value has a difference between the maximum encoded video quality assessment value and the minimum encoded video quality assessment value even in video contents encoded at the same bit rate.

For example, when a value indicated by a black star in FIG. 26 is the encoded video quality assessment value of a video content to be estimated, the encoded video quality assessment value of the video content to be estimated does not always coincide with the average encoded video quality assessment value of a video having the same bit rate as that of the video content to be estimated. The difference between the encoded video quality assessment value and the average encoded video quality assessment value depends on bit amounts assigned to the respective video frame types of the video content to be estimated.

That is, the frame bit amount characteristics of the respective video frame types of a video content have the dependence of an encoded video quality assessment value on a video content. This appears as the difference in encoded video quality assessment value though videos are encoded at the same bit rate, as shown in FIG. 26.

The quality assessment values (encoded video quality assessment values: Vqc) of videos encoded at the same bit rate out of video contents in a video set will be explained.

When arbitrary video contents in a video set are encoded at the same bit rate, a maximum value out of the encoded video quality assessment values (Vqc) of the encoded videos is defined as a maximum encoded video quality assessment value (Vcmax), a minimum value is defined as a minimum encoded video quality assessment value (Vcmin), and an average value is defined as an average encoded video quality assessment value (Vcave).

For example, when the encoded video quality assessment values Vqc of eight video contents encoded at a 10-Mbps bit rate (BR) are "3.5", "3.6", "3.7", "3.8", "3.9", "4.0", "4.1", and "4.2", the maximum value of the encoded video quality assessment value is "4.2", so the maximum encoded video quality assessment value Vcmax becomes "4.2". The minimum value is "3.5", so the minimum encoded video quality assessment value Vcmin becomes "3.5". The average value is "3.85", so the average encoded video quality assessment value Vcave becomes "3.85".

<Relationship Between Packet Loss and Video Quality Assessment Value>

The influence of a packet loss generated in a network on the video quality assessment value when transmitting a compressed video frame will be explained.

Figure 27:
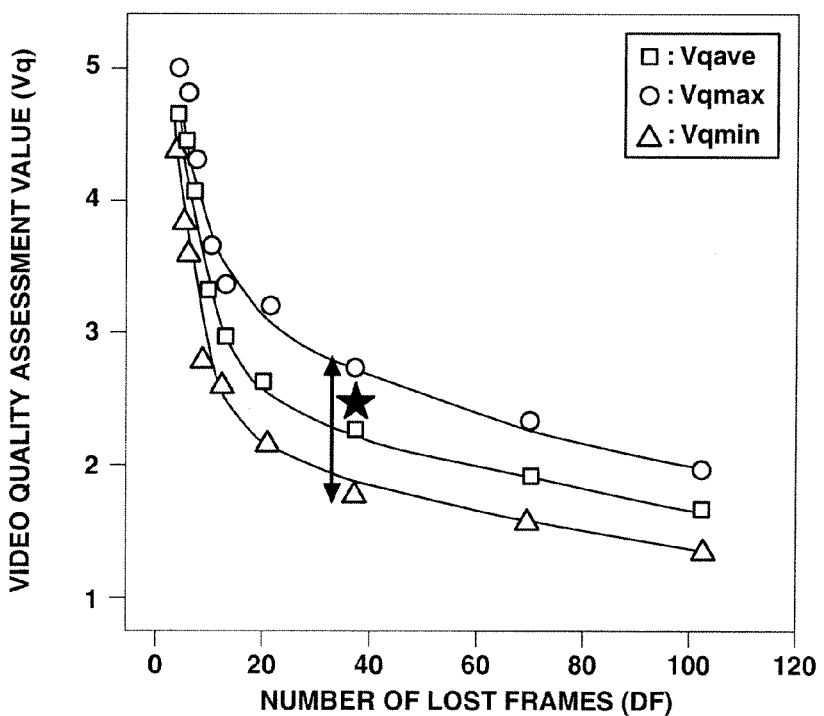
FIG. 27 is a graph for conceptually explaining the relationship between the number of lost video frames and the average, maximum, and minimum video quality assessment values.

FIG. 27 is a graph showing the number of lost video frames (DF) upon a packet loss which is plotted along the abscissa, and the video quality assessment value (Vq) plotted along the ordinate when video contents are encoded at a 10-Mbps bit rate.

Figure 28A:
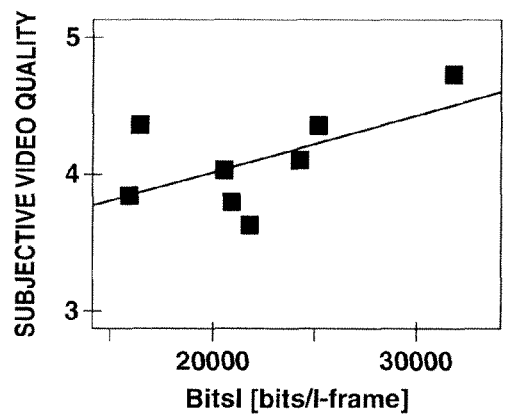
FIG. 28A is a graph for conceptually explaining the relationship between the I-frame bit amount and the video quality assessment value when a packet loss occurs.
Figure 28B:
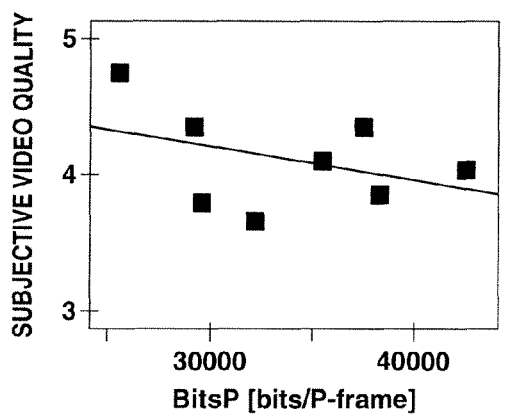
FIG. 28B is a graph for conceptually explaining the relationship between the P-frame bit amount and the video quality assessment value when a packet loss occurs.
Figure 28C:
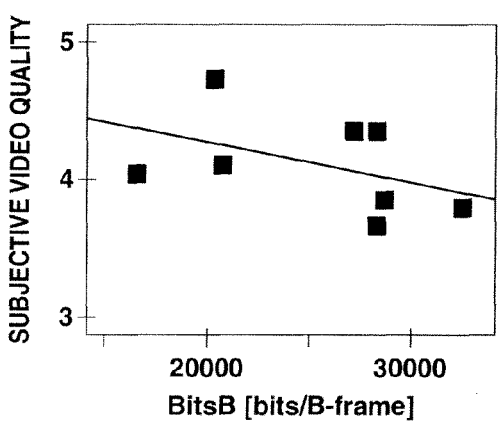
FIG. 28C is a graph for conceptually explaining the relationship between the B-frame bit amount and the video quality assessment value when a packet loss occurs.

FIGS. 28A to 28C are graphs showing the relationship between the video quality assessment value and the frame bit amounts (BitsI, BitsP, and BitsB) of the respective video frame types (I-, P-, and B-frames) when the bit rate (BR) is 10 Mbps and the number of lost video frames (DF) is 1.

As shown in FIG. 27, when video quality assessment values are compared at the same number of lost video frames (DF), they include maximum and minimum video quality assessment values. This means that the video quality assessment value changes depending on the video content even at the same number of lost video frames.

As shown in FIGS. 28A to 28C, at the same number of lost video frames (DF), the relationship between the bit amounts of the respective video frame types and the video quality assessment value represents that a video content having a small I-frame bit amount exhibits a low video quality assessment value and a video content having a large I-frame bit amount exhibits a high video quality assessment value. The result of comparison at the same number of lost video frames (DF) for the P- and B-frame bit amounts reveals that video contents having small P- and B-frame bit amounts exhibit high video quality assessment values and video contents having large P- and B-frame bit amounts exhibit low video quality assessment values.

Even in videos having the same number of lost video frames (DF), the bit amounts of the respective video frame types affect video quality.

For example, when a value indicated by a black star in FIG. 27 is the video quality assessment value of a video content to be estimated, the video quality assessment value of the video content to be estimated does not always coincide with the average video quality assessment value of a video having the same number of lost video frames as that of the video content to be estimated. The difference between the video quality assessment value and the average video quality assessment value depends on bit amounts assigned to the respective video frame types of the video content to be estimated.

That is, the frame bit amount characteristics of the respective video frame types of a video content have the dependence of a video quality assessment value on a video content. This appears as the difference in video quality assessment value though videos have the same number of lost video frames, as shown in FIG. 27.

The video quality assessment value (Vq) of a compressed video will be explained.

In arbitrary videos which are encoded at the same bit rate with the same number of lost video frames, a maximum value among the video quality assessment values Vq is defined as the aximum video quality assessment value (Vqmax), a minimum value is defined as the minimum video quality assessment value (Vqmin), and an average value is defined as the average video quality assessment value (Vqave).

For example, when the video quality assessment values Vq of eight video contents having a 10-Mbps bit rate and one lost video frame are "3.5", "3.6", "3.7", "3.9", "3.9", "4.0", "4.1", and "4.2", the maximum value of the video quality assessment value Vq is "4.2", so the maximum video quality assessment value (Vqmax) becomes "4.2". The minimum value is "3.5", so the minimum video quality assessment value (Vqmin) becomes "3.5". The average value of the video quality assessment values Vq of the eight video contents is "3.85", so the average video quality assessment value (Vqave) becomes "3.85".

Figure 12:
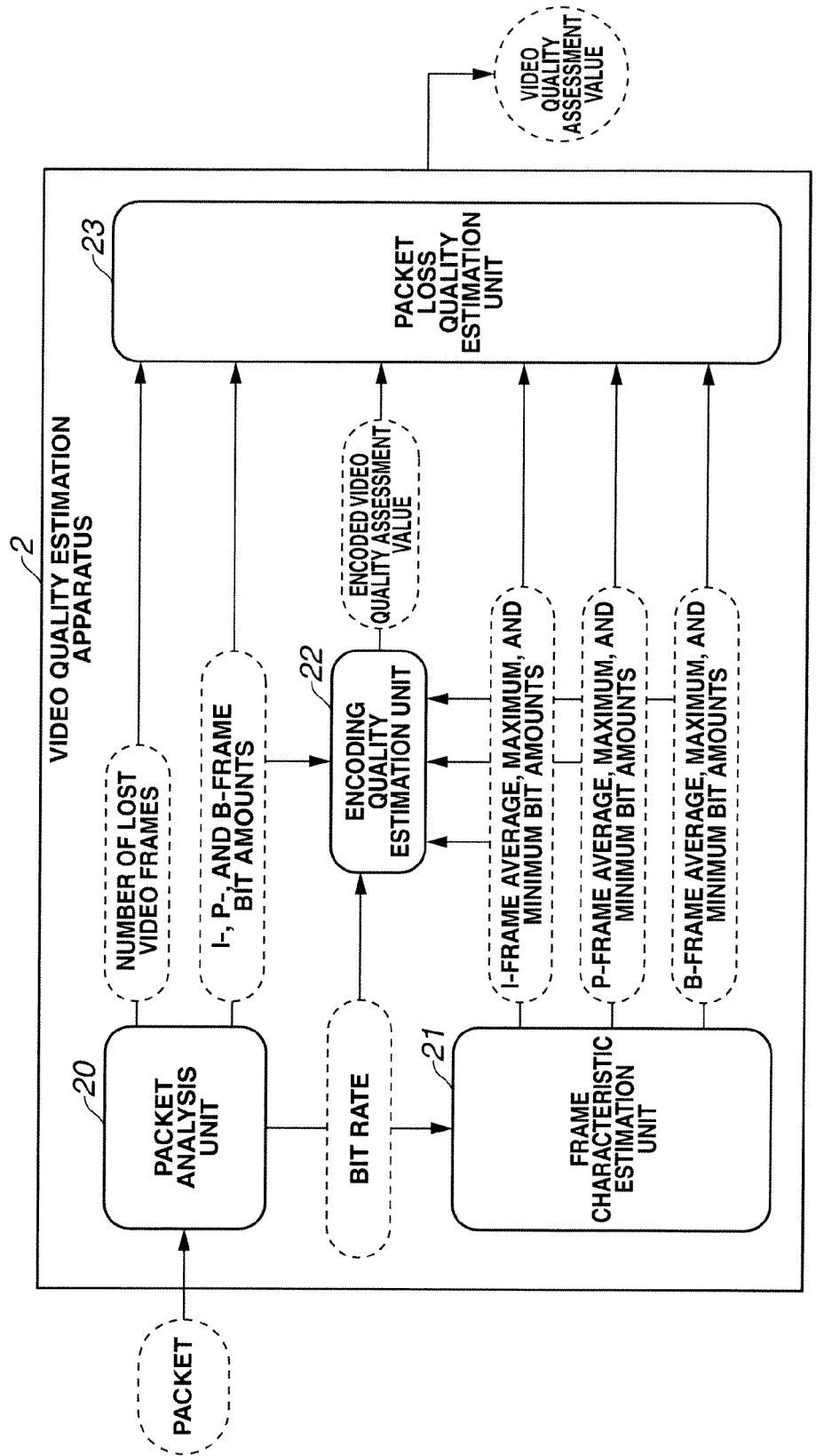
FIG. 12 is a block diagram showing the arrangement of a video quality estimation apparatus according to the second embodiment of the present invention.

The arrangement and functions of a video quality estimation apparatus 2 according to the second embodiment will be described. As shown in FIG. 12, the video quality estimation apparatus 2 according to the embodiment includes a packet analysis unit 20, frame characteristic estimation unit 21, encoding quality estimation unit 22, and packet loss quality estimation unit 23.

Figure 13:
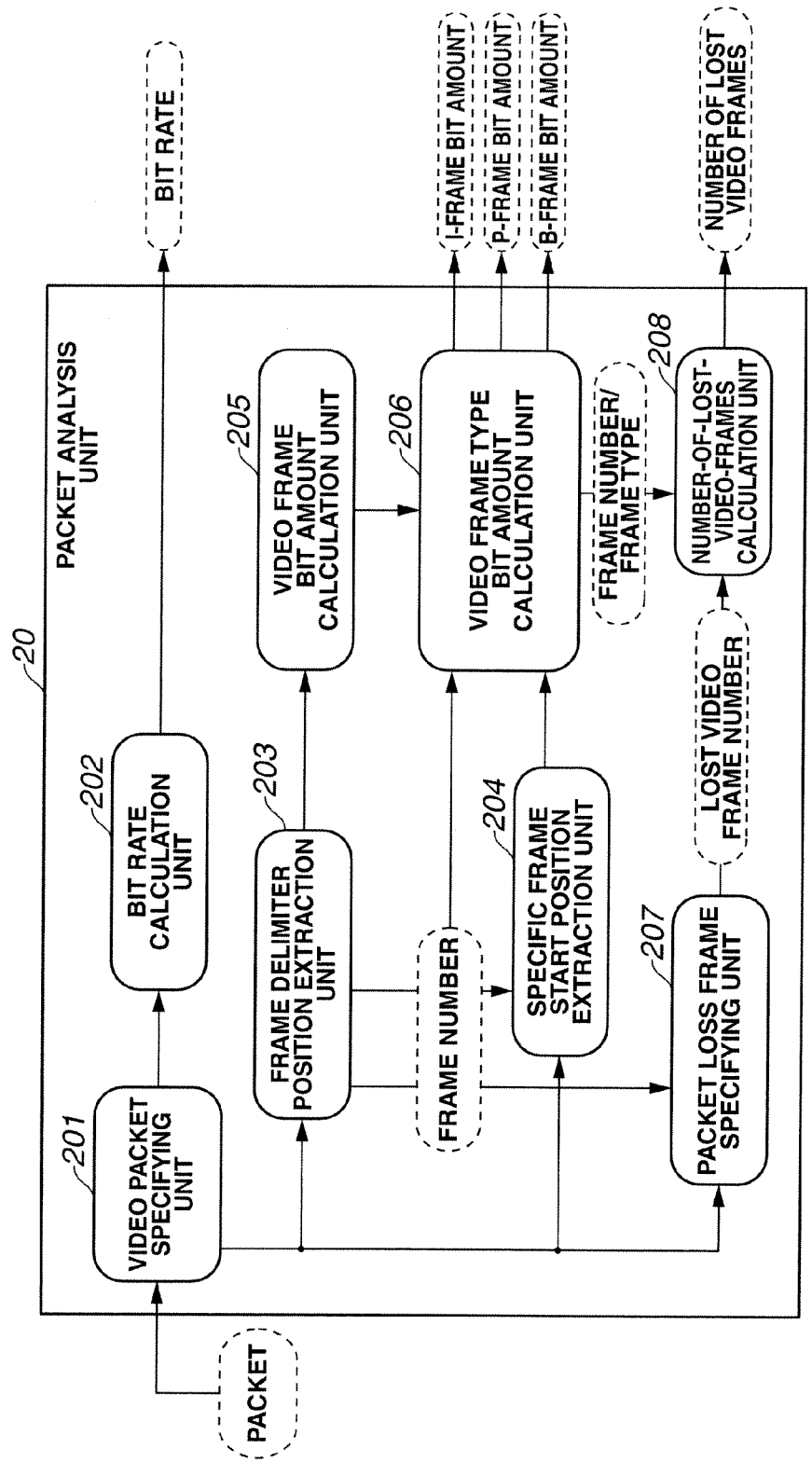
FIG. 13 is a block diagram showing the arrangement of a packet analysis unit in the video quality estimation apparatus according to the second embodiment of the present invention.

As shown in FIG. 13, the packet analysis unit 20 includes a video packet specifying unit 201, bit rate calculation unit 202, frame delimiter position extraction unit 203, specific frame start position extraction unit 204, video frame bit amount calculation unit 205, video frame type bit amount calculation unit 206, packet loss frame specifying unit 207, and number-of-lost-video-frames calculation unit 208.

The video packet specifying unit 201 specifies an arbitrary encoded video packet contained in an input packet based on a packet ID (PID) unique to the encoded video packet (specifies it using, e.g., a payload type in an RTP (Real-time Transport Protocol) packet, PID in a TS (Transport Stream) packet, or Stream ID in a PES (Packetized Elementary Stream) header). The video packet specifying unit 201 may also have even a function of extracting an RTP sequence number in the RTP packet and CC (Continuity Counter: 4-bit counter) in the TS packet.

The bit rate calculation unit 202 calculates a bit rate represented by the bit amount of encoded video packet per unit time that is specified by the video packet specifying unit 201.

For example, encoded data of a video or audio is identified by PID described in a TS packet header. The bit rate calculation unit 202 counts TS packets having the PID of video data, and multiplies the count by the data length (188 bytes in general) of the TS packet to calculate a bit amount per unit time, thereby deriving the bit rate (BR).

The frame delimiter position extraction unit 203 extracts information indicating the delimiter of a video frame from an encoded video packet specified by the video packet specifying unit 201.

For example, the packet contains information such as an IP header, UDP (User Datagram Protocol) header, RTP, TS header, PES header, and ES (Elementary Stream). Of these kinds of information, Payload_Unit_Start_Indicator (to be referred to as "PUSI") in the TS header is a flag indicating the presence/absence of the PES header. When one PES contains one frame (one video frame is often stored in one PES in video encoding used in TV broadcasting), PUSI serves as information indicating the start of a video frame.

Similarly, the packet contains information such as an IP header, UDP (User Datagram Protocol) header, RTP, and ES (Elementary Stream). Of these kinds of information, Marker_bit (to be referred to as "MB") in the RTP header sometimes serves as information indicating the end position of a video frame. In this case, the end position of a frame is extracted in accordance with the presence/absence of MB.

Information indicating the delimiter position of a frame will be explained in detail with reference to FIG. 7 which is a table for conceptually explaining extraction of a video frame start position.

As shown in FIG. 7 (left column represents RTP sequence number, and the second to eighth columns from the left represent the CC numbers of TS), TS containing PUSI indicates the start position of a frame. As information indicating the delimiter position of a frame, it suffices to store the RTP sequence number of the start position of a frame, the ordinal number of a packet counted from the beginning of an analysis section, or the ordinal number of the frame of a packet containing PUSI. As the frame counting method, PUSIs in the analysis section are counted.

When the PES header is usable, for example, when the PES header is not encrypted, PTS (Presentation Time Stamp) or DIS (Decoding Time Stamp) serves as information indicating the delimiter position of a frame, and thus the same processing as that for PUSI is executed. Similarly, when ES is usable, it stores frame information, so the same processing as that for PUSI is executed. Also when a frame is packetized by RTP, the same processing as that for PUSI is executed by referring to MB.

The specific frame start position extraction unit 204 extracts information indicating the start position of a specific video frame from an encoded video packet specified by the video packet specifying unit 201.

The specific frame start position extraction unit 204 in the video quality estimation apparatus according to the embodiment is premised on that it extracts pieces of information indicating the start positions of "I-frame", "P-frame", and "B-frame" when ES information is usable, and information indicating the start position of "I-frame" when no ES information is usable because of encryption.

When ES information is usable, a bit indicating frame information exists in an H.264 or MPEG2 bit string (for example, this bit is Primary_pic_type or Slice_type for H.264). The frame delimiters of "I-frame", "P-frame", and "B-frame" can be identified by this information. Further, the number of this video frame can be determined by storing the RTP sequence number of a packet containing video frame type identification information, or the ordinal number of a video frame counted from the beginning of an analysis section.

When no ES information is usable, information indicating the start position of an I-frame is RAI (Random_Access_Indicator) or ESPI (Elementary_Stream_Priority_Indicator) in the TS header serving as a flag indicating the start position of an I-frame or IDR (Instantaneous Decoder Refresh) frame (see non-patent literatures 4 and 5). Since RAI or ESPI serves as information indicating the start position of an I-frame or IDR frame, the delimiter of an I-frame can be discriminated from those of other frames. Also, the number of this video frame can be determined by storing the RTP sequence number of a packet containing RAI or ESPI, or the ordinal number of a video frame counted from the beginning of an analysis section.

If neither RAI nor ESPI indicates the start position of an I-frame or IDR frame, the specific frame start position extraction unit 204 is incorporated in the video frame type bit amount calculation unit 206 (to be escribed later), and specifies the position of an I-frame by calculating the data amount of each frame using PUSI representing a frame start position extracted by the frame delimiter position extraction unit 203, and the bit amounts of the respective video frames that are calculated by the video frame bit amount calculation unit 205.

The information amount of an I-frame is larger than those of other video frames. Based on this basic feature of the compressed video frame type, a video frame having a large data amount out of video frames in a packet can be specified as an I-frame in conversion from the GoP length of an encoded video.

For example, when the number of video frames is 300 and the GoP length is 15, the number of I-frames is 20. Hence, 20 video frames each having a large data amount out of video frames in a packet can be specified as I-frames.

Another method is a method (nearest neighbor method) of grouping frames having a minimum distance which is the basis of clustering.

For example, a case in which 12 video frames exist in one sec and are aligned in the order of I, B, B, P, B, B, I, B, B, P, B, and B (representing I, B, and P video frame types) will be described. Assuming that the bit amounts of the respective video frames in the 1-sec video content are 100, 50, 51, 70, 48, 45, 95, 49, 52, 71, 47, and 46 bits, video frames of 100 and 95 bits are identified as a maximum bit amount group, i.e., I-frames by using the nearest neighbor method. Video frames of 50, 51, 48, 45, 49, 52, 47, and 46 bits are identified as a minimum bit amount group, i.e., B-frames. The remaining video frames of 70 and 71 bits are identified as an intermediate group, i.e., P-frames.

To indicate the position of a specified I-frame, an RTP sequence number at the start position of a frame or the ordinal number of a packet counted from the beginning of an analysis section is stored.

If no ES information is usable and the video frame type is not dynamically changed, it is also possible to acquire the start position of an I-frame by the above-described method, and determine frames as "P-frames" and "B-frames" in order using the start position of an I-frame as an origin in a default GoP pattern (e.g., N=3 and N=15).

The bit amounts of I-, P-, and B-frames generally have a relation of BitsI>BitsP>BitsB. Thus, the video frame type may be determined in order from a frame having a large bit amount.

The video frame bit amount calculation unit 205 counts TS packets having the PID of video data between frame delimiter positions extracted by the frame delimiter position extraction unit 203. The video frame bit amount calculation unit 205 multiplies the count by the data length (188 bytes in general) of the TS packet, deriving the bit amount of each video frame. Also, the video frame bit amount calculation unit 205 stores, in correspondence with the bit amount of each video frame, a frame delimiter position (information such as an RTP sequence number at the start position of a frame, the ordinal number of a packet counted from the beginning of an analysis section, or the ordinal number of the frame of a packet containing PUSI) extracted by the frame delimiter position extraction unit 203.

The video frame type bit amount calculation unit 206 calculates the I-frame bit amount (BitsI), P-frame bit amount (BitsP), and B-frame bit amount (BitsB) from the bit amounts of the respective video frames that have been calculated by the video frame bit amount calculation unit 205, frame delimiter position information, and the positions of P-, and B-frames that have been specified by the specific frame start position extraction unit 204.

Note that the arrangement of the video frame types contained in a video to be estimated changes depending on the encoding situation. For example, a video may be formed from only I-frames, I- and P-frames, or all the video frame types of I-, P-, and B-frames. Thus, the video frame type bit amount calculation unit 206 derives the frame bit amount of at least one video frame type, i.e., the frame bit amounts of some or all video frame types.

A method of specifying each video frame type by the video frame type bit amount calculation unit 206 is determined as follows.

When ES information is usable, a bit indicating frame information exists in an H.264 or MPEG2 bit string (for example, this bit is Primary_pic_type or Slice_type for H.264). The frame delimiters of "I-frame", "P-frame", and "B-frame" can be identified by this information. The frame delimiter position is stored in correspondence with the RTP sequence number of a packet or the ordinal number of a packet counted from the beginning of an analysis section.

When no ES information is usable, frames may be determined as "P-frames" and "B-frames" in order using a specified I-frame start position as an origin in a default GoP structure (e.g., M=3 and N=15).

The bit amounts of I-, P-, and B-frames generally have a relation of BitsI>BitsP>BitsB. Therefore, the video frame type may be determined in order from a frame having a large bit amount.

Alternatively, the video frame type may be specified using the magnitude relationship between the bit amounts of I-, P-, and B-frames according to a method as described in non-patent literature 6.

The packet loss frame specifying unit 207 specifies a packet loss frame using information such as the RTP sequence number or CC in an IP packet containing PUSI or MB indicating a frame delimiter position extracted by the frame delimiter position extraction unit 203.

For example, when the first frame is formed from packets having RTP sequence numbers of 10000 to 10002, as shown in FIG. 7, and a packet having an RIP sequence number of 10001 is lost, it can be specified that the first frame has lost. At this time, the ordinal number of the frame having the packet loss and counted from the beginning of an analysis section may be stored.

The number-of-lost-video-frames calculation unit 208 calculates the number of lost video frames from the frame number and video frame type in the analysis section that have been output from the video frame type bit amount calculation unit 206, and the lost frame number in the analysis section that has been output from the packet loss frame specifying unit 207.

For example, when the first frame is formed from packets having RTP sequence numbers of 10000 to 10002, as shown in FIG. 7, and a packet having an RTP sequence number of 10001 is lost, the packet loss frame specifying unit 207 outputs information representing that the video frame position where the packet loss has occurred is the first frame, and the video frame type bit amount calculation unit 206 outputs information representing that the video frame type of the first frame is an I-frame. From these pieces of information, the number-of-lost-video-frames calculation unit 208 can specify the ordinal number and video frame type of a lost video frame.

The relationship between the video frame type of an encoded video and propagation of degradation of an encoded video caused by a packet loss will be explained with reference to FIG. 24.

Figure 24:
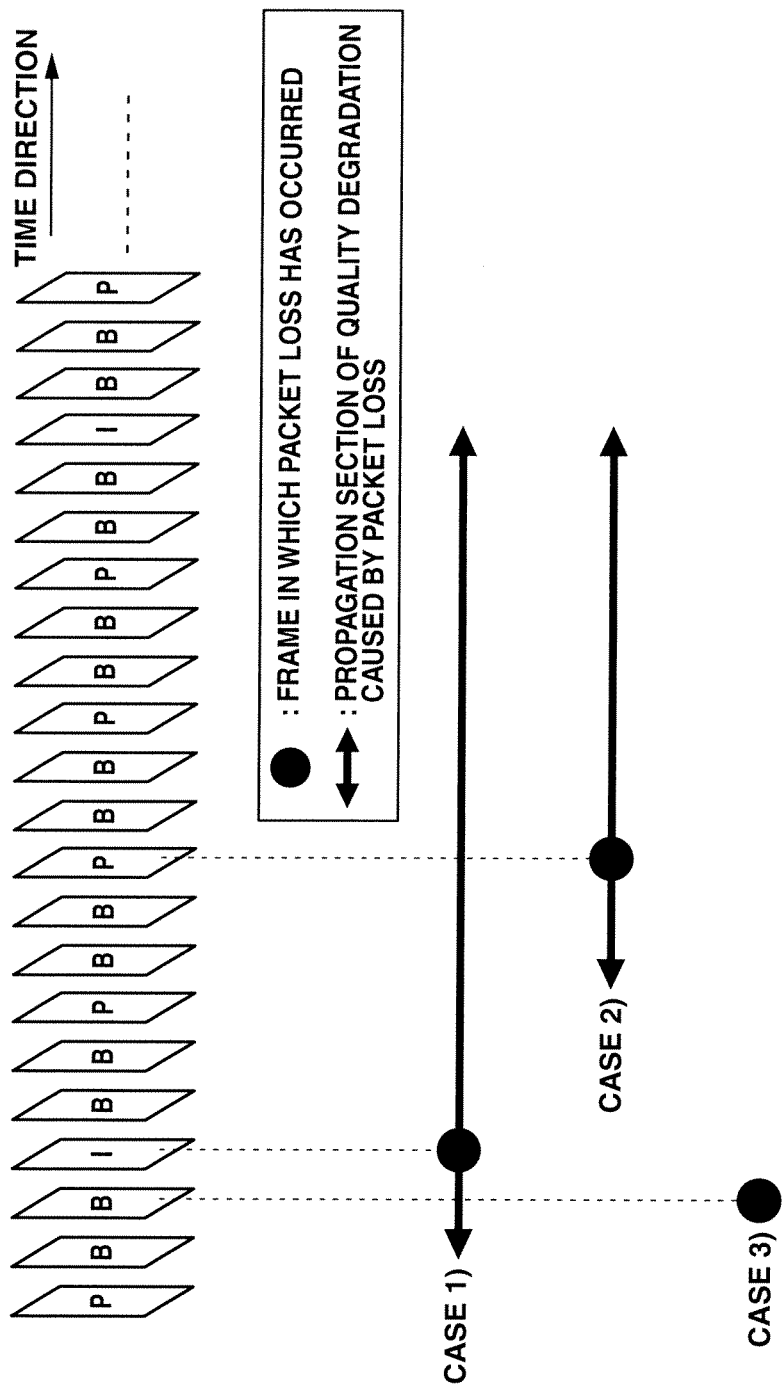
FIG. 24 is a view conceptually showing the GoP structure of an encoded video to explain, for the respective video frame types, degradation propagation when a packet loss occurs in a video frame.

As shown in FIG. 24, degradation propagation changes depending on the video frame type of a video frame in which a packet loss has occurred, because of the characteristics of the respective video frame types.

More specifically, when a packet loss occurs in an I-frame, B- and P-frames succeeding the I-frame having the packet loss refer to the I-frame, and succeeding B- and P-frames further refer to the B- and P-frames which refer to the I-frame. Thus, degradation propagates till an interruption of the video frame reference structure. In the example shown in FIG. 24, the number of degraded frames is 17, and the number of lost video frames derived by the number-of-lost-video-frames calculation unit 208 is 17.

When a packet loss occurs in a P-frame, degradation propagates till an interruption of the video frame reference structure, as shown in FIG. 24, similar to the case in which a packet loss occurs in an I-frame. In the example shown in FIG. 24, the number of degraded frames is 11, and the number of lost video frames derived by the number-of-lost-video-frames calculation unit 208 is 11.

When a packet loss occurs in a B-frame, degradation does not propagate and only the B-frame in which the packet loss has occurred degrades because no video frame refers to the B-frame, unlike the above-described cases in which packet losses occur in I- and P-frames. Hence, the number of lost video frames derived by the number-of-lost-video-frames calculation unit 208 is 1.

Figure 14:
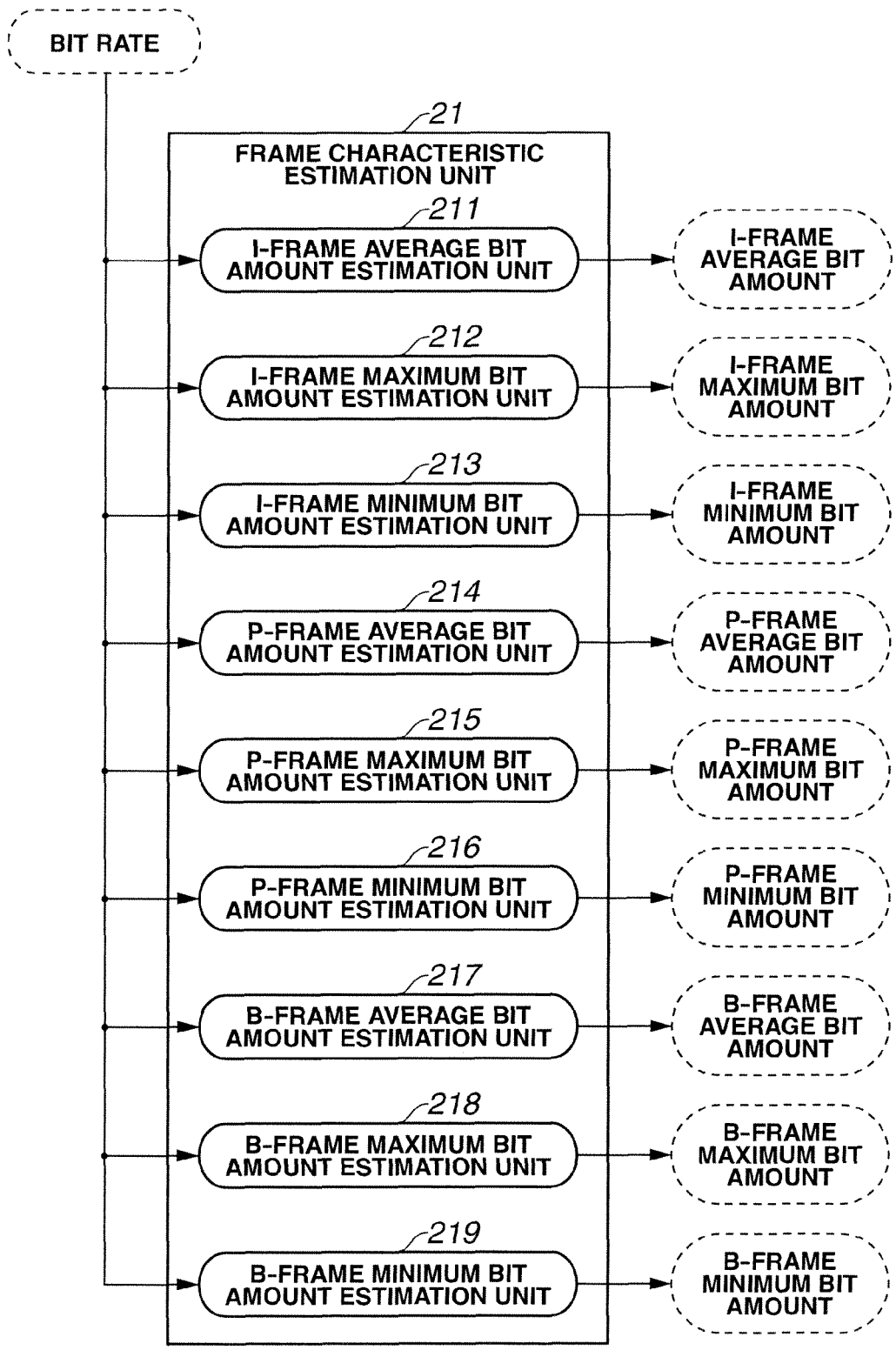
FIG. 14 is a block diagram showing the arrangement of a frame characteristic estimation unit in the video quality estimation apparatus according to the second embodiment of the present invention.

As shown in FIG. 14, the frame characteristic estimation unit 21 includes an I-frame average bit amount estimation unit 211 which estimates an I-frame average bit amount, an I-frame maximum bit amount estimation unit 212 which estimates an I-frame maximum hit amount, an I-frame minimum bit amount estimation unit 213 which estimates an I-frame minimum bit amount, a P-frame average bit amount estimation unit 214 which estimates a P-frame average bit amount, a P-frame maximum bit amount estimation unit 215 which estimates a P-frame maximum bit amount, a P-frame minimum bit amount estimation unit 216 which estimates a P-frame minimum bit amount, a B-frame average bit amount estimation unit 217 which estimates a B-frame average bit amount, a B-frame maximum bit amount estimation unit 218 which estimates a B-frame maximum bit amount, and a B-frame minimum bit amount estimation unit 219 which estimates a B-frame minimum bit amount.

Note that the arrangement of the video frame types contained in a video to be estimated changes depending on the encoding situation. A video may be formed from only I-frames, I- and P-frames, or all the video frame types of I-, P-, and B-frames. The arrangement changes depending on the video encoding situation. The frame characteristic estimation unit 21 therefore derives the frame characteristics of at least one video frame type, i.e., the frame characteristics of some or all video frame types.

The I-frame average bit amount estimation unit 211 derives an I-frame average bit amount (BitsIave) based on a bit rate calculated by the bit rate calculation unit 202.

Note that the I-frame average bit amount estimation unit 211 estimates an I-frame average bit amount using a characteristic in which it increases as the bit rate increases, as shown in FIG. 25A.

The I-frame maximum bit amount estimation unit 212 derives an I-frame maximum bit amount (BitsImax) based on a bit rate calculated by the bit rate calculation unit 202.

Note that the I-frame maximum bit amount estimation unit 212 estimates an I-frame maximum bit amount using a characteristic in which it increases as the bit rate increases, as shown in FIG. 25A.

The I-frame minimum bit amount estimation unit 213 derives an I-frame minimum bit amount (BitsImin) based on a bit rate calculated by the bit rate calculation unit 202.

Note that the I-frame minimum bit amount estimation unit 213 estimates an I-frame minimum bit amount using a characteristic in which it increases as the bit rate increases, as shown in FIG. 25A.

The P-frame average bit amount estimation unit 214 derives a P-frame average bit amount (BitsPave) based on a bit rate calculated by the bit rate calculation unit 202.

Note that the P-frame average bit amount estimation unit 214 estimates a P-frame average bit amount using a characteristic in which it increases as the bit rate increases, as shown in FIG. 25B.

The P-frame maximum bit amount estimation unit 215 derives a P-frame maximum bit amount (BitsPmax) based on a bit rate calculated by the bit rate calculation unit 202.

Note that the P-frame maximum bit amount estimation unit 215 estimates a P-frame maximum bit amount using a characteristic in which it increases as the bit rate increases, as shown in FIG. 25B.

The P-frame minimum bit amount estimation unit 216 derives a P-frame minimum bit amount (BitsPmin) based on a bit rate calculated by the bit rate calculation unit 202.

Note that the P-frame minimum bit amount estimation unit 216 estimates a P-frame minimum bit amount using a characteristic in which it increases as the bit rate increases, as shown in FIG. 25B.

The B-frame average bit amount estimation unit 217 derives a B-frame average bit amount (BitsBave) based on a bit rate calculated by the bit rate calculation unit 202.

Note that the B-frame average bit amount estimation unit 217 estimates a B-frame average bit amount using a characteristic in which it increases as the bit rate increases, as shown in FIG. 25C.

The B-frame maximum bit amount estimation unit 218 derives a B-frame maximum bit amount (BitsBmax) based on a bit rate calculated by the bit rate calculation unit 202.

Note that the B-frame maximum bit amount estimation unit 218 estimates a B-frame maximum bit amount using a characteristic in which it increases as the bit rate increases, as shown in FIG. 25C.

The B-frame minimum bit amount estimation unit 219 derives a B-frame minimum bit amount (BitsBmin) based on a bit rate calculated by the bit rate calculation unit 202.

Note that the B-frame minimum bit amount estimation unit 219 estimates a B-frame minimum bit amount using a characteristic in which it increases as the bit rate increases, as shown in FIG. 25C.

Figure 15:
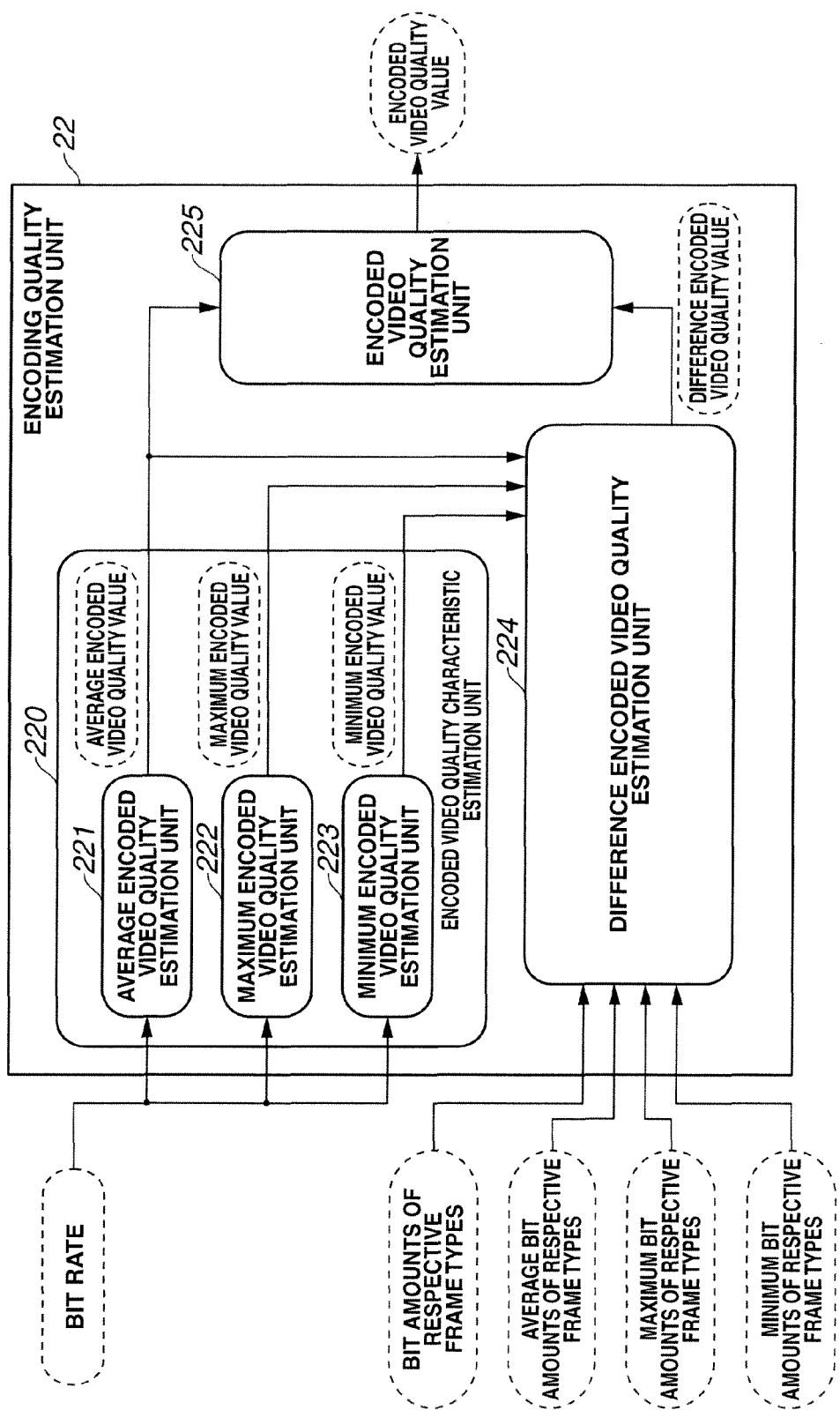
FIG. 15 is a block diagram showing the arrangement of an encoding quality estimation unit in the video quality estimation apparatus according to the second embodiment of the present invention.

As shown in FIG. 15, the encoding quality estimation unit 22 includes an average encoded video quality estimation unit 221 which derives an average encoded video quality assessment value, a maximum encoded video quality estimation unit 222 which derives a maximum encoded video quality assessment value, a minimum encoded video quality estimation unit 223 which derives a minimum encoded video quality assessment value, a difference encoded video quality estimation unit 224 which derives a difference encoded video quality assessment value representing the dependence of video quality on a content, and an encoded video quality estimation unit 225 which derives an encoded video quality assessment value regarding encoding degradation.

The average encoded video quality estimation unit 221 derives an average encoded video quality assessment value (Vqcave) based on a bit rate calculated by the bit rate calculation unit 202.

Note that the average encoded video quality estimation unit 221 estimates an average encoded video quality assessment value using a characteristic in which it increases as the bit rate increases, as shown in FIG. 26.

The maximum encoded video quality estimation unit 222 derives a maximum encoded video quality assessment value (Vqcmax) based on a bit rate calculated by the bit rate calculation unit 202.

Note that the maximum encoded video quality estimation unit 222 estimates a maximum encoded video quality assessment value using a characteristic in which it increases as the bit rate increases, as shown in FIG. 26.

The minimum encoded video quality estimation unit 223 derives a minimum encoded video quality assessment value (Vqcmin) based on a bit rate calculated by the bit rate calculation unit 202.

Note that the minimum encoded video quality estimation unit 223 estimates a minimum encoded video quality assessment value using a characteristic in which it increases as the bit rate increases, as shown in FIG. 26.

The difference encoded video quality estimation unit 224 derives a difference encoded video quality assessment value (dVqc) from the average encoded video quality assessment value (Vqcave) calculated by the average encoded video quality estimation unit 221, the maximum encoded video quality assessment value (Vqcmax) calculated by the maximum encoded video quality estimation unit 222, the minimum encoded video quality assessment value (Vqcmin) calculated by the minimum encoded video quality estimation unit 223, the I-frame bit amount (BitsI), P-frame bit amount (BitsP), and B-frame bit amount (BitsB) calculated by the video frame type bit amount calculation unit 206, and the average bit amounts (Bits(I, P, B)ave), maximum bit amounts (Bits(I, P, B)max), and minimum bit amounts (Bits(I, P, B)min) of the respective video frame types that have been derived by the frame characteristic estimation unit 21.

Derivation of the difference encoded video quality assessment value (dVqc) by the difference encoded video quality estimation unit 224 will be described in detail.

As shown in FIGS. 9A to 9C, the result of comparison at the same bit rate (10 Mbps in the example FIGS. 9A to 9C) reveals that a video content having a large I-frame bit amount exhibits a high video quality assessment value, and a video content having a small I-frame bit amount exhibits a low video quality assessment value. The result of comparison at the same bit rate also represents that video contents having large P- and B-frame bit amounts exhibit low video quality assessment values and video contents having small P- and B-frame bit amounts exhibit high video quality assessment values.

When a value indicated by a black star in FIG. 26 is the encoded video quality assessment value (Vqc) of a video content to be estimated, the I-, P-, and B-frame bit amounts of the video content to be estimated are values indicated by black stars in FIGS. 25A to 25C. To estimate a video quality assessment value, it suffices to calculate, from the I-, P-, and B-frame bit amounts (BitsI, BitsP, and BitsB), the difference encoded video quality assessment value (dVqc) representing a shift from the average encoded video quality assessment value.

If the I-frame bit amount (BitsI) equals the I-frame average bit amount (BitsIave), the P-frame bit amount (BitsP) equals the P-frame average bit amount (bitsPave), and the B-frame bit amount (BitsB) equals the B-frame average bit amount (BitsBave), the encoded video quality assessment value (Vqc) of a video content to be estimated equals the average encoded video quality assessment value (Vqcave).

If the I-frame bit amount (Bits') is larger than the I-frame average bit amount (BitsIave), the encoded video quality assessment value (Vqc) of a video content to be estimated becomes higher than the average encoded video quality assessment value (Vqcave). To the contrary, if the I-frame bit amount (BitsI) is smaller than the I-frame average bit amount (BitsIave), the encoded video quality assessment value (Vqc) of a video content to be estimated becomes lower than the average encoded video quality assessment value (Vgcave).

That is, when the I-frame bit amount (BitsI) is larger than the I-frame average bit amount (BitsIave), the difference encoded video quality assessment value (dVqc) becomes proportional to (Vqcmax−Vqcave)·(BitsI−BitsIave)/(BitsImax−BitsIave). When the I-frame bit amount (BitsI) is smaller than the I-frame average bit amount (BitsIave), the difference encoded video quality assessment value (dVqc) becomes proportional to (Vqcmin−Vqcave)·(BitsI−BitsIave)/(BitsImin−BitsIave).

If the P-frame bit amount (BitsP) is larger than the P-frame average bit amount (BitsPave), the encoded video quality assessment value (Vqc) of a video content to be estimated becomes lower than the average encoded video quality assessment value (Vqcave). If the P-frame bit amount (BitsP) is smaller than the P-frame average bit amount (BitsPave), the encoded video quality assessment value (Vqc) of a video content to be estimated becomes higher than the average encoded video quality assessment value (Vqcave).

That is, when the P-frame bit amount (BitsP) is larger than the P-frame average bit amount (BitsPave), the difference encoded video quality assessment value (dVqc) becomes proportional to (Vqcmin−Vqcave)·(BitsP−BitsPave)/(BitsPmin−BitsPave). When the P-frame bit amount (BitsP) is smaller than the P-frame average bit amount (BitsPave), the difference encoded video quality assessment value (dVqc) becomes proportional to (Vqcmax−Vqcave)·(BitsP−BitsPave)/(BitsPmax−BitsPave).

If the B-frame bit amount (BitsB) is larger than the B-frame average bit amount (BitsBave), the encoded video quality assessment value (Vqc) of a video content to be estimated becomes lower than the average encoded video quality assessment value (Vqcave). If the B-frame bit amount (BitsB) is smaller than the B-frame average bit amount (BitsBave), the encoded video quality assessment value (Vqc) of a video content to be estimated becomes higher than the average encoded video quality assessment value (Vqcave).

That is, when the B-frame bit amount (BitsB) is larger than the B-frame average bit amount (BitsBave), the difference encoded video quality assessment value (dVqc) becomes proportional to (Vqcmin−Vqcave)·(BitsB−BitsBave)/(BitsBmin−BitsBave). When the B-frame bit amount (BitsB) is smaller than the B-frame average bit amount (BitsBave), the difference encoded video quality assessment value (dVqc) becomes proportional to (Vqcmax−Vqcave)·(BitsB−BitsBave)/(BitsBmax−BitsBave).

Based on these characteristics between the bit amounts of the respective video frame types and the video quality assessment value, the difference encoded video quality estimation unit 224 estimates the difference encoded video quality assessment value (dVqc).

The encoded video quality estimation unit 225 estimates the encoded video quality assessment value (Vqc) of a video content to be estimated by adding the average encoded video quality assessment value (Vqcave) calculated by the average encoded video quality estimation unit 221 and the difference encoded video quality assessment value (dVqc) calculated by the difference encoded video quality estimation unit 224.

Figure 16:
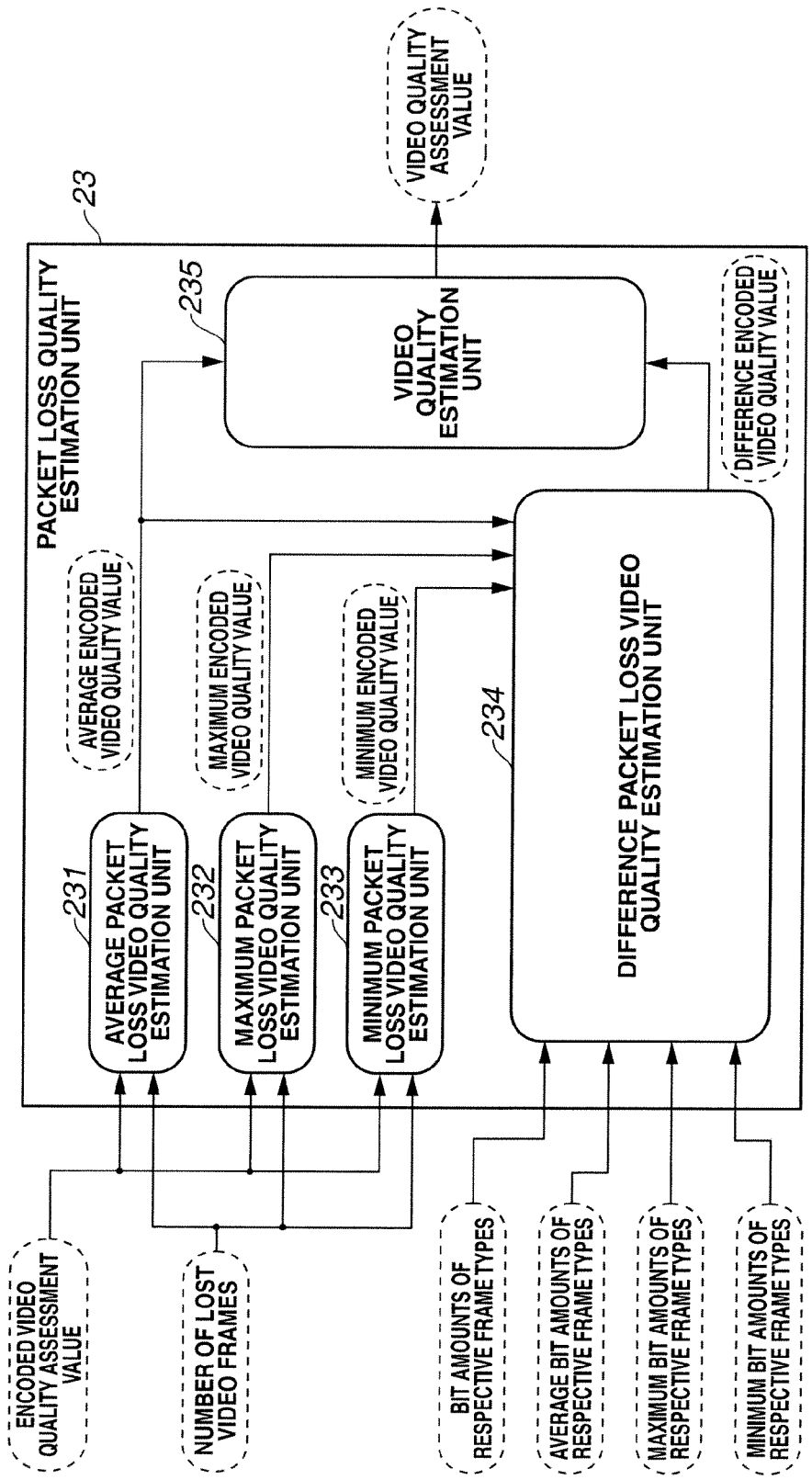
FIG. 16 is a block diagram showing the arrangement of a packet loss quality estimation unit in the video quality estimation apparatus according to the second embodiment of the present invention.

As shown in FIG. 16, the packet loss quality estimation unit 23 includes an average packet loss video quality estimation unit 231 which derives an average packet loss video quality assessment value, a maximum packet loss video quality estimation unit 232 which derives a maximum packet loss video quality assessment value, a minimum packet loss video quality estimation unit 233 which derives a minimum packet loss video quality assessment value, a difference packet loss video quality estimation unit 234 which derives a difference packet loss video quality assessment value representing the dependence of video quality on a content, and a video quality estimation unit 235 which derives a video quality assessment value regarding target encoded degradation and packet loss degradation.

The average packet loss video quality estimation unit 231 derives an average packet loss video quality assessment value (Vqave) from the encoded video quality assessment value (Vqc) calculated by the encoding quality estimation unit 22 and the number of lost video frames (DF) calculated by the packet analysis unit 20.

Note that the average packet loss video quality estimation unit 231 estimates an average packet loss video quality assessment value using a characteristic in which it decreases as the number of lost video frames increases, as shown in FIG. 27.

The maximum packet loss video quality estimation unit 232 derives a maximum packet loss video quality assessment value (Vqmax) from the encoded video quality assessment value (Vqc) calculated by the encoding quality estimation unit 22 and the number of lost video frames (DF) calculated by the packet analysis unit 20.

Note that the maximum packet loss video quality estimation unit 232 estimates a maximum packet loss video quality assessment value using a characteristic in which it decreases as the number of lost video frames increases, as shown in FIG. 27.

The minimum packet loss video quality estimation unit 233 derives a minimum packet loss video quality assessment value (Vqmin) from the encoded video quality assessment value (Vqc) calculated by the encoding quality estimation unit 22 and the number of lost video frames (DF) calculated by the packet analysis unit 20.

Note that the minimum packet loss video quality estimation unit 233 estimates a minimum packet loss video quality assessment value using a characteristic in which it decreases as the number of lost video frames increases, as shown in FIG. 27.

The difference packet loss video quality estimation unit 234 calculates a difference packet loss video quality assessment value (dVq) from the average packet loss video quality assessment value (Vqave) calculated by the average packet loss video quality estimation unit 231, the maximum packet loss video quality assessment value (Vqmax) calculated by the maximum packet loss video quality estimation unit 232, the minimum packet loss video quality assessment value (Vqmin) calculated by the minimum packet loss video quality estimation unit 233, the frame bit amounts (Bits(I, P, B)) of the respective video frame types that have been calculated by the video frame type bit amount calculation unit 206, and the average bit amounts (Bits(I, P, B)ave), maximum bit amounts (Bits(I, P, B)max), and minimum bit amounts (Bits(I, P, B)min) of the respective video frame types that have been derived by the frame characteristic estimation unit 21.

Derivation of the difference packet loss video quality assessment value (dVq) by the difference packet loss video quality estimation unit 234 will be explained in detail.

As shown in FIGS. 28A to 28C, the result of comparison at the same number of lost frames (the number of lost frames is 1 in the example of FIGS. 28A to 28C) reveals that a video content having a large I-frame bit amount exhibits a high video quality assessment value, and a video content having a small I-frame bit amount exhibits a low video quality assessment value. In contrast, video contents having large P- and B-frame bit amounts exhibit low video quality assessment values and video contents having small P- and B-frame bit amounts exhibit high video quality assessment values.

When a value indicated by a black star in FIG. 27 is the video quality assessment value (Vq) of a video content to be estimated, the I-, P-, and B-frame bit amounts of the video content to be estimated are values indicated by black stars in FIGS. 25A to 25C. To estimate the video quality assessment value of a video content to be estimated, it suffices to calculate, from the I-, P-, and B-frame bit amounts (BitsI, BitsP, and BitsB), the difference packet loss video quality assessment value (dVq) representing a shift from the average packet loss video quality assessment value (Vqave).

If the I-frame bit amount (BitsI) equals the I-frame average bit amount (BitsIave), the P-frame bit amount (BitsP) equals the P-frame average bit amount (bitsPave), and the B-frame bit amount (BitsB) equals the B-frame average bit amount (BitsBave), the video quality assessment value (Vq) of a video content to be estimated equals the average packet loss video quality assessment value (Vqave).

If the I-frame bit amount (BitsI) is larger than the I-frame average bit amount (BitsIave), the video quality assessment value (Vq) of a video content to be estimated becomes higher than the average packet loss video quality assessment value (Vqave). To the contrary, if the I-frame bit amount (BitsI) is smaller than the I-frame average bit amount (BitsIave), the video quality assessment value (Vq) of a video content to be estimated becomes lower than the average packet loss video quality assessment value (Vqave).

That is, when the I-frame bit amount (BitsI) is larger than the I-frame average bit amount (BitsIave), the difference packet loss video quality assessment value (dVq) becomes proportional to (Vqmax−Vgave)·(BitsI−BitsIave)/(BitsImax−BitsIave). When the I-frame bit amount (Bits) is smaller than the I-frame average bit amount (BitsIave), the difference packet loss video quality assessment value (dVq) becomes proportional to (Vqmin−Vgave)·(BitsI−BitsIave)/(BitsImin−BitsIave).

If the P-frame bit amount (BitsP) is larger than the P-frame average bit amount (BitsPave), the video quality assessment value (Vq) of a video content to be estimated becomes lower than the average packet loss video quality assessment value (Vqave). In contrast, if the P-frame bit amount (BitsP) is smaller than the P-frame average bit amount (BitsPave), the video quality assessment value (Vq) of a video content to be estimated becomes higher than the average packet loss video quality assessment value (Vqave).

That is, when the P-frame bit amount (BitsP) is larger than the P-frame average bit amount (BitsPave), the difference packet loss video quality assessment value (dVq) becomes proportional to (Vqmin−Vqave)·(BitsP−BitsPave)/(BitsPmin−BitsPave). When the P-frame bit amount (BitsP) is smaller than the P-frame average bit amount (BitsPave), the difference video quality assessment value (dVq) becomes proportional to (Vqmax−Vqave)·(BitsP−BitsPave)/(BitsPmax−BitsPave).

If the B-frame bit amount (BitsB) is larger than the B-frame average bit amount (BitsBave), the video quality assessment value (Vq) of a video content to be estimated becomes lower than the average packet loss video quality assessment value (Vqave). To the contrary, if the B-frame bit amount (BitsB) is smaller than the B-frame average bit amount (BitsBave), the video quality assessment value (Vq) of a video content to be estimated becomes higher than the average packet loss video quality assessment value (Vqave).

That is, when the B-frame bit amount (BitsB) is larger than the B-frame average bit amount (BitsBave), the difference packet loss video quality assessment value (dVq) becomes proportional to (Vqmin−Vqave)·(BitsB−BitsBave)/(BitsBmin−BitsBave). When the B-frame bit amount (BitsB) is smaller than the B-frame average bit amount (BitsBave), the difference packet loss video quality assessment value (dVq) becomes proportional to (Vqmax−Vqave)·(BitsB−BitsBave)/(BitsBmax−BitsBave).

Based on these characteristics between the bit amounts of the respective video frame types and the video quality assessment value, the difference packet loss video quality estimation unit 234 estimates the difference packet loss video quality assessment value (dVq).

The video quality estimation unit 235 estimates the video quality assessment value (Vq) of a video content to be estimated by adding the average packet loss video quality assessment value (Vqave) calculated by the average packet loss video quality estimation unit 231 and the difference packet loss video quality assessment value (dVq) calculated by the difference packet loss video quality estimation unit 234.

Note that the video quality estimation apparatus 2 according to the embodiment is implemented by installing computer programs in a computer including a CPU (Central Processing Unit), memory, and interface. Various functions of the video quality estimation apparatus 2 are implemented by cooperation between various hardware resources of the computer and the computer programs (software).

The operation of the video quality estimation apparatus according to the embodiment will be explained with reference to FIGS. 17 and 18.

Figure 17:
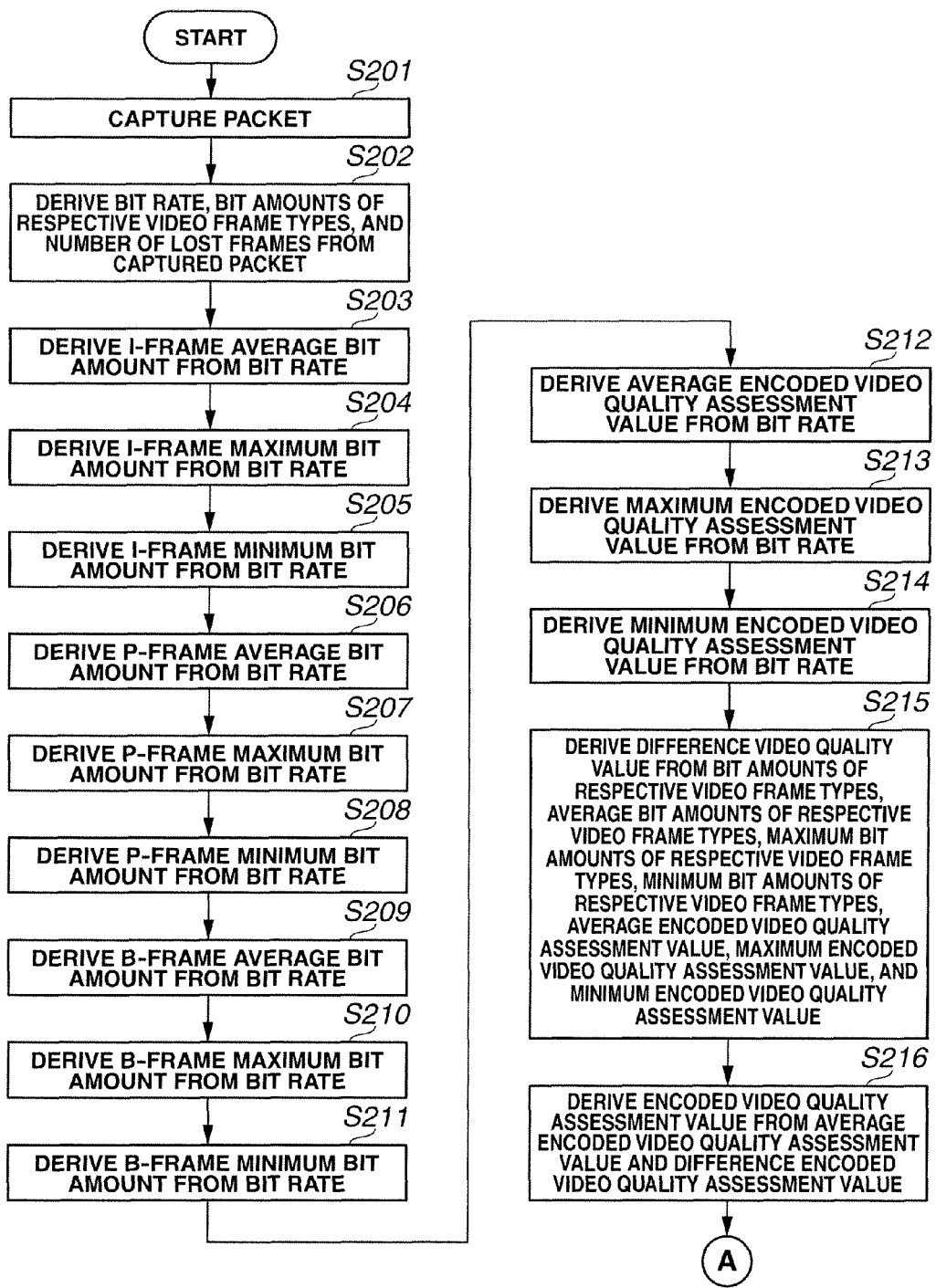
FIG. 17 is flowchart 1 showing the operation of the video quality estimation apparatus according the second embodiment of the present invention.

As shown in FIG. 17, the packet analysis unit 20 of the video quality estimation apparatus 2 captures an input packet (S201). The packet analysis unit 20 derives the bit rate (BR) of an encoded video packet, the bit amounts (BitsI, BitsP, and BitsB) of the respective video frame types, and the number of lost video frames (DF) from the captured packet (S202).

The bit rate (BR) derived by the packet analysis unit 20 is input to the I-frame average bit amount estimation unit 211, I-frame maximum bit amount estimation unit 212, I-frame minimum bit amount estimation unit 213, P-frame average bit amount estimation unit 214, P-frame maximum bit amount estimation unit 215, P-frame minimum bit amount estimation unit 216, B-frame average bit amount estimation unit 217, B-frame maximum bit amount estimation unit 218, B-frame minimum bit amount estimation unit 219, average encoded video quality estimation unit 221, maximum encoded video quality estimation unit 222, and minimum encoded video quality estimation unit 223. The bit amounts (BitsI, BitsP, and BitsB) of the respective video frame types are input to the difference encoded video quality estimation unit 224 and difference packet loss video quality estimation unit 234. The number of lost video frames (DF) is input to the average packet loss video quality estimation unit 231, maximum packet loss video quality estimation unit 232, and minimum packet loss video quality estimation unit 233.

The I-frame average bit amount estimation unit 211 derives an I-frame average bit amount (BitsIave) based on the bit rate (BR) derived by the packet analysis unit 20 (S203).

The I-frame average bit amount (BitsIave) has a characteristic in which it increases as the bit rate (BR) increases, and may be derived using equation (21) representing this characteristic:

$$\text{Bits}I\text{ave} = u1 + u2\exp(-BR/u3) \qquad (21)$$

where BitsIave is the I-frame average bit amount, BR is the bit rate, and u1, ..., u3 are characteristic coefficients.

The I-frame average bit amount estimation unit 211 outputs the derived I-frame average bit amount (BitsIave) to the difference encoded video quality estimation unit 224 and difference packet loss video quality estimation unit 234.

The I-frame maximum bit amount estimation unit 212 derives an I-frame maximum bit amount (BitsImax) based on the bit rate (BR) derived by the packet analysis unit 20 (S204).

The I-frame maximum bit amount (BitsImax) has a characteristic in which it increases as the bit rate (BR) increases, and may be derived using equation (22) representing this characteristic:

$$\text{Bits}I\text{max} = u4 + u5\exp(-BR/u6) \qquad (22)$$

where BitsImax is the I-frame maximum bit amount, BR is the bit rate, and u4, ..., u6 are characteristic coefficients.

The I-frame maximum bit amount estimation unit 212 outputs the derived I-frame maximum bit amount (BitsImax) to the difference encoded video quality estimation unit 224 and difference packet loss video quality estimation unit 234.

The I-frame minimum bit amount estimation unit 213 derives an I-frame minimum bit amount (BitsImin) based on the bit rate (BR) derived by the packet analysis unit 20 (S205).

The I-frame minimum bit amount (BitsImin) has a characteristic in which it increases as the bit rate (BR) increases, and may be derived using equation (23) representing this characteristic:

$$\text{Bits}I\text{min} = u7 + u8\exp(-BR/u9) \qquad (23)$$

where BitsImin is the I-frame minimum bit amount, BR is the bit rate, and u7, ..., u9 are characteristic coefficients.

The I-frame minimum bit amount estimation unit 213 outputs the derived I-frame minimum bit amount (BitsImin) to the difference encoded video quality estimation unit 224 and difference packet loss video quality estimation unit 234.

The P-frame average bit amount estimation unit 214 derives a P-frame average bit amount (BitsPave) based on the bit rate (BR) derived by the packet analysis unit 20 (S206).

The P-frame average bit amount (BitsPave) has a characteristic in which it increases as the bit rate (BR) increases, and may be derived using equation (24) representing this characteristic:

$$\text{Bits}P\text{ave} = u10 + u11 \cdot BR \qquad (24)$$

where BitsPave is the P-frame average bit amount, BR is the bit rate, and u10 and u11 are characteristic coefficients.

The P-frame average bit amount estimation unit 214 outputs the derived P-frame average bit amount (BitsPave) to the difference encoded video quality estimation unit 224 and difference packet loss video quality estimation unit 234.

The P-frame maximum bit amount estimation unit 215 derives a P-frame maximum bit amount (BitsPmax) based on the bit rate (BR) derived by the packet analysis unit 20 (S207).

The P-frame maximum bit amount (BitsPmax) has a characteristic in which it increases as the bit rate (BR) increases, and may be derived using equation (25) representing this characteristic:

$$\text{Bits}P\text{max} = u12 + u13 \cdot BR \qquad (25)$$

where BitsPmax is the P-frame maximum bit amount, BR is the bit rate, and u12 and u13 are characteristic coefficients.

The P-frame maximum bit amount estimation unit 215 outputs the derived P-frame maximum bit amount (BitsPmax) to the difference encoded video quality estimation unit 224 and difference packet loss video quality estimation unit 234.

The P-frame minimum bit amount estimation unit 216 derives a P-frame minimum bit amount (BitsPmin) based on the bit rate (BR) derived by the packet analysis unit 20 (S208).

The P-frame minimum bit amount (BitsPmin) has a characteristic in which it increases as the bit rate (BR) increases, and may be derived using equation (26) representing this characteristic:

$$\text{Bits}P\text{min} = u14 + u15 \cdot BR \qquad (26)$$

where BitsPmin is the P-frame minimum bit amount, BR is the bit rate, and u14 and u15 are characteristic coefficients.

The P-frame minimum bit amount estimation unit 216 outputs the derived P-frame minimum bit amount (BitsPmin) to the difference encoded video quality estimation unit 224 and difference packet loss video quality estimation unit 234.

The B-frame average bit amount estimation unit 217 derives a B-frame average bit amount (BitsBave) based on the bit rate (BR) derived by the packet analysis unit 20 (S209).

The B-frame average bit amount (BitsBave) has a characteristic in which it increases as the bit rate (BR) increases, and may be derived using equation (27) representing this characteristic:

$$\text{Bits}B\text{ave} = u16 + u17 \cdot BR \qquad (27)$$

where BitsBave is the B-frame average bit amount, BR is the bit rate, and u16 and u17 are characteristic coefficients.

The B-frame average bit amount estimation unit 217 outputs the derived B-frame average bit amount (BitsBave) to the difference encoded video quality estimation unit 224 and difference packet loss video quality estimation unit 234.

The B-frame maximum bit amount estimation unit 218 derives a B-frame maximum bit amount (BitsBmax) based on the bit rate (BR) derived by the packet analysis unit 20 (S210).

The B-frame maximum bit amount (BitsBmax) has a characteristic in which it increases as the bit rate (BR) increases, and may be derived using equation (28) representing this characteristic:

$$\text{Bits}B\text{max} = u18 + u19 \cdot BR \qquad (28)$$

where BitsBmax is the B-frame maximum bit amount, BR is the bit rate, and u18 and u19 are characteristic coefficients.

The B-frame maximum bit amount estimation unit 218 outputs the derived B-frame maximum bit amount (BitsBmax) to the difference encoded video quality estimation unit 224 and difference packet loss video quality estimation unit 234.

The B-frame minimum bit amount estimation unit 219 derives a B-frame minimum bit amount (BitsBmin) based on the bit rate (BR) derived by the packet analysis unit 20 (S211).

The B-frame minimum bit amount (BitsBmin) has a characteristic in which it increases as the bit rate (BR) increases, and may be derived using equation (29) representing this characteristic:

$$BitsBmin = u20 + u21 \cdot BR \quad (29)$$

where BitsBmin is the B-frame minimum bit amount, BR is the bit rate, and u20 and u21 are characteristic coefficients.

The B-frame minimum bit amount estimation unit 219 outputs the derived B-frame minimum bit amount (BitsBmin) to the difference encoded video quality estimation unit 224 and difference packet loss video quality estimation unit 234.

The average encoded video quality estimation unit 221 derives an average encoded video quality assessment value (Vqcave) based on the bit rate (BR) derived by the packet analysis unit 20 (S212).

The average encoded video quality assessment value (Vqcave) has a characteristic in which it increases as the bit rate (BR) increases, and may be derived using equation (30) or (31) representing this characteristic:

$$Vqcave = u22 + u23 \exp(-BR/u24) \quad (30)$$

or $$Vqcave = 1 + u22 - u22/(1 + (BR/u23)^{u24}) \quad (31)$$

where Vqcave is the average encoded video quality assessment value, BR is the bit rate, and u22, ..., u24 are characteristic coefficients.

The average encoded video quality estimation unit 221 outputs the derived average encoded video quality assessment value (Vqcave) to the encoded video quality estimation unit 225.

The maximum encoded video quality estimation unit 222 derives a maximum encoded video quality assessment value (Vqcmax) based on the bit rate (BR) derived by the packet analysis unit 20 (S213).

The maximum encoded video quality assessment value (Vqcmax) has a characteristic in which it increases as the bit rate (BR) increases, and may be derived using equation (32) or (33) representing this characteristic:

$$Vqcmax = u25 + u26 \exp(-BR/u27) \quad (32)$$

or $$Vqcmax = 1 + u25 - u25/(1 + (BR/u26)^{u27}) \quad (33)$$

where Vqcmax is the maximum encoded video quality assessment value, BR is the bit rate, and u25, ..., u27 are characteristic coefficients.

The maximum encoded video quality estimation unit 222 outputs the derived maximum encoded video quality assessment value (Vqcmax) to the encoded video quality estimation unit 225.

The minimum encoded video quality estimation unit 223 derives a minimum encoded video quality assessment value (Vqcmin) based on the bit rate (BR) derived by the packet analysis unit 20 (S214).

The minimum encoded video quality assessment value (Vqcmin) has a characteristic in which it increases as the bit rate (BR) increases, and may be derived using equation (34) or (35) representing this characteristic:

$$Vqcmin = u28 + u29 \exp(-BR/u30) \quad (34)$$

or $$Vqcmin = 1 + u28 - u28/(1 + (BR/u29)^{u30}) \quad (35)$$

where Vqcmin is the minimum encoded video quality assessment value, BR is the bit rate, and u28, ..., u30 are characteristic coefficients.

The minimum encoded video quality estimation unit 223 outputs the derived minimum encoded video quality assessment value (Vqcmin) to the encoded video quality estimation unit 225.

The difference encoded video quality estimation unit 224 derives a difference encoded video quality assessment value (dVqc) based on the average encoded video quality assessment value (Vqcave) calculated by the average encoded video quality estimation unit 221, the maximum encoded video quality assessment value (Vqcmax) calculated by the maximum encoded video quality estimation unit 222, the minimum encoded video quality assessment value (Vqcmin) calculated by the minimum encoded video quality estimation unit 223, the I-frame bit amount (BitsI), P-frame bit amount (BitsP), and B-frame bit amount (BitsB) calculated by the video frame type bit amount calculation unit 206, the I-frame average bit amount (BitsIave) calculated by the I-frame average bit amount estimation unit 211, the I-frame maximum bit amount (BitsImax) calculated by the I-frame maximum bit amount estimation unit 212, the I-frame minimum bit amount (BitsImin) calculated by the I-frame minimum bit amount estimation unit 213, the P-frame average bit amount (BitsPave) calculated by the P-frame average bit amount estimation unit 214, the P-frame maximum bit amount (BitsPmax) calculated by the P-frame maximum bit amount estimation unit 215, the P-frame minimum bit amount (BitsPmin) calculated by the P-frame minimum bit amount estimation unit 216, the B-frame average bit amount (BitsBave) calculated by the B-frame average bit amount estimation unit 217, the B-frame maximum bit amount (BitsBmax) calculated by the B-frame maximum bit amount estimation unit 218, and the B-frame minimum bit amount (BitsBmin) calculated by the B-frame minimum bit amount estimation unit 219 (S215).

When the I-frame bit amount (BitsI) is larger than the I-frame average bit amount (BitsIave), the difference encoded video quality assessment value (dVqc) becomes proportional to (Vqcmax−Vqcave)·(BitsI−BitsIave)/(BitsImax−BitsIave). When the I-frame bit amount (BitsI) is smaller than the I-frame average bit amount (BitsIave), the difference encoded video quality assessment value (dVqc) becomes proportional to (Vqcmin−Vqcave)·(BitsI−BitsIave)/(BitsImin−BitsIave).

When the P-frame bit amount (BitsP) is larger than the P-frame average bit amount (BitsPave), the difference encoded video quality assessment value (dVqc) becomes proportional to (Vqcmin−Vqcave)·(BitsP−BitsPave)/(BitsPmin−BitsPave). When the P-frame bit amount (BitsP) is smaller than the P-frame average bit amount (BitsPave), the difference encoded video quality assessment value (dVqc) becomes proportional to (Vqcmax−Vqcave)·(BitsP−BitsPave)/(BitsPmax−BitsPave).

When the B-frame bit amount (BitsB) is larger than the B-frame average bit amount (BitsBave), the difference encoded video quality assessment value (dVqc) becomes proportional to (Vqcmin−Vqcave)·(BitsB−BitsBave)/(BitsBmin−BitsBave). When the B-frame bit amount (BitsB) is smaller than the B-frame average bit amount (BitsBave), the difference encoded video quality assessment value (dVqc) becomes proportional to (Vqcmax−Vqcave)·(BitsB−BitsBave)/(BitsBmax−BitsBave).

The difference encoded video quality estimation unit 224 may derive the difference encoded video quality assessment value (dVqc) using equation (36) representing these characteristics of the difference encoded video quality assessment value:

$$dVqc = u31 + u32 \cdot X + u33 \cdot Y + u34 \cdot Z \qquad (36)$$

where dVqc is the difference encoded video quality assessment value, X is the degree of influence of the I-frame bit amount on the difference encoded video quality assessment value, Y is the degree of influence of the P-frame bit amount on the difference encoded video quality assessment value, Z is the degree of influence of the B-frame bit amount on the difference encoded video quality assessment value, and u31, ..., u34 are characteristic coefficients.

The difference encoded video quality estimation unit 224 outputs the derived difference encoded video quality assessment value (dVqc) to the encoded video quality estimation unit 225.

X, Y, and Z in equation (36) may be derived using equations (37).

[For BitsI>BitsIave]

$$X = (Vqc\text{max} - Vqc\text{ave})(BitsI - BitsI\text{ave})/(BitsI\text{max} - BitsI\text{ave})$$

[For BitsI<BitsIave]

$$X = (Vqc\text{min} - Vqc\text{ave})(BitsI - BitsI\text{ave})/(BitsI\text{min} - BitsI\text{ave})$$

[For BitsP<BitsPave]

$$Y = (Vqc\text{max} - Vqc\text{ave})(BitsP - BitsP\text{ave})/(BitsP\text{max} - BitsP\text{ave})$$

[For BitsP>BitsPave]

$$Y = (Vqc\text{min} - Vqc\text{ave})(BitsP - BitsP\text{ave})/(BitsP\text{min} - BitsP\text{ave})$$

[For BitsB<BitsBave]

$$Z = (Vqc\text{max} - Vqc\text{ave})(BitsB - BitsB\text{ave})/(BitsB\text{max} - BitsB\text{ave})$$

[For BitsB>BitsBave]

$$Z = (Vqc\text{min} - Vqc\text{ave})(BitsB - BitsB\text{ave})/(BitsB\text{min} - BitsB\text{ave}) \qquad (37)$$

The encoded video quality estimation unit 225 derives an encoded video quality assessment value (Vqc) using equation (38) based on the average encoded video quality assessment value (Vqcave) calculated by the average encoded video quality estimation unit 221 and the difference encoded video quality assessment value (dVqc) calculated by the difference encoded video quality estimation unit 224 (S216):

$$Vqc = Vqc\text{ave} + dVqc \qquad (38)$$

The encoded video quality estimation unit 225 outputs the derived encoded video quality assessment value (Vqc) to the average packet loss video quality estimation unit 231, maximum packet loss video quality estimation unit 232, and minimum packet loss video quality estimation unit 233.

Figure 18:
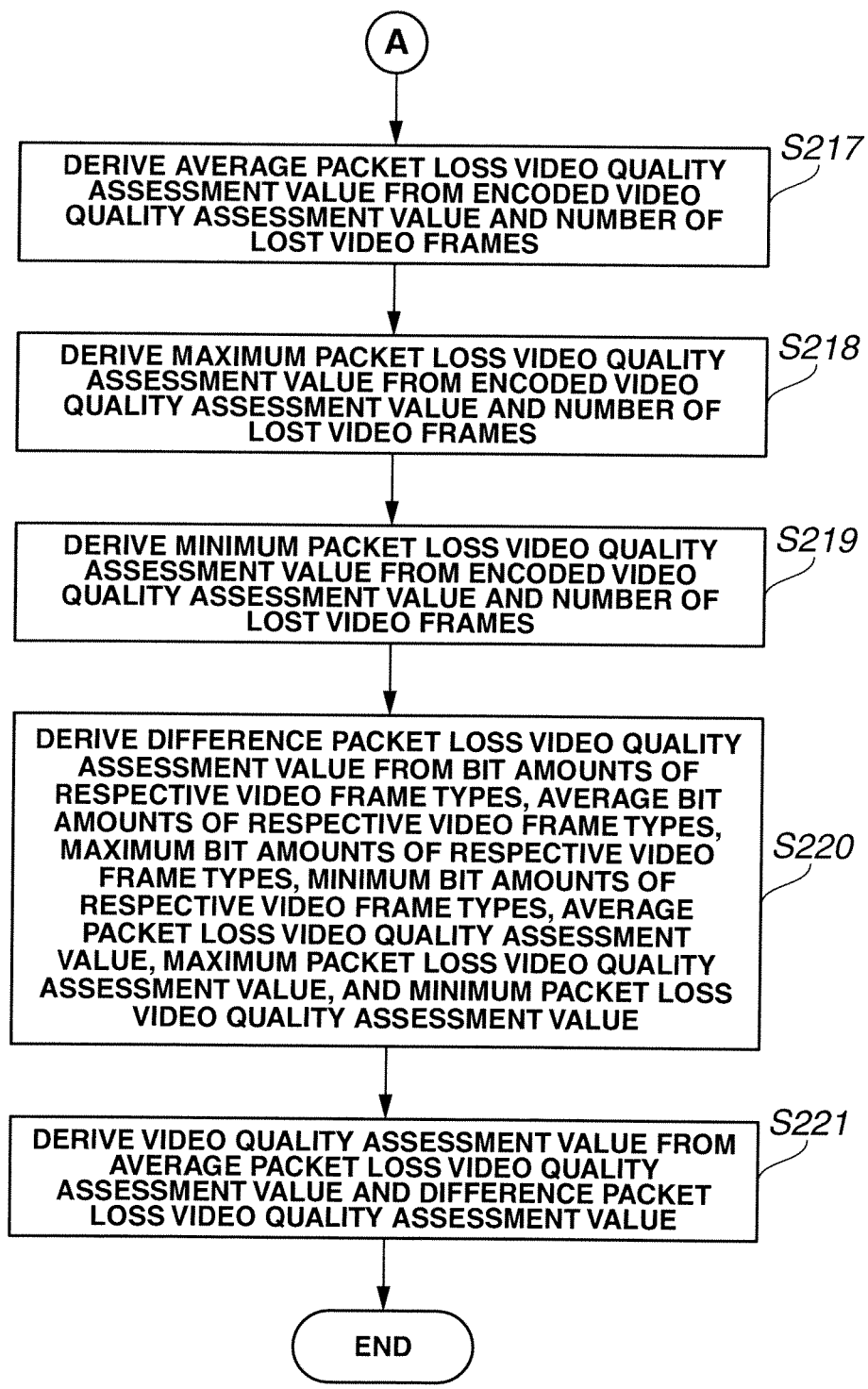
FIG. 18 is flowchart 2 showing the operation of the video quality estimation apparatus according to the second embodiment of the present invention.

As shown in FIG. 18, the average packet loss video quality estimation unit 231 derives an average packet loss video quality assessment value (Vqave) based on the number of lost video frames (DF) derived by the packet analysis unit 20 and the encoded video quality assessment value (Vqc) derived by the encoded video quality estimation unit 225 (S217).

The average packet loss video quality assessment value (Vqave) has a characteristic in which it decreases as the number of lost video frames (DF) increases, and may be derived using equation (39) representing this characteristic:

$$Vq\text{ave} = 1 + (Vqc - 1)((1 - u35)\exp(-DF/u36) + u35\exp(-DF/u37)) \qquad (39)$$

where Vqc is the encoded video quality assessment value, Vqave is the average packet loss video quality assessment value, DF is the number of lost video frames, and u35, ..., u37 are characteristic coefficients.

The average packet loss video quality estimation unit 231 outputs the derived average packet loss video quality assessment value (Vqave) to the video quality estimation unit 235.

The maximum packet loss video quality estimation unit 232 derives a maximum packet loss video quality assessment value (Vqmax) based on the number of lost video frames (DF) derived by the packet analysis unit 20 and the encoded video quality assessment value (Vqc) derived by the encoded video quality estimation unit 225 (S218).

The maximum packet loss video quality assessment value (Vqmax) has a characteristic in which it decreases as the number of lost video frames (DF) increases, and may be derived using equation (40) representing this characteristic:

$$Vq\text{max} = 1 + (Vqc - 1)((1 - u38)\exp(-DF/u39) + u39\exp(-DF/u40)) \qquad (40)$$

where Vqc is the encoded video quality assessment value, Vqmax is the maximum packet loss video quality assessment value, DF is the number of lost video frames, and u38, ..., u40 are characteristic coefficients.

The maximum packet loss video quality estimation unit 232 outputs the derived maximum packet loss video quality assessment value (Vqmax) to the video quality estimation unit 235.

The minimum packet loss video quality estimation unit 233 derives a minimum packet loss video quality assessment value (Vqmin) based on the number of lost video frames (DF) derived by the packet analysis unit 20 and the encoded video quality assessment value (Vqc) derived by the encoded video quality estimation unit 225 (S219).

The minimum packet loss video quality assessment value (Vqmin) has a characteristic in which it decreases as the number of lost video frames (DF) increases, and may be derived using equation (41) representing this characteristic:

$$Vq\text{min} = 1 + (Vqc - 1)((1 - u41)\exp(-DF/u42) + u41\exp(-DF/u43)) \qquad (41)$$

where Vqc is the encoded video quality assessment value, Vqmin is the minimum packet loss video quality assessment value, DF is the number of lost video frames, and u41, ..., u43 are characteristic coefficients.

The minimum packet loss video quality estimation unit 233 outputs the derived minimum packet loss video quality assessment value (Vqmin) to the video quality estimation unit 235.

The difference packet loss video quality estimation unit 234 derives a difference packet loss video quality assessment value (dVq) based on the average packet loss video quality assessment value (Vqave) calculated by the average packet loss video quality estimation unit 231, the maximum packet loss video quality assessment value (Vqmax) calculated by the maximum packet loss video quality estimation unit 232, the minimum packet loss video quality assessment value (Vqmin) calculated by the minimum packet loss video quality estimation unit 233, the I-frame bit amount (BitsI), P-frame bit amount (BitsP), and B-frame bit amount (BitsB) calculated by the video frame type bit amount calculation unit 206, the I-frame average bit amount (BitsIave) calculated by the I-frame average bit amount estimation unit 211, the I-frame maximum bit amount (BitsImax) calculated by the I-frame maximum bit amount estimation unit 212, the I-frame minimum bit amount (BitsImin) calculated by the I-frame minimum bit amount estimation unit 213, the P-frame average bit amount (BitsPave) calculated by the P-frame average bit amount estimation unit 214, the P-frame maximum bit amount (BitsPmax) calculated by the P-frame maximum bit amount estimation unit 215, the P-frame minimum bit amount (BitsPmin) calculated by the P-frame minimum bit amount estimation unit 216, the B-frame average bit amount (BitsBave) calculated by the B-frame average bit amount estimation unit 217, the B-frame maximum bit amount (BitsBmax) calculated by the B-frame maximum bit amount estimation unit 218, and the B-frame minimum bit amount (BitsBmin) calculated by the B-frame minimum bit amount estimation unit 219 (S220).

When the I-frame bit amount (BitsI) is larger than the I-frame average bit amount (BitsIave), the difference packet loss video quality assessment value (dVq) becomes proportional to (Vqmax−Vqave)·(BitsI−BitsIave)/(BitsImax−BitsIave). When the I-frame bit amount (BitsI) is smaller than the I-frame average bit amount (BitsIave), the difference packet loss video quality assessment value (dVq) becomes proportional to (Vqmin−Vqave)·(BitsI−BitsIave)/(BitsImin−BitsIave).

When the P-frame bit amount (BitsP) is larger than the P-frame average bit amount (BitsPave), the difference packet loss video quality assessment value (dVq) becomes proportional to (Vqmin−Vqave)·(BitsP−BitsPave)/(BitsPmin−BitsPave). When the P-frame bit amount (BitsP) is smaller than the P-frame average bit amount (BitsPave), the difference packet loss video quality assessment value (dVq) becomes proportional to (Vqmax−Vqave)−(BitsP−BitsPave)/(BitsPmax−BitsPave).

When the B-frame bit amount (BitsB) is larger than the B-frame average bit amount (BitsBave), the difference packet loss video quality assessment value (dVq) becomes proportional to (Vqmin−Vqave)·(BitsB−BitsBave)/(BitsBmin−BitsBave). When the B-frame bit amount (BitsB) is smaller than the B-frame average bit amount (BitsBave), the difference packet loss video quality assessment value (dVq) becomes proportional to (Vqmax−Vqave)·(BitsB−BitsBave)/(BitsBmax−BitsBave).

The difference packet loss video quality estimation unit 234 may derive the difference packet loss video quality assessment value (dVq) using equation (42) representing these characteristics of the difference packet loss video quality assessment value:

$$dVq = u44 + u45 \cdot S + u46 \cdot T + u47 \cdot U \quad (42)$$

where dVq is the difference packet loss video quality assessment value, S is the degree of influence of the I-frame bit amount on the difference packet loss video quality assessment value, T is the degree of influence of the P-frame bit amount on the difference packet loss video quality assessment value, U is the degree of influence of the B-frame bit amount on the difference packet loss video quality assessment value, and u44, . . . , u47 are characteristic coefficients.

The difference packet loss video quality estimation unit 234 outputs the derived difference packet loss video quality assessment value (dVq) to the video quality estimation unit 235.

S, T, and U in equation (42) may be derived using equations (43).

[For BitsI>BitsIave]

$$S = (Vqmax - Vqave)(BitsI - BitsIave)/(BitsImax - BitsIave)$$

[For BitsI<BitsIave]

$$S = (Vqmin - Vqave)(BitsI - BitsIave)/(BitsImin - BitsIave)$$

[For BitsP<BitsPave]

$$T = (Vqmax - Vqave)(BitsP - BitsPave)/(BitsPmax - BitsPave)$$

[For BitsP>BitsPave]

$$T = (Vqmin - Vqave)(BitsP - BitsPave)/(BitsPmin - BitsPave)$$

[For BitsB<BitsBave]

$$U = (Vqmax - Vqave)(BitsB - BitsBave)/(BitsBmax - BitsBave)$$

[For BitsB>BitsBave]

$$U = (Vqmin - Vqave)(BitsB - BitsBave)/(BitsBmin - BitsBave) \quad (43)$$

After the difference packet loss video quality estimation unit 234 derives the difference packet loss video quality assessment value (dVq), the video quality estimation unit 235 derives the video quality assessment value (Vq) of the video content using equation (44) based on the average packet loss video quality assessment value (Vqave) calculated by the average packet loss video quality estimation unit 231 and the difference packet loss video quality assessment value (dVq) calculated by the difference packet loss video quality estimation unit 234 (S221):

$$Vq = Vqave + dVq \quad (44)$$

As the characteristic coefficients (u1, . . . , u47) used to derive the average bit amounts, maximum bit amounts, and minimum bit amounts of the respective video frame types, the average encoded video quality assessment value, the maximum encoded video quality assessment value, the minimum encoded video quality assessment value, the difference encoded video quality assessment value, the average packet loss video quality assessment value, the maximum packet loss video quality assessment value, the minimum packet loss video quality assessment value, and the difference packet loss video quality assessment value, relevant characteristic coefficients are selected from a quality characteristic coefficient database in a storage unit (not shown) arranged in the video quality estimation apparatus 2.

In an example of the quality characteristic coefficient database shown in FIG. 19, the characteristic coefficient is described in correspondence with a prerequisite such as the video CODEC method.

The video quality assessment value depends on the implementation of a video CODEC. For example, the video quality assessment value differs between a video content encoded by H.264 and a video content encoded by MPEG2 even at the same bit rate. Similarly, the video quality assessment value depends on prerequisites including the video format and frame rate. In the quality characteristic coefficient database shown in FIG. 19, the characteristic coefficient is described for each prerequisite.

In this fashion, the video quality assessment value of each video in video communication services can be estimated based on header information of an input packet using a bit rate extracted from the input packet, bit amounts derived for the respective video frame types after specifying video frame types, and the number of lost video frames. When deriving a video quality value, arithmetic processing need not be executed for all pixels which form a video frame. In other words, the video quality value can be derived by performing arithmetic processing for packet header information which is a relatively small amount of information. This can suppress the arithmetic processing cost.

The video communication service provider can easily determine whether a service being provided maintains a predetermined or higher quality for the user, and can grasp and manage in real time the actual quality of the service being provided.

Third Embodiment

A video quality estimation apparatus according to the third embodiment of the present invention has the same arrangement as that of the video quality estimation apparatus 2 described in the second embodiment. In addition, the video quality estimation apparatus according to the third embodiment implements objective video quality assessment by deriving a video quality assessment value quantitatively representing video quality using the characteristic of a specific video frame type.

In the following description, the video quality estimation apparatus derives a video quality assessment value using the characteristics of I-frames out of I-, P-, and B-frames serving as video frame types.

Figure 20:
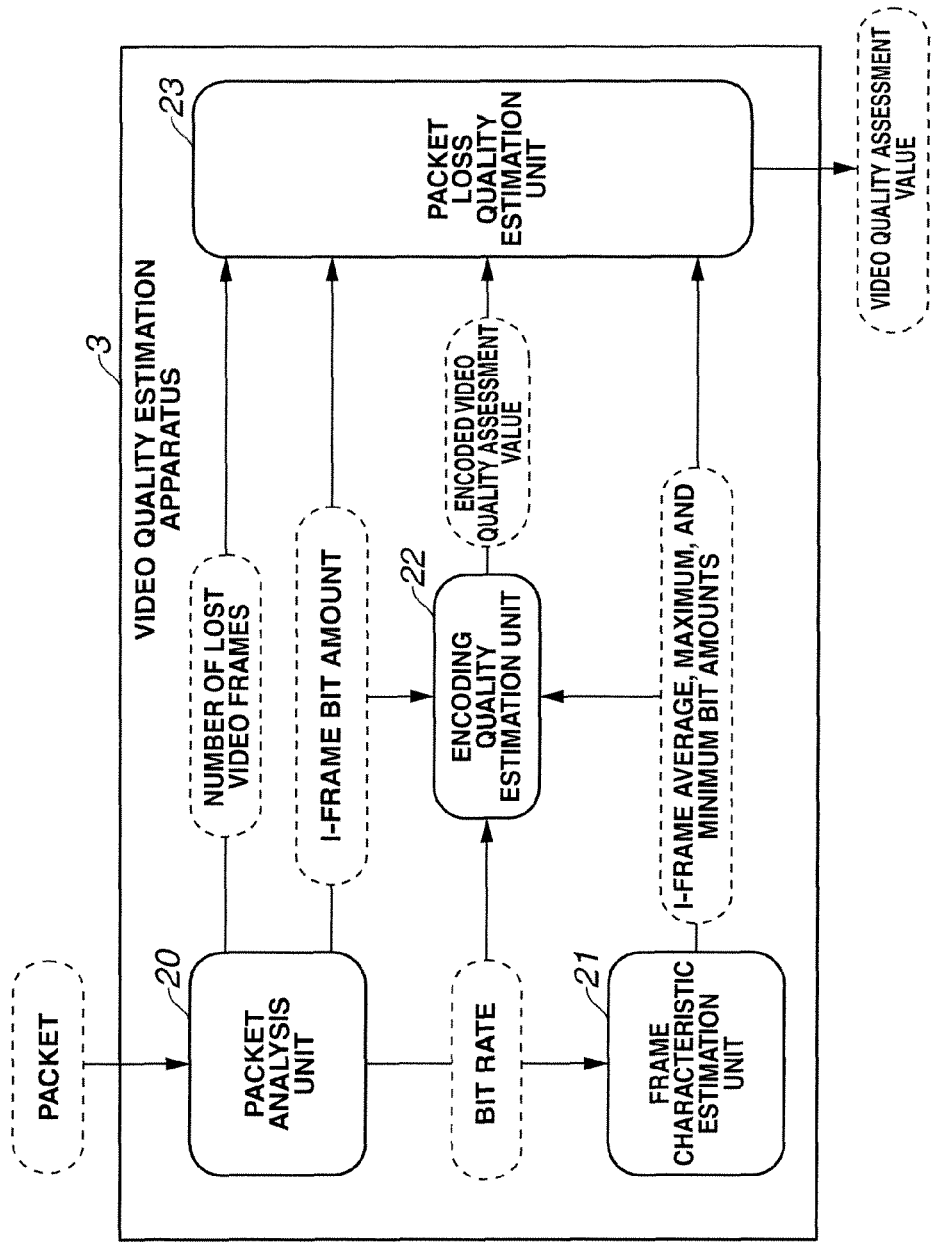
FIG. 20 is a block diagram showing the arrangement of a video quality estimation apparatus according to the third embodiment of the present invention.

As shown in FIG. 20, a video quality estimation apparatus 3 according to the embodiment includes a packet analysis unit 20 which derives a bit rate, lost video frame, and I-frame bit amount in an input packet, a frame characteristic estimation unit 21 which derives the frame characteristics of I-frames, an encoding quality estimation unit 22 which derives an encoded video quality assessment value from the bit rate, the I-frame bit amount, and the frame characteristics of I-frames, and a packet loss quality estimation unit 23 which derives a video quality assessment value from the number of lost video frames, the encoded video quality assessment value, and the frame characteristics of I-frames.

Note that the building components of the video quality estimation apparatus 3 according to the embodiment have the same arrangement and functions as those of the video quality estimation apparatus 2 described in the second embodiment. Thus, the same reference numerals denote the same parts, and a detailed description thereof will not be repeated.

A video quality assessment value derivation operation by the video quality estimation apparatus 3 according to the embodiment will be described with reference to FIGS. 21 and 22.

Figure 21:
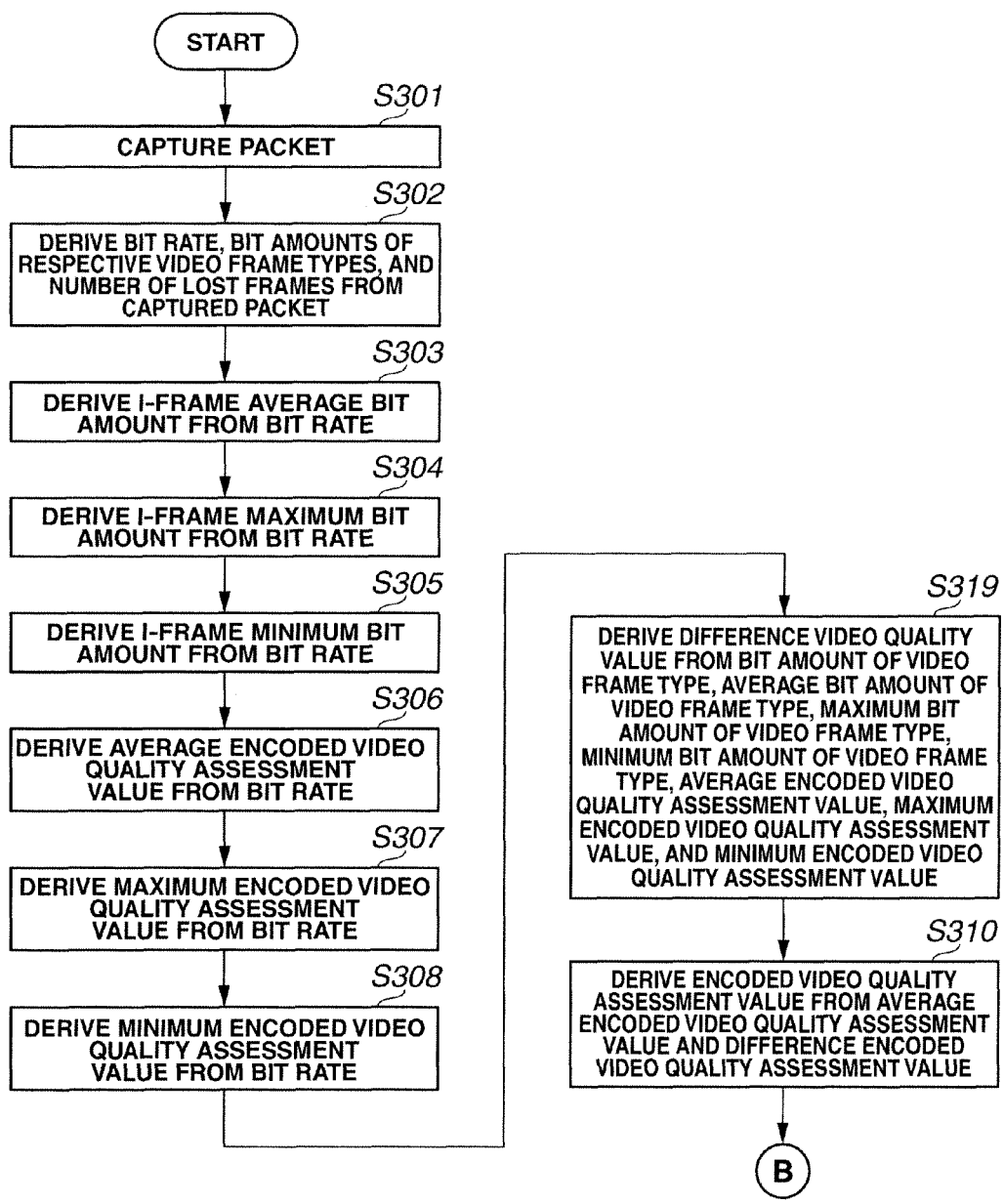
FIG. 21 is flowchart 1 showing the operation of the video quality estimation apparatus according to the third embodiment of the present invention.

As shown in FIG. 21, the packet analysis unit 20 of the video quality estimation apparatus 3 captures an input packet (S301). The packet analysis unit 20 derives the bit rate (BR) of an encoded video packet, the I-frame bit amount (BitsI), and the number of lost video frames (DF) from the captured packet (S302).

The bit rate (BR) derived by the packet analysis unit 20 is input to the frame characteristic estimation unit 21 and encoding quality estimation unit 22. The I-frame bit amount (BitsI) is input to the encoding quality estimation unit 22 and packet loss quality estimation unit 23. The number of lost video frames (DF) is input to the packet loss quality estimation unit 23.

After the bit rate (BR) derived by the packet analysis unit 20 is input to the frame characteristic estimation unit 21, an I-frame average bit amount estimation unit 211 of the frame characteristic estimation unit 21 derives an I-frame average bit amount (BitsIave) based on the input bit rate (BR) (S303).

The I-frame average bit amount (BitsIave) has a characteristic in which it increases as the bit rate (BR) increases, and may be derived using equation (50) representing this characteristic:

$$\text{Bits}I\text{ave}=w1+w2\exp(-BR/w3) \quad (50)$$

where BitsIave is the I-frame average bit amount, BR is the bit rate, and w1, ..., w3 are characteristic coefficients.

The I-frame average bit amount estimation unit 211 outputs the derived I-frame average bit amount (BitsIave) to the encoding quality estimation unit 22 and packet loss quality estimation unit 23.

After the bit rate (BR) derived by the packet analysis unit 20 is input to the frame characteristic estimation unit 21, an I-frame maximum bit amount estimation unit 212 of the frame characteristic estimation unit 21 derives an I-frame maximum bit amount (BitsImax) based on the input bit rate (BR) (S304).

The I-frame maximum bit amount (BitsImax) has a characteristic in which it increases as the bit rate (BR) increases, and may be derived using equation (51) representing this characteristic:

$$\text{Bits}I\text{max}=w4+w5\exp(-BR/w6) \quad (51)$$

where BitsImax is the I-frame maximum bit amount, BR is the bit rate, and w4, ..., w6 are characteristic coefficients.

The I-frame maximum bit amount estimation unit 212 outputs the derived I-frame maximum bit amount (BitsImax) to the encoding quality estimation unit 22 and packet loss quality estimation unit 23.

After the bit rate (BR) derived by the packet analysis unit 20 is input to the frame characteristic estimation unit 21, an I-frame minimum bit amount estimation unit 213 of the frame characteristic estimation unit 21 derives an I-frame minimum bit amount (BitsImin) based on the input bit rate (BR) (S305).

The I-frame minimum bit amount (BitsImin) has a characteristic in which it increases as the bit rate (BR) increases, and may be derived using equation (52) representing this characteristic:

$$\text{Bits}I\text{min}=w7+w8\exp(-BR/w9) \quad (52)$$

where BitsImin is the I-frame minimum bit amount, BR is the bit rate, and w7, ..., w9 are characteristic coefficients.

The I-frame minimum bit amount estimation unit 213 outputs the derived I-frame minimum bit amount (BitsImin) to the encoding quality estimation unit 22 and packet loss quality estimation unit 23.

After the bit rate (BR) derived by the packet analysis unit 20 is input to the encoding quality estimation unit 22, an average encoded video quality estimation unit 221 of the encoding quality estimation unit 22 derives an average encoded video quality assessment value (Vqcave) based on the input bit rate (BR) (S306).

The average encoded video quality assessment value (Vqcave) has a characteristic in which it increases as the bit rate (BR) increases, and may be derived using equation (53) or (54) representing this characteristic:

$$V q\text{cave}=w10+w11\exp(-BR/w12) \quad (53)$$

or $$V q\text{cave}=1+w10-w10/(1+(BR/w11)^{w12}) \quad (54)$$

where Vqcave is the average encoded video quality assessment value, BR is the bit rate, and w10, ..., w12 are characteristic coefficients.

The average encoded video quality estimation unit 221 outputs the derived average encoded video quality assessment value (Vqcave) to an encoded video quality estimation unit 225.

After the bit rate (BR) derived by the packet analysis unit 20 is input to the encoding quality estimation unit 22, a maximum encoded video quality estimation unit 222 of the encoding quality estimation unit 22 derives a maximum encoded video quality assessment value (Vqcmax) based on the input bit rate (BR) (S307).

The maximum encoded video quality assessment value (Vqcmax) has a characteristic in which it increases as the bit rate (BR) increases, and may be derived using equation (5) or (56) representing this characteristic:

$$Vqcmax = w13 + w14 \exp(-BR/w15) \quad (55)$$

or $$Vqcmax = 1 + w13 - w14/(1 + (BR/w14)^{w15}) \quad (56)$$

where Vqcmax is the maximum encoded video quality assessment value, BR is the bit rate, and w13, ..., w15 are characteristic coefficients.

The maximum encoded video quality estimation unit 222 outputs the derived maximum encoded video quality assessment value (Vqcmax) to the encoded video quality estimation unit 225.

After the bit rate (BR) derived by the packet analysis unit 20 is input to the encoding quality estimation unit 22, a minimum encoded video quality estimation unit 223 of the encoding quality estimation unit 22 derives a minimum encoded video quality assessment value (Vqcmin) based on the input bit rate (BR) (S308).

The minimum encoded video quality assessment value (Vqcmin) has a characteristic in which it increases as the bit rate (BR) increases, and may be derived using equation (57) or (58) representing this characteristic:

$$Vqcmin = w16 + w17 \exp(-BR/w18) \quad (57)$$

or $$Vqcmin = 1 + w16 - w16/(1 + (BR/w17)^{w18}) \quad (58)$$

where Vqcmin is the minimum encoded video quality assessment value, BR is the bit rate, and w16, ..., w18 are characteristic coefficients.

The minimum encoded video quality estimation unit 223 outputs the derived minimum encoded video quality assessment value (Vqcmin) to the encoded video quality estimation unit 225.

A difference encoded video quality estimation unit 224 of the encoding quality estimation unit 22 derives a difference encoded video quality assessment value (dVqc) based on the average encoded video quality assessment value (Vqcave) calculated by the average encoded video quality estimation unit 221, the maximum encoded video quality assessment value (Vqcmax) calculated by the maximum encoded video quality estimation unit 222, the minimum encoded video quality assessment value (Vqcmin) calculated by the minimum encoded video quality estimation unit 223, the I-frame bit amount (BitsI) calculated by the video frame type bit amount calculation unit 206, the I-frame average bit amount (BitsIave) calculated by the I-frame average bit amount estimation unit 211, the I-frame maximum bit amount (BitsImax) calculated by the I-frame maximum bit amount estimation unit 212, and the I-frame minimum bit amount (BitsImin) calculated by the I-frame minimum bit amount estimation unit 213 (S309).

When the I-frame bit amount (BitsI) is larger than the I-frame average bit amount (BitsIave), the difference encoded video quality assessment value (dVqc) becomes proportional to (Vqcmax−Vqcave)·(BitsI−BitsIave)/(BitsImax−BitsIave).

When the I-frame bit amount (BitsI) is smaller than the I-frame average bit amount (BitsIave), the difference encoded video quality assessment value (dVqc) becomes proportional to (Vqcmin−Vqcave)·(BitsI−BitsIave)/(BitsImin−BitsIave).

Equation (57) represents the characteristic of the difference encoded video quality assessment value (dVqc), and the difference encoded video quality estimation unit 224 may derive the difference encoded video quality assessment value (dVqc) using equation (57):

$$dVqc = w19 + w20 \cdot x \quad (57)$$

where dVqc is the difference encoded video quality assessment value, x is the degree of influence of the I-frame bit amount on the difference encoded video quality assessment value, and w19 and w20 are characteristic coefficients.

The difference encoded video quality estimation unit 224 outputs the derived difference encoded video quality assessment value (dVqc) to the encoded video quality estimation unit 225.

x in equation (57) may be derived using equations (58).

(For BitsI>BitsIave)

$$x = (Vqcmax - Vqcave) \cdot (BitsI - BitsIave)/(BitsImax - BitsIave)$$

(For BitsI<BitsIave)

$$x = (Vqcmin - Vqcave) \cdot (BitsI - BitsIave)/(BitsImin - BitsIave) \quad (58)$$

The encoded video quality estimation unit 225 derives an encoded video quality assessment value (Vqc) using equation (59) based on the average encoded video quality assessment value (Vqcave) calculated by the average encoded video quality estimation unit 221 and the difference encoded video quality assessment value (dVqc) calculated by the difference encoded video quality estimation unit 224 (S310):

$$Vqc = Vqcave + dVqc \quad (59)$$

The encoded video quality estimation unit 225 outputs the derived encoded video quality assessment value (Vqc) to the packet loss quality estimation unit 23.

Figure 22:
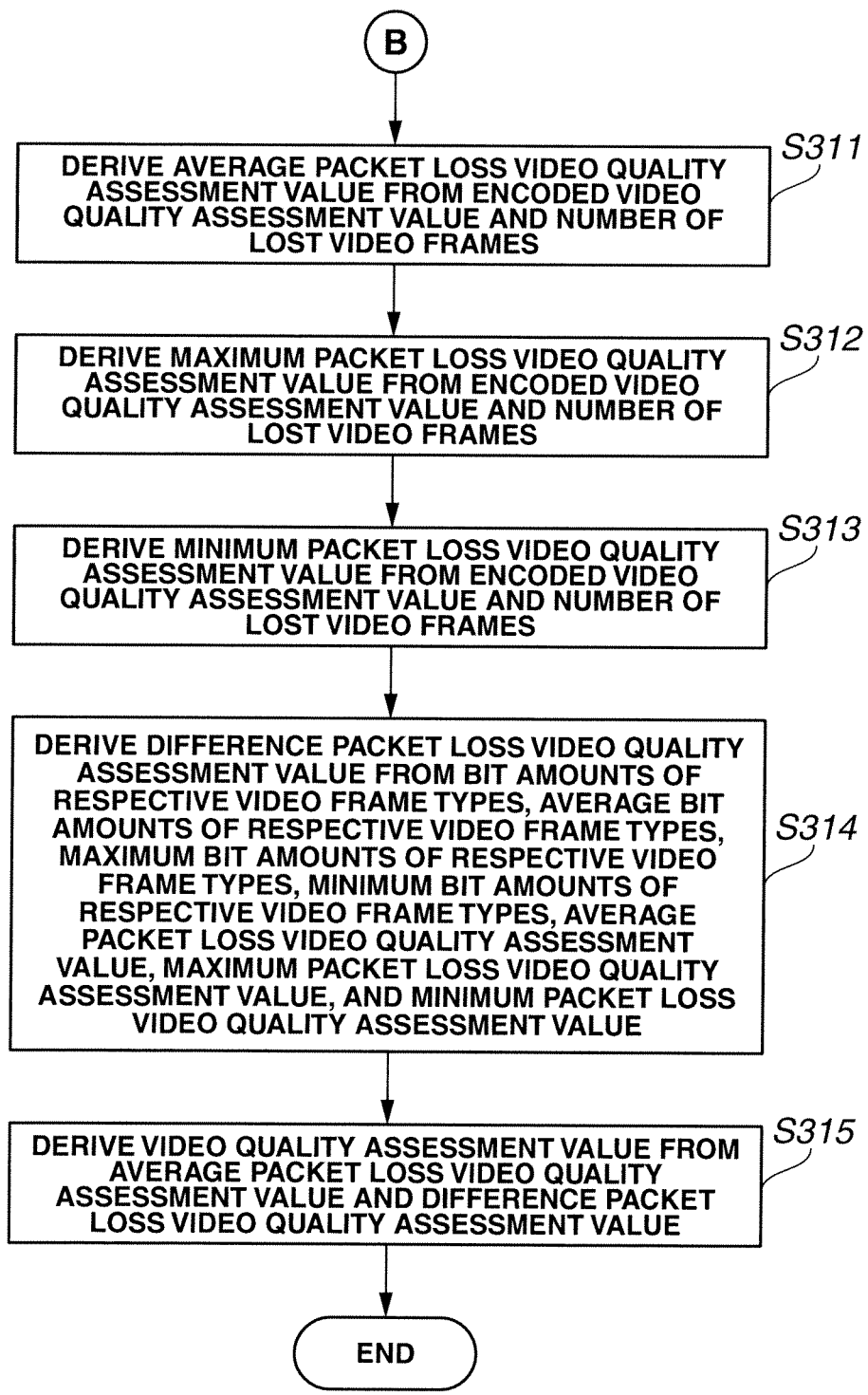
FIG. 22 is flowchart 2 showing the operation of the video quality estimation apparatus according to the third embodiment of the present invention.

As shown in FIG. 22, after the encoded video quality assessment value (Vqc) derived by the encoded video quality estimation unit 225 is output to the packet loss quality estimation unit 23, an average packet loss video quality estimation unit 231 of the packet loss quality estimation unit 23 derives an average packet loss video quality assessment value (Vqave) based on the number of lost video frames (DF) derived by the packet analysis unit 20 and the encoded video quality assessment value (Vqc) derived by the encoded video quality estimation unit 225 (S311).

The average packet loss video quality assessment value (Vqave) has a characteristic in which it decreases as the number of lost video frames (DF) increases, and may be derived using equation (60) representing this characteristic:

$$Vqave = 1 + (Vqc - 1) \cdot ((1 - w21) \exp(-DF/w22) + w21 \exp(-DF/w23)) \quad (60)$$

where Vqc is the encoded video quality assessment value, Vqave is the average packet loss video quality assessment value, DF is the number of lost video frames, and w21, ..., w23 are characteristic coefficients.

The average packet loss video quality estimation unit 231 outputs the derived average packet loss video quality assessment value (Vqave) to a video quality estimation unit 235.

A maximum packet loss video quality estimation unit 232 derives a maximum packet loss video quality assessment value (Vqmax) based on the number of lost video frames (DF) derived by the packet analysis unit 20 and the encoded video quality assessment value (Vqc) derived by the encoded video quality estimation unit 225 (S312).

The maximum packet loss video quality assessment value (Vqmax) has a characteristic in which it decreases as the number of lost video frames (DF) increases, and may be derived using equation (61) representing this characteristic:

$$Vq\max=1+(Vqc-1)\cdot((1-w24)\exp(-DF/w25)+w25\exp(-DF/w26)) \quad (61)$$

where Vqc is the encoded video quality assessment value, Vqmax is the maximum packet loss video quality assessment value, DF is the number of lost video frames, and w24, ..., w26 are characteristic coefficients.

The maximum packet loss video quality estimation unit 232 outputs the derived maximum packet loss video quality assessment value (Vqmax) to the video quality estimation unit 235.

A minimum packet loss video quality estimation unit 233 derives a minimum packet loss video quality assessment value (Vqmin) based on the number of lost video frames (DF) derived by the packet analysis unit 20 and the encoded video quality assessment value (Vqc) derived by the encoded video quality estimation unit 225 (S313).

The minimum packet loss video quality assessment value (Vqmin) has a characteristic in which it decreases as the number of lost video frames (DF) increases, and may be derived using equation (62) representing this characteristic:

$$Vq\min=1+(Vqc-1)((1-w27)\exp(-DF/w28)+w27\exp(-DF/w29)) \quad (62)$$

where Vqc is the encoded video quality assessment value, Vqmin is the minimum packet loss video quality assessment value, DF is the number of lost video frames, and w27, ..., w29 are characteristic coefficients.

The minimum packet loss video quality estimation unit 233 outputs the derived minimum packet loss video quality assessment value (Vqmin) to the video quality estimation unit 235.

A difference packet loss video quality estimation unit 234 derives a difference packet loss video quality assessment value (dVq) based on the average packet loss video quality assessment value (Vqave) calculated by the average packet loss video quality estimation unit 231, the maximum packet loss video quality assessment value (Vqmax) calculated by the maximum packet loss video quality estimation unit 232, the minimum packet loss video quality assessment value (Vqmin) calculated by the minimum packet loss video quality estimation unit 233, the I-frame bit amount (BitsI) calculated by the video frame type bit amount calculation unit 206, the I-frame average bit amount (BitsIave) calculated by the I-frame average bit amount estimation unit 211, the I-frame maximum bit amount (BitsImax) calculated by the I-frame maximum bit amount estimation unit 212, and the I-frame minimum bit amount (BitsImin) calculated by the I-frame minimum bit amount estimation unit 213 (S314).

When the I-frame bit amount (BitsI) is larger than the I-frame average bit amount (BitsIave), the difference packet loss video quality assessment value (dVq) becomes proportional to (Vqmax−Vqave)·(BitsI−BitsIave)/(BitsImax−BitsImax).

When the I-frame bit amount (BitsI) is smaller than the I-frame average bit amount (BitsIave), the difference packet loss video quality assessment value (dVq) becomes proportional to (Vqmin−Vqave)·(BitsI−BitsIave)/(BitsImin−BitsImax).

Equation (63) represents the characteristic of the difference packet loss video quality assessment value (dVq), and the difference packet loss video quality estimation unit 234 may derive the difference packet loss video quality assessment value (dVq) using equation (63):

$$dVq=w30+w31\cdot s \quad (63)$$

where dVq is the difference packet loss video quality assessment value, s is the degree of influence of the I-frame bit amount on the difference packet loss video quality assessment value, and w30 and w31 are characteristic coefficients.

The difference packet loss video quality estimation unit 234 outputs the derived difference packet loss video quality assessment value (dVq) to the video quality estimation unit 235.

s in equation (63) may be derived using equations (64). (For BitsI>BitsIave)

$$s=(Vq\max-Vq\text{ave})\cdot(\text{BitsI}-\text{BitsIave})/(\text{BitsImax}-\text{BitsIave})$$

(For BitsI<BitsIave)

$$s=(Vq\min-Vq\text{ave})\cdot(\text{BitsI}-\text{BitsIave})/(\text{BitsImin}-\text{BitsIave}) \quad (66)$$

The video quality estimation unit 235 derives the video quality assessment value (Vq) of the video content using equation (65) based on the average packet loss video quality assessment value (Vqave) calculated by the average packet loss video quality estimation unit 231 and the difference packet loss video quality assessment value (dVq) calculated by the difference packet loss video quality estimation unit 234 (S315):

$$Vq=Vq\text{ave}+dVq \quad (65)$$

As the characteristic coefficients (w1, ..., w31) used to derive the average bit amount, maximum bit amount, and minimum bit amount of I-frames, the average encoded video quality assessment value, the maximum encoded video quality assessment value, the minimum encoded video quality assessment value, the difference encoded video quality assessment value, the average packet loss video quality assessment value, the maximum packet loss video quality assessment value, the minimum packet loss video quality assessment value, and the difference packet loss video quality assessment value, relevant characteristic coefficients are selected from a quality characteristic coefficient database in a storage unit (not shown) arranged in the video quality estimation apparatus 3.

In an example of the quality characteristic coefficient database shown in FIG. 23, the characteristic coefficient is described in correspondence with a prerequisite such as the video CODEC method.

The video quality assessment value depends on the implementation of a video CODEC. For example, the video quality assessment value differs between a video content encoded by H.264 and a video content encoded by MPEG2 even at the same bit rate. Similarly, the video quality assessment value depends on prerequisites including the video format and frame rate. In the quality characteristic coefficient database shown in FIG. 23, the characteristic coefficient is described for each prerequisite.

INDUSTRIAL APPLICABILITY

The present invention can be applied to a video quality estimation apparatus which estimates a video quality value in video communication such as an IPTV service, video distribution service, or videophone service provided via an IP network.

EXPLANATION OF THE REFERENCE
NUMERALS AND SIGNS 1, 2 ... video quality estimation apparatus, 10, 20 ... packet analysis unit, 11, 21 ... frame characteristic estimation unit, 12, 22 ... encoding quality estimation unit, 23 ... packet loss quality estimation unit

The invention claimed is:

1. A video quality estimation apparatus comprising:
a packet analysis unit that derives a bit rate of an input encoded video packet, and derives a bit amount of an encoded video for at least one video frame type out of a plurality of video frame types;
a frame characteristic estimation unit that derives a frame characteristic representing characteristic of the bit amount of each video frame type from the bit rate derived by said packet analysis unit, the frame characteristic including an average bit amount, a maximum bit amount and a minimum bit amount; and
an encoding quality estimation unit that derives a video quality value based on 1) the bit rate of the encoded video packet and the bit amount of each video frame type that have been derived by said packet analysis unit, and 2) the frame characteristic of each video frame type that has been derived by said frame characteristic estimation unit, using a ratio for each video frame type, of 1) a difference between the bit amount and the average bit amount to 2) a difference between a) the maximum bit amount or the minimum bit amount and b) the average bit amount.

2. A video quality estimation apparatus according to claim 1, wherein said packet analysis unit includes
a video packet specifying unit that specifies an arbitrary encoded video packet contained in an input packet based on a packet ID unique to the encoded video packet,
an encoding amount calculation unit that derives a bit rate of the encoded video packet specified by said video packet specifying unit,
a frame delimiter position extraction unit that derives information indicating a delimiter of a video frame from the encoded video packet specified by said video packet specifying unit,
a specific frame start position extraction unit that derives information indicating a start position of a specific video frame from the encoded video packet specified by said video packet specifying unit,
a video frame bit amount calculation unit that derives a bit amount of a video frame from a bit amount between pieces of information indicating delimiters of the video frame that have been derived by said frame delimiter position extraction unit, and
a video frame type bit amount calculation unit that derives a bit amount of each video frame type from the information indicating the start position of the specific video frame that has been derived by said specific frame start position extraction unit, and the bit amount of the video frame that has been derived by said video frame bit amount calculation unit.

3. A video quality estimation apparatus according to claim 1, wherein
said frame characteristic estimation unit includes
an average bit amount estimation unit that derives an average bit amount of each video frame type from the bit rate derived by said packet analysis unit,
a maximum bit amount estimation unit that derives a maximum bit amount of each video frame type from the bit rate derived by said packet analysis unit, and
a minimum bit amount estimation unit that derives a minimum bit amount of each video frame type from the bit rate derived by said packet analysis unit, and
said average bit amount estimation unit, said maximum bit amount estimation unit, and said minimum bit amount estimation unit derive the average bit amount, maximum bit amount, and minimum bit amount of at least one video frame type out of an I-frame, a P-frame, and a B-frame.

4. A video quality estimation apparatus according to claim 1, wherein said encoding quality estimation unit includes
a video quality characteristic estimation unit that derives a video quality characteristic representing dispersion and a representative value of a video quality value from the bit rate derived by said packet analysis unit,
a difference video quality estimation unit that derives a difference video quality value representing a difference value between a desired video quality value and the representative value of the video quality value from the bit amount of each video frame type that has been derived by said packet analysis unit, the frame characteristic representing the characteristic of the bit amount of each video frame type that has been derived by said frame characteristic estimation unit, and the video quality characteristic representing the dispersion and representative value of the video quality value that has been derived by said video quality characteristic estimation unit, and
a video quality estimation unit that derives the desired video quality value by adding the difference video quality value derived by said difference video quality estimation unit and the representative value of the video quality value that has been derived by said video quality characteristic estimation unit.

5. A video quality estimation apparatus according to claim 4, wherein
said video quality characteristic estimation unit includes
an average video quality estimation unit that derives an average video quality value representing an average value of the video quality value from the bit rate derived by said packet analysis unit,
a maximum video quality estimation unit that derives a maximum video quality value representing a maximum value of the video quality value from the bit rate derived by said packet analysis unit, and
a minimum video quality estimation unit that derives a minimum video quality value representing a minimum value of the video quality value from the bit rate derived by said packet analysis unit, and
the dispersion of the video quality value is derived from the maximum video quality value derived by said maximum video quality estimation unit and the minimum video quality value derived by said minimum video quality estimation unit, and the average video quality value derived by said average video quality estimation unit is derived as the representative value of the video quality value.

6. A video quality estimation apparatus according to claim 1, further comprising a packet loss quality estimation unit that derives a video quality assessment value quantitatively representing quality of an encoded video that is affected by packet loss degradation, based on an encoded video quality assessment value derived by said video encoding quality estimation unit, the bit amount of each video frame type and the number of lost video frames representing the number of video frame losses that have been derived by said packet analysis unit, and the frame characteristic of each video frame type that has been derived by said frame characteristic estimation unit.

7. A video quality estimation apparatus according to claim 6, wherein said packet analysis unit includes
a video packet specifying unit that specifies an arbitrary encoded video packet contained in an input packet based on a packet ID unique to the encoded video packet,
a bit rate calculation unit that derives a bit rate of the encoded video packet specified by said video packet specifying unit,
a frame delimiter position extraction unit that derives information indicating a delimiter of a video frame from the encoded packet specified by said video packet specifying unit,
a specific frame start position extraction unit that derives information indicating a start position of a specific video frame from the encoded video packet specified by said video packet specifying unit,
a video frame bit amount calculation unit that derives a bit amount of a video frame from a bit amount between pieces of information indicating delimiters of the video frame that have been derived by said frame delimiter position extraction unit,
a video frame type bit amount calculation unit that derives a bit amount of each video frame type from the information indicating the start position of the specific video frame that has been derived by said specific frame start position extraction unit, and the bit amount of the video frame that has been derived by said video frame bit amount calculation unit,
a packet loss frame specifying unit that specifies a packet in which a packet loss has occurred, from the encoded video packet specified by said video packet specifying unit and the information indicating the delimiter of the video frame that has been derived by said frame delimiter position extraction unit, and
a number-of-lost-video-frames calculation unit that derives the number of video frames lost by the packet loss based on a video frame type determined by the bit amount of each video frame type that has been derived by said video frame type bit amount calculation unit, information indicating a video frame position, and the packet in which the packet loss has occurred that has been specified by said packet loss frame specifying unit.

8. A video quality estimation apparatus according to claim 6, wherein
said frame characteristic estimation unit includes
an average bit amount estimation unit that derives a characteristic of an average bit amount of each video frame type from the bit rate derived by said packet analysis unit,
a maximum bit amount estimation unit that derives a characteristic of a maximum bit amount of each video frame type from the bit rate derived by said packet analysis unit, and
a minimum bit amount estimation unit that derives a characteristic of a minimum bit amount of each video frame type from the bit rate derived by said packet analysis unit, and
said average bit amount estimation unit, said maximum bit amount estimation unit, and said minimum bit amount estimation unit derive characteristics of the average bit amount, maximum bit amount, and minimum bit amount of at least one video frame type out of an I-frame, a P-frame, and a B-frame.

9. A video quality estimation apparatus according to claim 6, wherein said encoding quality estimation unit includes an encoded video quality characteristic estimation unit that derives an encoded video quality assessment characteristic representing dispersion and a representative value of an encoded video quality assessment value from the bit rate derived by said packet analysis unit,
a difference encoded video quality estimation unit that derives a difference encoded video quality assessment value representing a difference value between the encoded video quality assessment value and the representative value of the encoded video quality assessment value from the bit amount of each video frame type that has been derived by said packet analysis unit, the frame characteristic representing the characteristic of the bit amount of each video frame type that has been derived by said frame characteristic estimation unit, and the encoded video quality assessment characteristic representing the dispersion and representative value of the encoded video quality assessment value that has been derived by said encoded video quality characteristic estimation unit, and
an encoded video quality estimation unit that derives the encoded video quality assessment value by adding the representative value of the encoded video quality assessment value that has been derived by said encoded video quality characteristic estimation unit and the difference encoded video quality assessment value derived by said difference encoded video quality estimation unit.

10. A video quality estimation apparatus according to claim 9, wherein
said encoded video quality characteristic estimation unit includes
an average encoded video quality estimation unit that derives an average encoded video quality assessment value representing an average value of the encoded video quality assessment value from the bit rate derived by said packet analysis unit,
a maximum encoded video quality estimation unit that derives a maximum encoded video quality assessment value representing a maximum value of the encoded video quality assessment value from the bit rate derived by said packet analysis unit, and
a minimum encoded video quality estimation unit that derives a minimum encoded video quality assessment value representing a minimum value of the encoded video quality assessment value from the bit rate derived by said packet analysis unit, and
the dispersion of the encoded video quality assessment value is derived from the maximum encoded video quality assessment value derived by said maximum encoded video quality estimation unit and the minimum encoded video quality assessment value derived by said minimum encoded video quality estimation unit, and the average encoded video quality assessment value derived by said average encoded video quality estimation unit is derived as the representative value of the encoded video quality assessment value.

11. A video quality estimation apparatus according to claim 6, wherein said packet loss quality estimation unit includes
an average packet loss video quality estimation unit that derives an average packet loss video quality assessment value representing an average value of the video quality assessment value based on the number of lost video frames derived by said packet analysis unit and the encoded video quality assessment value derived by said encoding quality estimation unit, a maximum packet loss video quality estimation unit that derives a maximum packet loss video quality assessment value representing a maximum value of the video quality assessment value based on the number of lost video frames derived by said packet analysis unit and the encoded video quality assessment value derived by said encoding quality estimation unit, a minimum packet loss video quality estimation unit that derives a minimum packet loss video quality assessment value representing a minimum value of the video quality assessment value based on the number of lost video frames derived by said packet analysis unit and the encoded video quality assessment value derived by said encoding quality estimation unit, a difference packet loss video quality estimation unit that represents a difference value between a desired video quality assessment value and the average packet loss video quality assessment value, from the bit amount of each video frame type that has been derived by said packet analysis unit, the average bit amount, maximum bit amount, and minimum bit amount of each video frame type that have been derived by said frame characteristic estimation unit, the average packet loss video quality assessment value derived by said average packet loss video quality estimation unit, the maximum packet loss video quality assessment value derived by said maximum packet loss video quality estimation unit, and the minimum packet loss video quality assessment value derived by said minimum packet loss video quality estimation unit, and a packet loss video quality estimation unit that derives a desired video quality assessment value by adding the average packet loss video quality assessment value derived by said average packet loss video quality estimation unit and the difference packet loss video quality assessment value derived by said difference packet loss video quality estimation unit.

12. A video quality estimation method comprising:

the packet analysis step of deriving a bit rate of an input encoded video packet, and deriving a bit amount of an encoded video for at least one video frame type out of a plurality of video frame types;

the frame characteristic estimation step of deriving a frame characteristic representing a characteristic of the bit amount of each video frame type from the bit rate derived in the packet analysis step, the frame characteristic including an average bit amount, a maximum bit amount and a minimum bit amount; and the encoding quality estimation step of deriving a video quality value based on 1) the bit rate of the encoded video packet and the bit amount of each video frame type that have been derived in the packet analysis step, and 2) the frame characteristic of each video frame type that has been derived in the frame characteristic estimation step using a ratio, for each video frame type of 1) a difference between the bit amount and the average bit amount to 2) a difference between a) the maximum bit amount or the minimum bit amount and b) the average bit amount.

13. A video quality estimation method according to claim 12, wherein the packet analysis step includes the video packet specifying step of specifying an arbitrary encoded video packet contained in an input packet based on a packet ID unique to the encoded video packet, the encoding amount calculation step of deriving a bit rate of the encoded video packet specified in the video packet specifying step, the frame delimiter position extraction step of deriving information indicating a delimiter of a video frame from the encoded video packet specified in the video packet specifying step, the specific frame start position extraction step of deriving information indicating a start position of a specific video frame from the encoded video packet specified in the video packet specifying step, the video frame bit amount calculation step of deriving a bit amount of a video frame from a bit amount between pieces of information indicating delimiters of the video frame that have been derived in the frame delimiter position extraction step, and the video frame type bit amount calculation step of deriving a bit amount of each video frame type from the information indicating the start position of the specific video frame that has been derived in the specific frame start position extraction step, and the bit amount of the video frame that has been derived in the video frame bit amount calculation step.

14. A video quality estimation method according to claim 12, wherein the frame characteristic estimation step includes the average bit amount estimation step of deriving an average bit amount of each video frame type from the bit rate derived in the packet analysis step, the maximum bit amount estimation step of deriving a maximum bit amount of each video frame type from the bit rate derived in the packet analysis step, and the minimum bit amount estimation step of deriving a minimum bit amount of each video frame type from the bit rate derived in the packet analysis step, and in the average bit amount estimation step, the maximum bit amount estimation step, and the minimum bit amount estimation step, the average bit amount, maximum bit amount, and minimum bit amount of at least one video frame type out of an I-frame, a P-frame, and a B-frame are derived.

15. A video quality estimation method according to claim 12, wherein the encoding quality estimation step includes the video quality characteristic estimation step of deriving a video quality characteristic representing dispersion and a representative value of a video quality value from the bit rate derived in the packet analysis step, the difference video quality estimation step of deriving a difference video quality value representing a difference value between a desired video quality value and the representative value of the video quality value from the bit amount of each video frame type that has been derived in the packet analysis step, the frame characteristic representing the characteristic of the bit amount of each video frame type that has been derived in the frame characteristic estimation step, and the video quality characteristic representing the dispersion and representative value of the video quality value that has been derived in the video quality characteristic estimation step, and the video quality estimation step of deriving the desired video quality value by adding the difference video quality value derived in the difference video quality estimation step and the representative value of the video quality value that has been derived in the video quality characteristic estimation step.

16. A video quality estimation method according to claim 15, wherein
the video quality characteristic estimation step includes
the average video quality estimation step of deriving an average video quality value representing an average value of the video quality value from the bit rate derived in the packet analysis step,
the maximum video quality estimation step of deriving a maximum video quality value representing a maximum value of the video quality value from the bit rate derived in the packet analysis step, and
the minimum video quality estimation step of deriving a minimum video quality value representing a minimum value of the video quality value from the bit rate derived in the packet analysis step, and
the dispersion of the video quality value is derived from the maximum video quality value derived in the maximum video quality estimation step and the minimum video quality value derived in the minimum video quality estimation step, and the average video quality value derived in the average video quality estimation step is derived as the representative value of the video quality value.

17. A video quality estimation method according to claim 12, further comprising the packet loss quality estimation step of deriving a video quality assessment value quantitatively representing quality of an encoded video that is affected by packet loss degradation, based on an encoded video quality assessment value derived in the encoding quality estimation step, the bit amount of each video frame type and the number of lost video frames representing the number of video frame losses that have been derived in the packet analysis step, and the frame characteristic of each video frame type that has been derived in the frame characteristic estimation step.

18. A video quality estimation method according to claim 17, wherein the packet analysis step includes
the video packet specifying step of specifying an arbitrary encoded video packet contained in an input packet based on a packet ID unique to the encoded video packet,
the bit rate calculation step of deriving a bit rate of the encoded video packet specified in the video packet specifying step,
the frame delimiter position extraction step of deriving information indicating a delimiter of a video frame from the encoded packet specified in the video packet specifying step,
the specific frame start position extraction step of deriving information indicating a start position of a specific video frame from the encoded video packet specified in the video packet specifying step,
the video frame bit amount calculation step of deriving a bit amount of a video frame from a bit amount between pieces of information indicating delimiters of the video frame that have been derived in the frame delimiter position extraction step,
the video frame type bit amount calculation step of deriving a bit amount of each video frame type from the information indicating the start position of the specific video frame that has been derived in the specific frame start position extraction step, and the bit amount of the video frame that has been derived in the video frame bit amount calculation step,
the packet loss frame specifying step of specifying a packet in which a packet loss has occurred, from the encoded video packet specified in the video packet specifying step and the information indicating the delimiter of the video frame that has been derived in the frame delimiter position extraction step, and the number-of-lost-video-frames calculation step of deriving the number of video frames lost by the packet loss based on a video frame type determined by the bit amount of each video frame type that has been derived in the video frame type bit amount calculation step, information indicating a video frame position, and the packet in which the packet loss has occurred that has been specified in the packet loss frame specifying step.

19. A video quality estimation method according to claim 17, wherein
the frame characteristic estimation step includes
the average bit amount estimation step of deriving a characteristic of an average bit amount of each video frame type from the bit rate derived in the packet analysis step,
the maximum bit amount estimation step of deriving a characteristic of a maximum bit amount of each video frame type from the bit rate derived in the packet analysis step, and
the minimum bit amount estimation step of deriving a characteristic of a minimum bit amount of each video frame type from the bit rate derived in the packet analysis step, and
in the average bit amount estimation step, the maximum bit amount estimation step, and
the minimum bit amount estimation step, characteristics of the average bit amount, maximum bit amount, and minimum bit amount of at least one video frame type out of an I-frame, a P-frame, and a B-frame are derived.

20. A video quality estimation method according to claim 17, wherein the encoding quality estimation step includes
the encoded video quality characteristic estimation step of deriving an encoded video quality assessment characteristic representing dispersion and a representative value of an encoded video quality assessment value from the bit rate derived in the packet analysis step,
the difference encoded video quality estimation step of deriving a difference encoded video quality assessment value representing a difference value between the encoded video quality assessment value and the representative value from the bit amount of each video frame type that has been derived in the packet analysis step, the frame characteristic representing the characteristic of the bit amount of each video frame type that has been derived in the frame characteristic estimation step, and the encoded video quality assessment characteristic representing the dispersion and representative value of the encoded video quality assessment value that has been derived in the encoded video quality characteristic estimation step, and
the encoded video quality estimation step of deriving the encoded video quality assessment value by adding the representative value of the encoded video quality assessment value that has been derived in the encoded video quality characteristic estimation step and the difference encoded video quality assessment value derived in the difference encoded video quality estimation step.

21. A video quality estimation method according to claim 20, wherein
the encoded video quality characteristic estimation step includes
the average encoded video quality estimation step of deriving an average encoded video quality assessment value representing an average value of the encoded video quality assessment value from the bit rate derived in the packet analysis step,
the maximum encoded video quality estimation step of deriving a maximum encoded video quality assessment value representing a maximum value of the encoded video quality assessment value from the bit rate derived in the packet analysis step, and the minimum encoded video quality estimation step of deriving a minimum encoded video quality assessment value representing a minimum value of the encoded video quality assessment value from the bit rate derived in the packet analysis step, and the dispersion of the encoded video quality assessment value is derived from the maximum encoded video quality assessment value derived in the maximum encoded video quality estimation step and the minimum encoded video quality assessment value derived in the minimum encoded video quality estimation step, and the average encoded video quality assessment value derived in the average encoded video quality estimation step is derived as the representative value of the encoded video quality assessment value.

22. A video quality estimation method according to claim 17, wherein the packet loss quality estimation step includes the average packet loss video quality estimation step of deriving an average packet loss video quality assessment value representing an average value of the video quality assessment value based on the number of lost video frames derived in the packet analysis step and the encoded video quality assessment value derived in the encoding quality estimation step, the maximum packet loss video quality estimation step of deriving a maximum packet loss video quality assessment value representing a maximum value of the video quality assessment value based on the number of lost video frames derived in the packet analysis step and the encoded video quality assessment value derived in the encoding quality estimation step, the minimum packet loss video quality estimation step of deriving a minimum packet loss video quality assessment value representing a minimum value of the video quality assessment value based on the number of lost video frames derived in the packet analysis step and the encoded video quality assessment value derived in the encoding quality estimation step, the difference packet loss video quality estimation step of representing a difference value between a desired video quality assessment value and the average packet loss video quality assessment value, from the bit amount of each video frame type that has been derived in the packet analysis step, the average bit amount, maximum bit amount, and minimum bit amount of each video frame type that have been derived in the frame characteristic estimation step, the average packet loss video quality assessment value derived in the average packet loss video quality estimation step, the maximum packet loss video quality assessment value derived in the maximum packet loss video quality estimation step, and the minimum packet loss video quality assessment value derived in the minimum packet loss video quality estimation step, and the packet loss video quality estimation step of deriving a desired video quality assessment value by adding the average packet loss video quality assessment value derived in the average packet loss video quality estimation step and the difference packet loss video quality assessment value derived in the difference packet loss video quality estimation step.

23. A non-transitory computer-readable recording medium recording a video quality estimation program for causing a computer to execute the packet analysis step of deriving a bit rate of an input encoded video packet, and deriving a bit amount of an encoded video for at least one video frame type out of a plurality of video frame types, the frame characteristic estimation step of deriving a frame characteristic representing a characteristic of the bit amount of each video frame type from the bit rate derived in the packet analysis step, the frame characteristic including an average bit amount, a maximum bit amount and minimum bit amount and the encoding quality estimation step of deriving a video quality value based on the bit rate of the encoded video packet and the bit amount of each video frame type that have been derived in the packet analysis step, and the frame characteristic of each video frame type that has been derived in the frame characteristic estimation step, using a ratio, for each video frame type, of 1) a difference between the bit amount and the average bit amount to 2) a difference between a) the maximum bit amount or the minimum bit amount and b) the average bit amount.

* * * * *

UNITED STATES PATENT AND TRADEMARK OFFICE
CERTIFICATE OF CORRECTION

PATENT NO. : 9,001,897 B2
APPLICATION NO. : 13/501210
DATED : April 7, 2015
INVENTOR(S) : Kazuhisa Yamagishi et al.

It is certified that error appears in the above-identified patent and that said Letters Patent is hereby corrected as shown below:

IN THE CLAIMS

Column 45, Claim 1, Line 15, please delete "representing characteristic" and insert --representing a characteristic--

Column 49, Claim 12, Line 55, please delete "step using a ratio" and insert --step, using a ratio--

Column 49, Claim 12, Line 55, please delete "video frame type of" and insert --video frame type, of--

Signed and Sealed this
Sixteenth Day of February, 2016

Michelle K. Lee
*Director of the United States Patent and Trademark Office*